United States Patent [19]
Hoffman

[11] Patent Number: 5,413,493
[45] Date of Patent: May 9, 1995

[54] ELECTRICAL CONNECTOR ASSEMBLY, ESPECIALLY FOR ELECTRIC VEHICLE

[75] Inventor: Ernest G. Hoffman, Middlefield, Conn.

[73] Assignee: Hubbell Incorporated, Orange, Conn.

[21] Appl. No.: 115,091

[22] Filed: Sep. 2, 1993

Related U.S. Application Data

[63] Continuation-in-part of Ser. No. 5,108, Jan. 15, 1993, Pat. No. 5,344,330.

[51] Int. Cl.$^6$ ............... H01R 13/453; H01R 13/703
[52] U.S. Cl. ............... 439/188; 200/51.09; 320/2; 439/376
[58] Field of Search ............... 439/188, 488, 489, 490, 439/34, 376; 320/2, 5; 307/140, 150, 125; 200/51.09

[56] References Cited

U.S. PATENT DOCUMENTS

| | | | |
|---|---|---|---|
| 3,270,267 | 8/1966 | Nolte, Jr. | 439/923 |
| 3,904,947 | 9/1975 | Crews | 320/2 |
| 3,950,059 | 4/1976 | Anhalt et al. | 439/261 |
| 3,952,239 | 4/1976 | Owings et al. | 320/2 |
| 4,158,802 | 6/1979 | Rose, II | 302/2 |
| 4,203,640 | 5/1980 | Bice et al. | 439/139 |
| 4,217,019 | 8/1980 | Cameron | 439/138 |
| 4,431,241 | 2/1984 | Hazelhurst | 439/138 |
| 4,624,472 | 11/1986 | Stuart et al. | 280/420 |
| 4,718,862 | 1/1988 | Beeman | 439/482 |
| 4,843,477 | 6/1989 | Mizutani | 439/310 |
| 4,915,639 | 4/1990 | Cohn et al. | 439/188 |
| 5,104,331 | 4/1992 | Goble | 439/341 |
| 5,157,319 | 10/1992 | Klontz et al. | 320/2 |
| 5,174,772 | 12/1992 | Vranish | 439/131 |
| 5,181,858 | 1/1993 | Matz et al. | 439/489 |
| 5,202,617 | 4/1993 | Nor | 320/2 |
| 5,222,164 | 6/1993 | Bass, Sr. et al. | 439/577 |
| 5,252,078 | 10/1993 | Langenbahn | 439/34 |
| 5,274,319 | 12/1993 | Keener | 320/2 |

FOREIGN PATENT DOCUMENTS

| | | | |
|---|---|---|---|
| 0049625 | 4/1982 | European Pat. Off. | 439/350 |
| 1926582 | 11/1970 | Germany | 439/345 |
| 208053 | 3/1968 | U.S.S.R. | 439/345 |

OTHER PUBLICATIONS

"Infrastructure-EV Charging Meter", Green Car Journal, Nov. 1992, p. 124.
"Doe, EPA and NEMA Tackle Energy-Efficient Motors", NEMA News—vol. 2, No. 8, Aug. 15, 1993, p. 12.
Photographs of Electrical Connectors produced by Meltric—approx Jul. 1993.

*Primary Examiner*—Neil Abrams
*Attorney, Agent, or Firm*—Jerry M. Presson; David L. Tarnoff; Alfred N. Goodman

[57] ABSTRACT

An electrical connector assembly 10 for transmitting electrical energy, and especially designed for use with electric vehicles. The electrical connector assembly 10 includes an electrical connector or plug 16 with electrical contacts and an electrical connector inlet assembly or receptacle 20 with mating electrical contacts. The plug has a cover 50 for selectively covering and uncovering its electrical contacts to prevent inadvertent contact with the electrical contacts. Likewise, the receptacle has a cover 460 for selectively covering and uncovering its electrical contacts to prevent inadvertent contact with the electrical contacts. In the preferred embodiment, the covers of the plug and receptacle are either automatically or manually uncovered only after full insertion of the plug into the receptacle. The plug can be inserted into the receptacle with little or no force by the user since the contacts of the plug and receptacle are not electrically coupled together until after full insertion of the plug into the receptacle. The plug 16 can be provided with one or more sensors (magnets) 119, and receptacle 20 can also be provided with one or more sensors (reed switches) 358 which cooperate with sensors 119 to sense the absence or incorrect positioning of plug 16 in receptacle 20. The sensors 119 and 358 also interact to activate a microprocessor 24 to determine compatibility of power between plug 16 and receptacle 20.

12 Claims, 42 Drawing Sheets

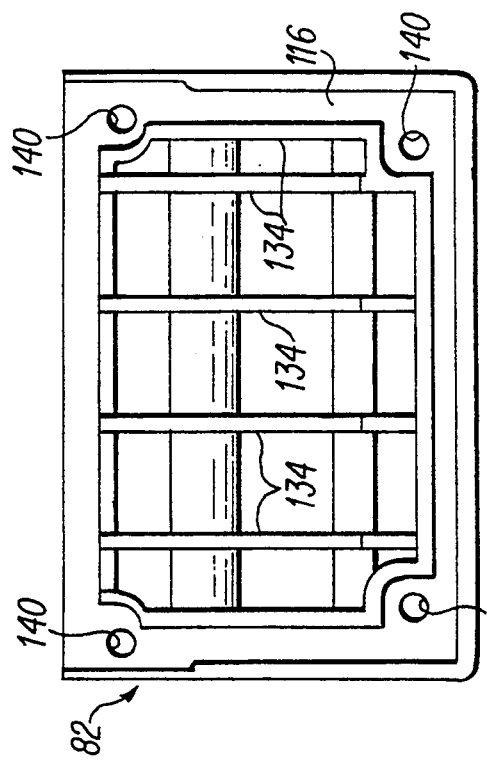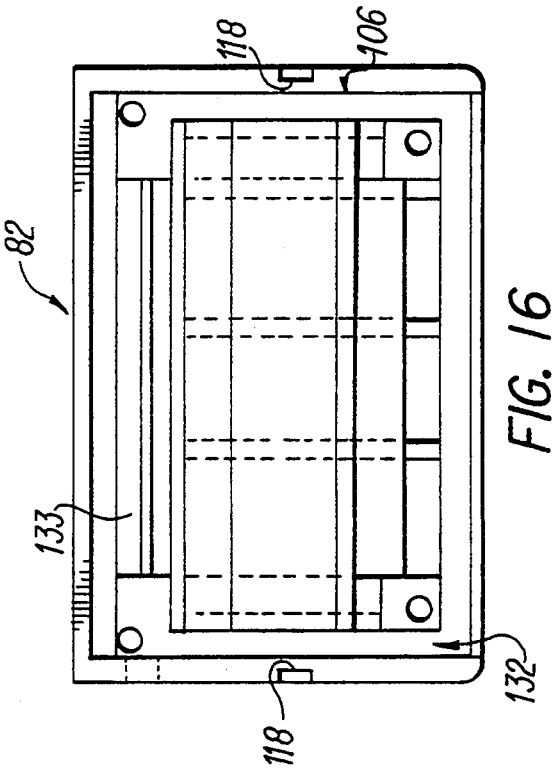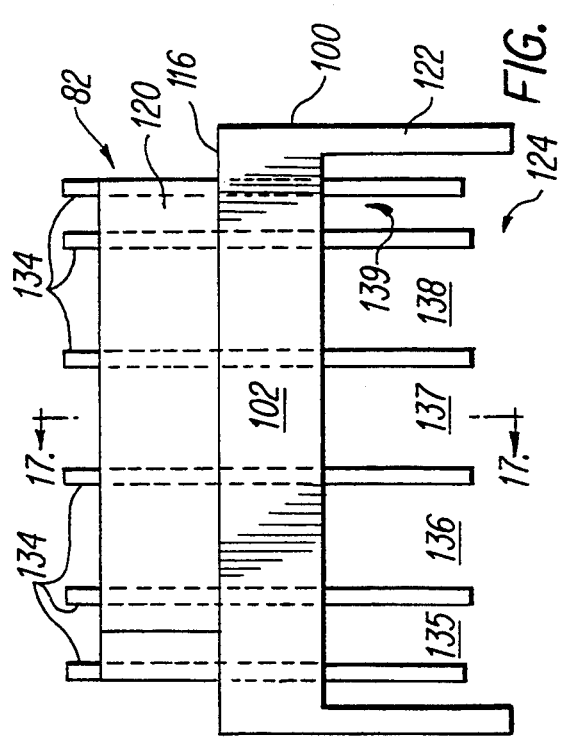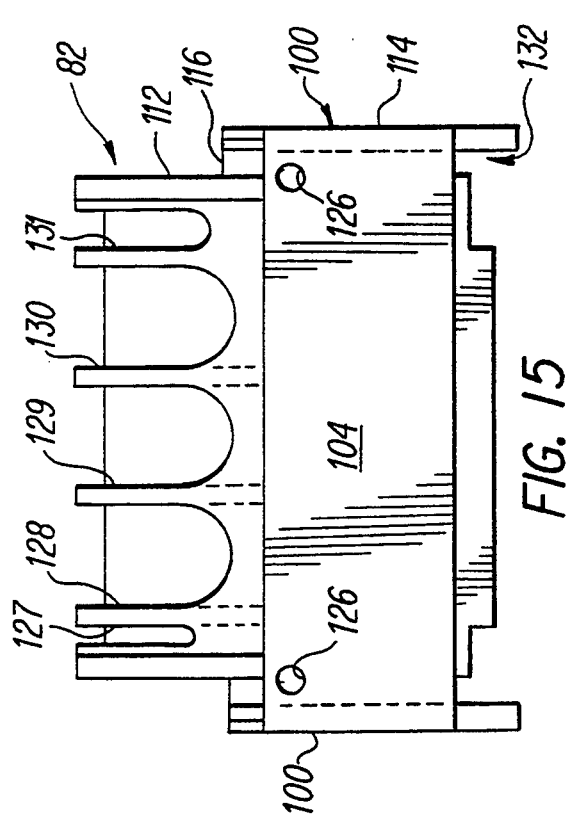

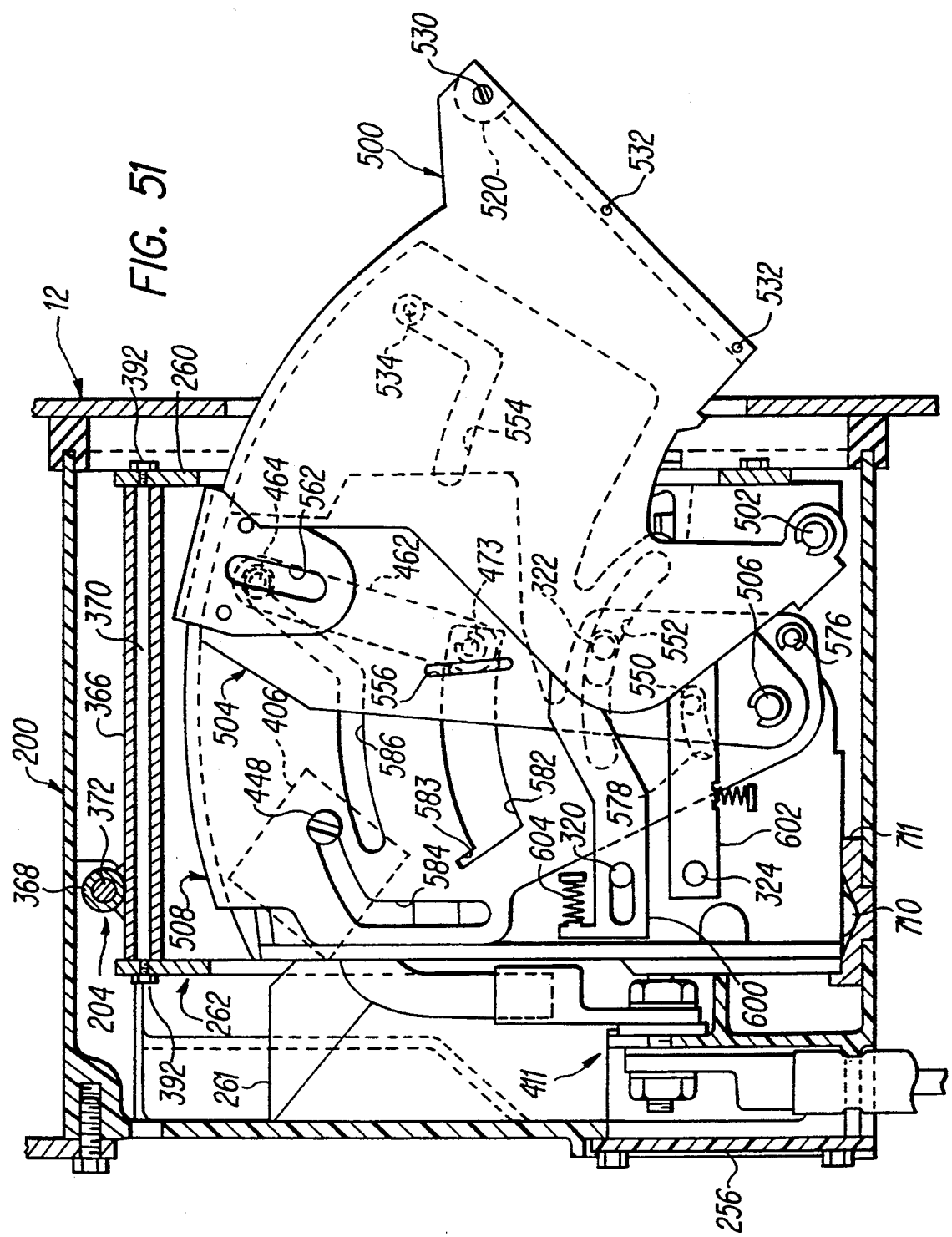

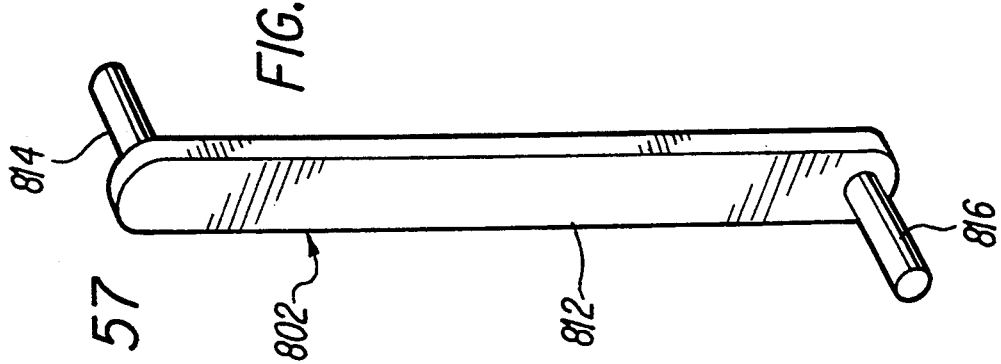
FIG. 57    FIG. 58
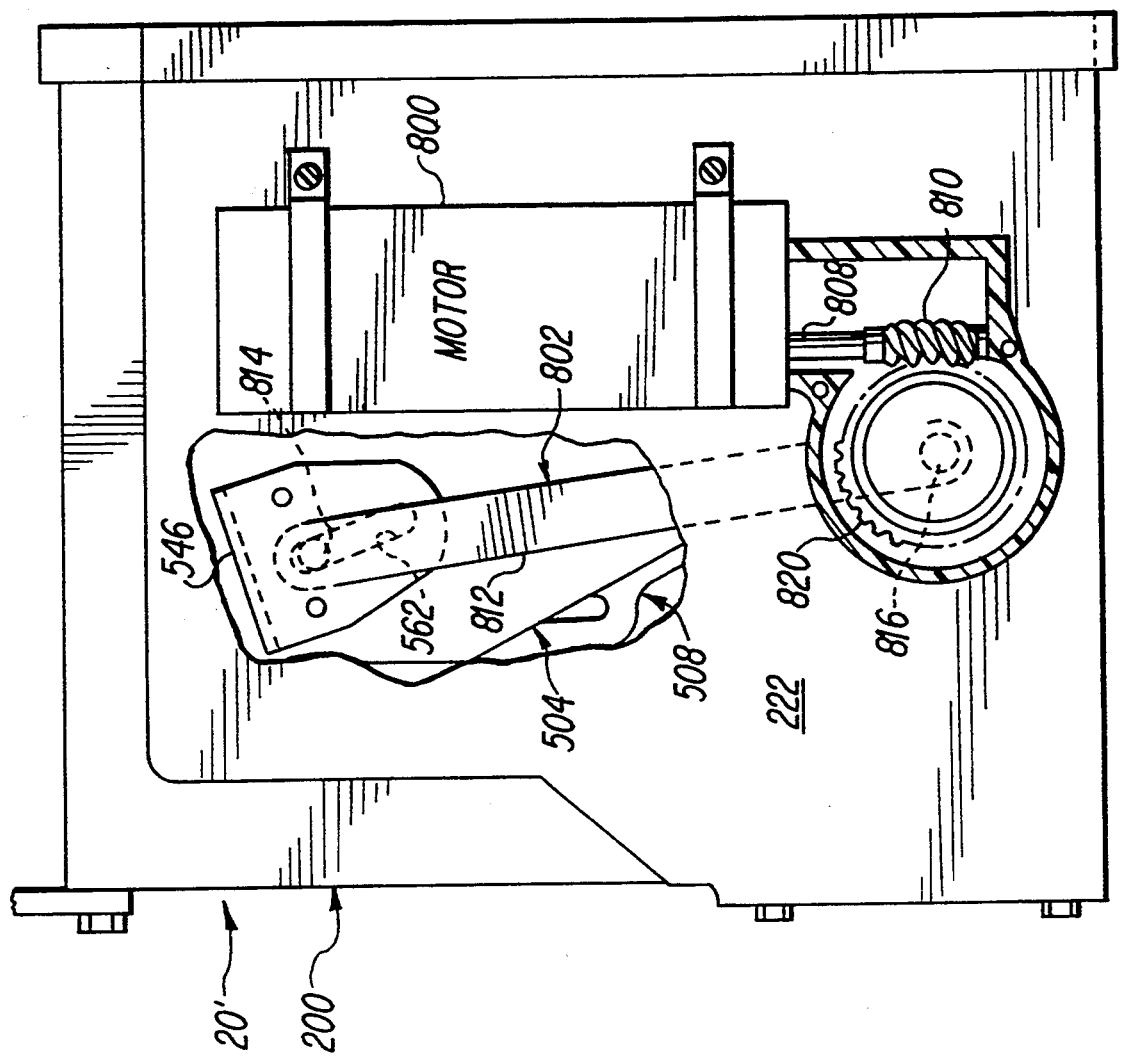

ELECTRICAL CONNECTOR ASSEMBLY, ESPECIALLY FOR ELECTRIC VEHICLE

RELATED PATENT APPLICATIONS

This is a continuation-in-part of U.S. Pat. application Ser. No. 08/005,108 filed on Jan. 15, 1993, now U.S. Pat. No. 5,344,330, the entire disclosure of which is hereby incorporated herein by reference.

FIELD OF THE INVENTION

This invention relates to an electrical connector assembly having a plug or male electrical connector and a receptacle or female electrical connector which mate together for electrically coupling a first set of contacts in the plug with a second set of contacts in the receptacle. Specifically, the invention relates to an electrical connector assembly, especially for electric vehicles, in which the electrical contacts of the plug and the receptacle are completely concealed from the user until after insertion of the plug into the receptacle. A weathershield is provided on the inlet assembly to shield the contacts during charging.

BACKGROUND OF THE INVENTION

The number of automobiles being operated in the world is continuing to increase. This increase in automobiles has significantly increased the worldwide air pollution problem. In order to control this air pollution problem from automobiles, many countries have begun to regulate the exhaust emissions from automobiles. In fact, the exhaust emissions standards are constantly becoming stricter each year. For example, California regulators have recently passed a law requiring 2% of all vehicles sold in California to be "zero-emissions" or electric powered by 1998. Failure to meet the new emission standard would result in significant fines to automobile manufacturers selling automobiles in California. Accordingly, automobile manufacturers' ability to sell automobiles in California will be hurt if they do not produce an automobile with zero-emissions.

In view of these increasingly stricter emission requirements, automobile manufacturers are beginning to develop electric powered vehicles. Accordingly, it will be necessary to provide the owners of the electric vehicles with a safe and easy way of recharging their batteries. Moreover, electric vehicles have a limited range of travel before requiring their batteries to be recharged. Thus, recharging stations will be needed which are conveniently located and easy to operate in substantially the same manner in which gas stations are currently available for gas powered vehicles.

One example of an electric vehicle and a recharging station for recharging the batteries of electric vehicles is disclosed in U.S. Pat. No. 4,158,802 to Rose, II. The electric vehicle and the recharging station disclosed in the patent issued to Rose, II have many drawbacks. For instance, the contact surface of the vehicle is exposed to the environment which can cause the electrical contact surfaces of the vehicle to corrode. Also, the electrical contact surfaces of the vehicle and the recharging station are exposed to the driver such that the driver of the vehicle could accidentally touch one of the electric contacts and receive an electrical shock. Furthermore, this recharging station would require all electric vehicles to be manufactured within a certain range of sizes and shapes.

Accordingly, many attempts have been made to use inductive power couplings to recharge the batteries of an electric vehicle. Inductive power couplings transfer power from a power source to the vehicle by means of a magnetic field that extends through an air gap. However, these inductive power couplings have certain disadvantages. For example, research is currently being conducted on the harmful effects on humans of magnetic fields, such as created by inductive couplings. Moreover, existing inductive power couplings are not capable of transferring high amperage which is necessary to provide a fast charge to the vehicle's battery.

Examples of inductive power couplings are disclosed in the following patents: U.S. Pat. No. 4,347,472 to Lemelson; U.S. Pat. No. 4,800,328 to Bolger et al; U.S. Pat. No. 5,157,319 to Klonte et al; Japanese patent application 63-287607 to Matsuoka; German patent 23 30 255; and Japanese patent application 58-69404 to Yamada.

In view of the above, it is apparent that there exists a need for an electrical connector assembly for transferring energy by conduction to electric vehicles from electrical recharging stations which will overcome the above problems of the prior art, and which are safe and convenient to operate. This invention addresses this need in the art along with other needs which will become apparent to those skilled in the art once given this disclosure.

SUMMARY OF THE INVENTION

Accordingly, a primary object of the present invention is to provide an electrical connector assembly, especially for electric vehicles, which is safe and convenient to operate.

Another object of the present invention is to provide an electrical connector having its contacts covered or concealed from the user to avoid accidental contact by the user.

Another object of the present invention is to provide an electrical connector assembly having a plug which can be inserted into a receptacle with little or no force.

Another object of the present invention is to provide an electrical connector assembly having a plug with a first set of contacts and a receptacle with a second set of contacts in which both sets of contacts remain covered until after full insertion of the plug into the receptacle.

Still another object of the present invention is to provide a weather-tight electrical connector assembly.

Another object of the present invention is to provide an electrical inlet assembly having a weathershield or hood for covering the mating connector during recharging of the vehicle.

Yet another object of the present invention is to provide an electrical connector assembly in which the contacts of the plug and the contacts of the receptacle move in a direction transverse to the direction of insertion of the plug into the receptacle.

A further object of the present invention is to provide an electrical connector assembly having one electrical connector coupled to a recharging station and another electrical connector coupled to an electric car in which the plug and the receptacle will disengage from each other without damage thereto when an excessively high force is applied to the cable of the plug.

Another object is to provide electrical connectors for electric vehicles or electric recharging stations which are relatively inexpensive and simple to manufacture.

The foregoing objects are basically attained by providing an electrical connector inlet assembly for recharging a battery of an electric vehicle, comprising: an inlet housing with an inlet cavity for receiving an electrical connector with a first set of electrical contacts therein; a second set of electrical contacts movably coupled to the inlet housing for movement between a retracted position remote from the inlet cavity and an extended position located within the inlet cavity for electrically engaging the first set of electrical contacts housed in the mating electrical connector; an inlet contact cover movably coupled to the inlet housing for concealing the second set of electrical contacts from the inlet cavity when the second set of electrical contacts are in the retracted position, and for exposing the second set of electrical contacts to the inlet cavity when the second set of electrical contacts are in the extended position; and an actuation mechanism operatively coupled to the second set of contacts for moving the second set of contacts between the retracted position and the extended position, the actuation mechanism further being operatively coupled to the contact cover for moving the contact cover between a closed position to conceal the second set of contacts and an open position to expose the second set of electrical contacts.

The foregoing objects are also basically attained by providing an electrical connector system, comprising: a first electrical connector with a first power transferring member coupled to a power source; non-contacting indicia means, coupled to the first electrical connector, for representing magnitude of the power source; a second electrical connector with a second power transferring member coupled to a load; and sensing means, coupled to the second electrical connector, for responding to said non-contacting indicia means to determine compatibility of power from the first electrical connector with the second electrical connector.

The foregoing objects are further attained by providing an electrical connector inlet assembly, comprising: an inlet housing having first power transferring means therein and an inlet cavity for receiving a mating electrical connector with second power transferring means therein; and a weathershield movably coupled to the inlet housing for movement between a retracted position unobstructing the inlet cavity and an extended position partially covering the inlet cavity and a portion of the mating electrical connector positioned in the inlet cavity.

Other objects, advantages and salient features of the invention will become apparent from the following detailed description, which, taken in conjunction with the annexed drawings, discloses four preferred embodiments of the invention.

BRIEF DESCRIPTION OF THE DRAWINGS

Referring to the drawings which form a part of this original disclosure:

FIG. 13 is a front elevational view of the lower half of the contact retainer body of the electrical connector illustrated in FIGS. 1-8;

FIG. 14 is a top plan view of the lower half of the contact retainer body illustrated in FIG. 13;

FIG. 15 is a rear elevational view of the lower half of the contact retainer body illustrated in FIGS. 13-14;

FIG. 16 is a bottom plan view of the lower half of the contact retainer body illustrated in FIGS. 13-15;

FIG. 51 is a cross-sectional view of the electrical connector inlet assembly taken along a vertical plane illustrating the cam plate in the retracted position after a break-away force has been applied to the electrical connector inlet assembly;

FIG. 57 is a partial side elevational view of the automatic version of the electrical connector inlet assembly illustrated in FIG. 56 with a portion of the outer inlet housing broken away for clarity;

FIG. 58 is a perspective view of the drive arm for the automatic version of the electrical connector inlet assembly illustrated in FIGS. 56 and 57;

DETAILED DESCRIPTION OF THE DRAWINGS

Figure 1:
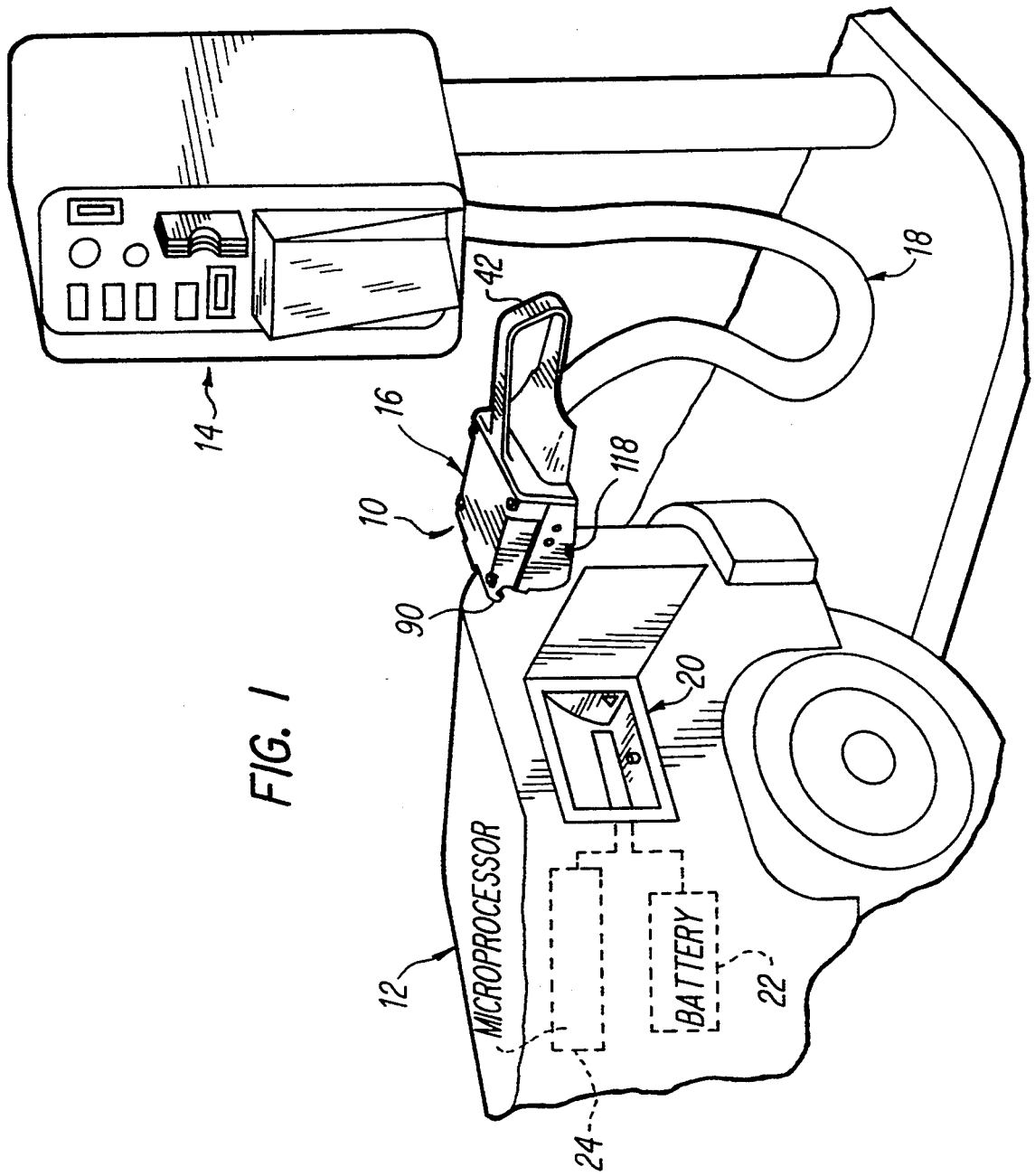
FIG. 1 is a partial perspective view of an electrical connector assembly in accordance with a first embodiment of the present invention and illustrated in connection with an electric vehicle and an electric recharging station.
Figure 2:
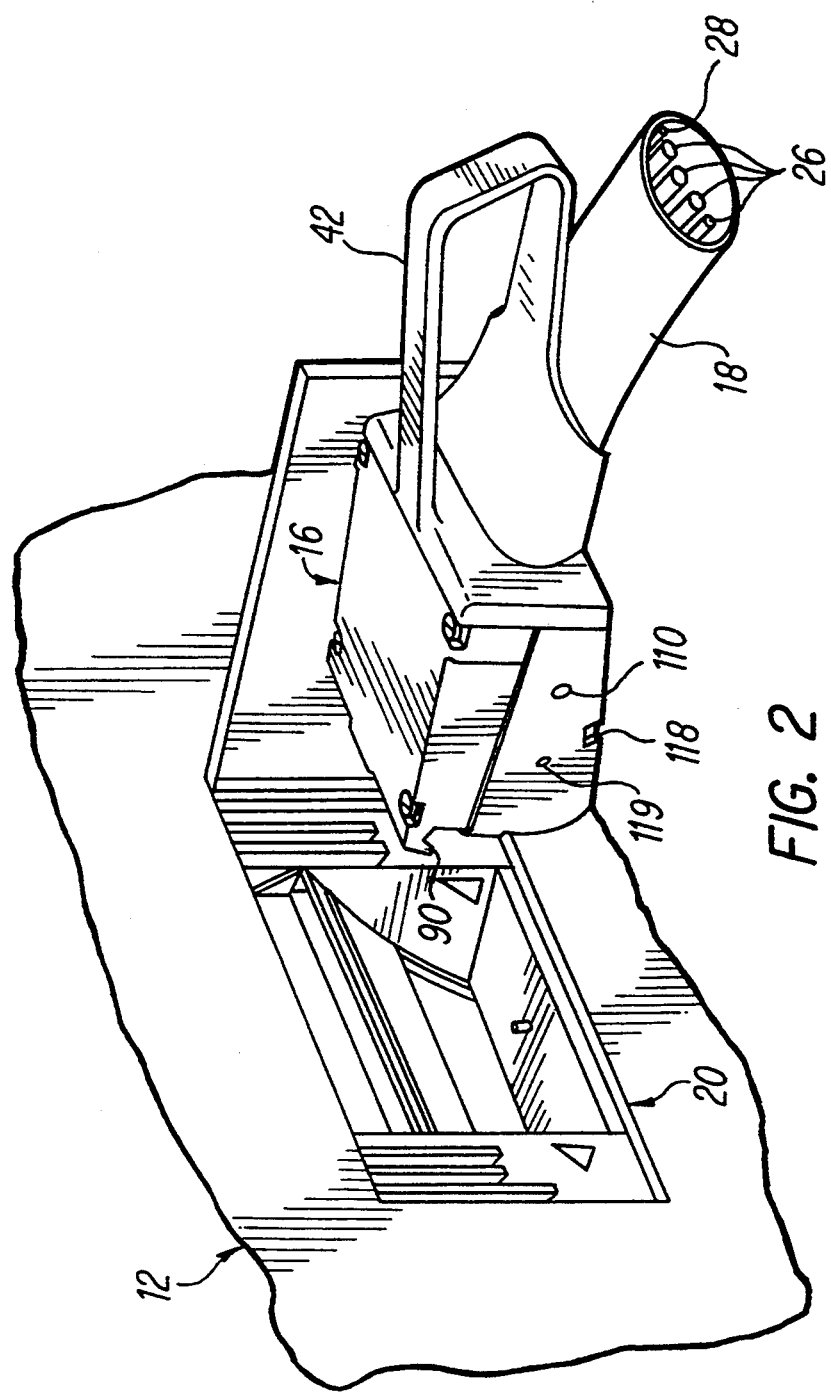
FIG. 2 is an enlarged, partial perspective view of the electrical connector assembly illustrated in FIG. 1 with certain parts broken away for clarity.
Figure 3:
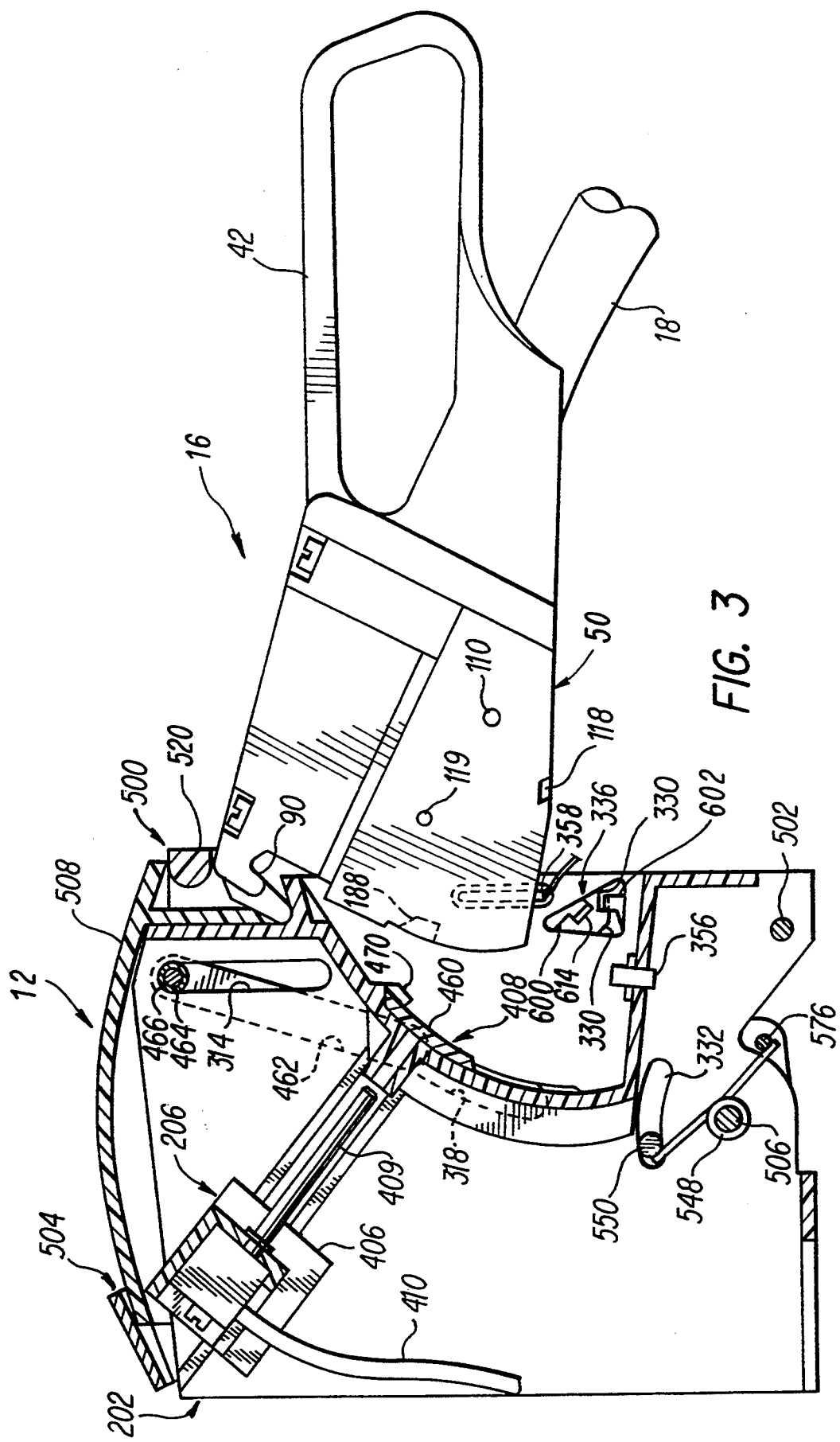
FIG. 3 is a partial elevational view of an electrical connector or plug just prior to full insertion into an electrical connector inlet assembly or receptacle which is shown in partial cross-section and with certain parts removed for clarity.
Figure 4:
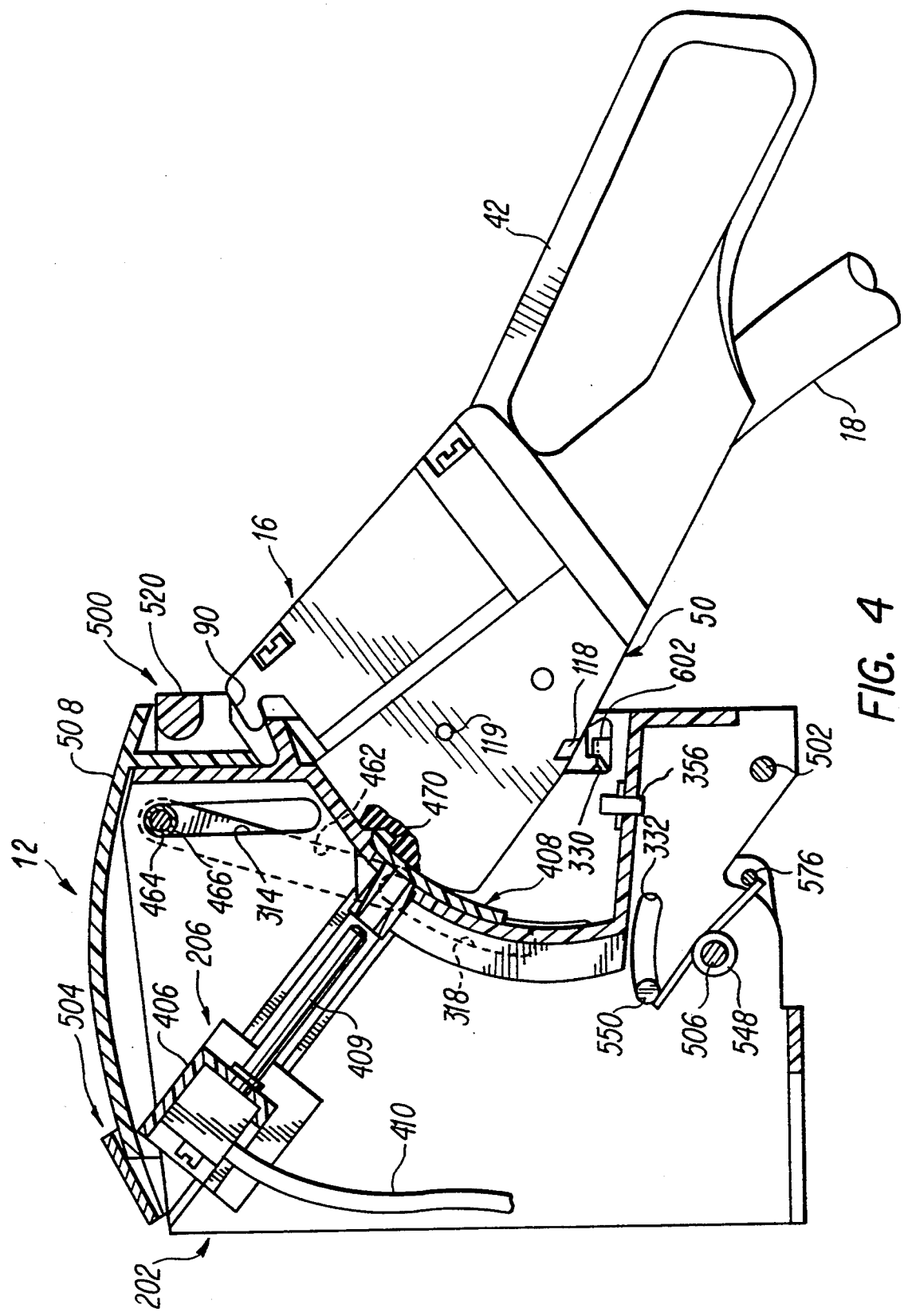
FIG. 4 is a partial elevational view of the electrical connector just after full insertion into the electrical connector inlet assembly which is shown in partial cross-section and with certain parts removed for clarity.
Figure 5:
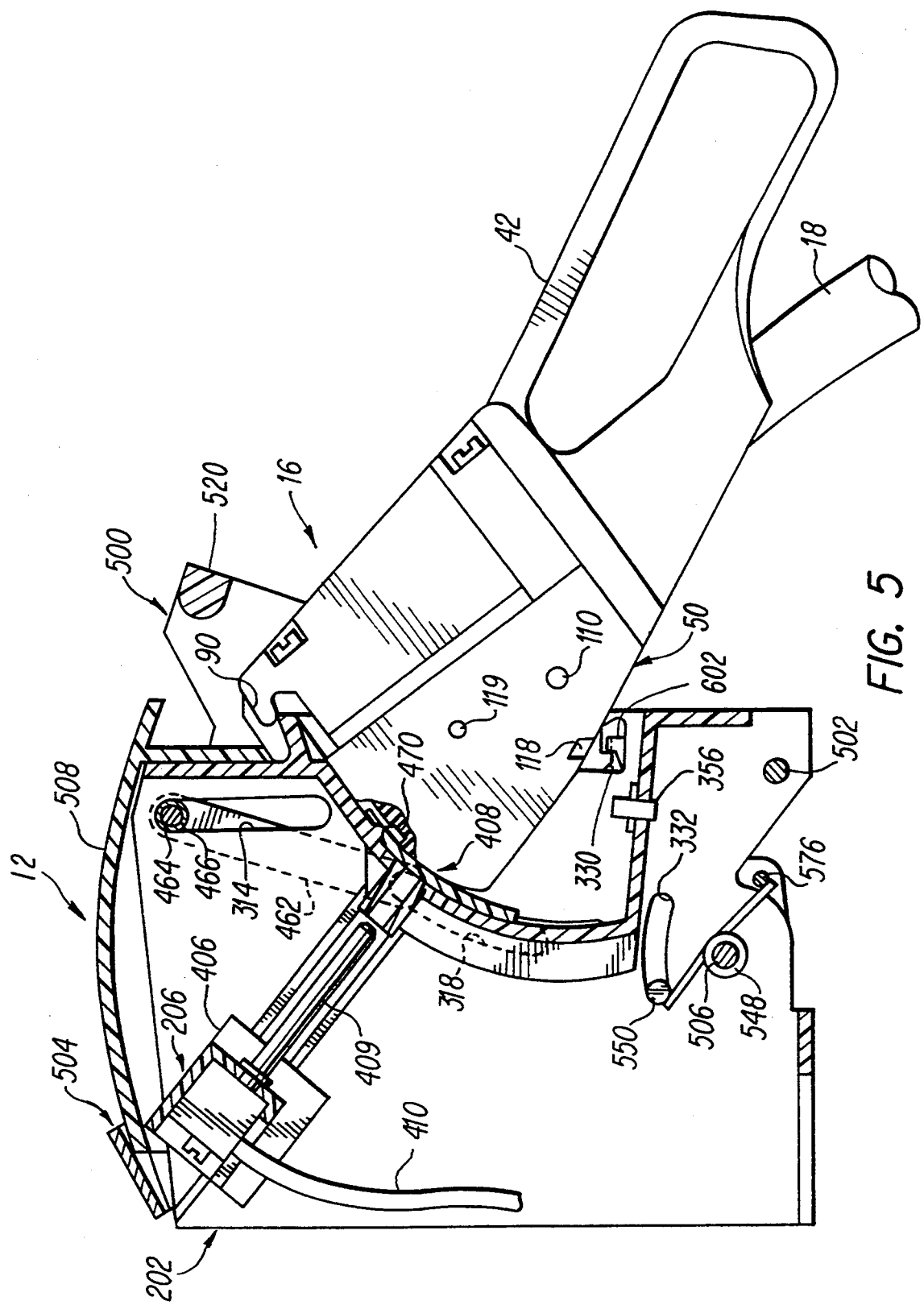
FIG. 5 is a partial elevational view of the electrical connector after full insertion into the electrical connector inlet assembly, which is shown in partial cross-section with certain parts removed for clarity and with the handle moved to the grab position.
Figure 6:
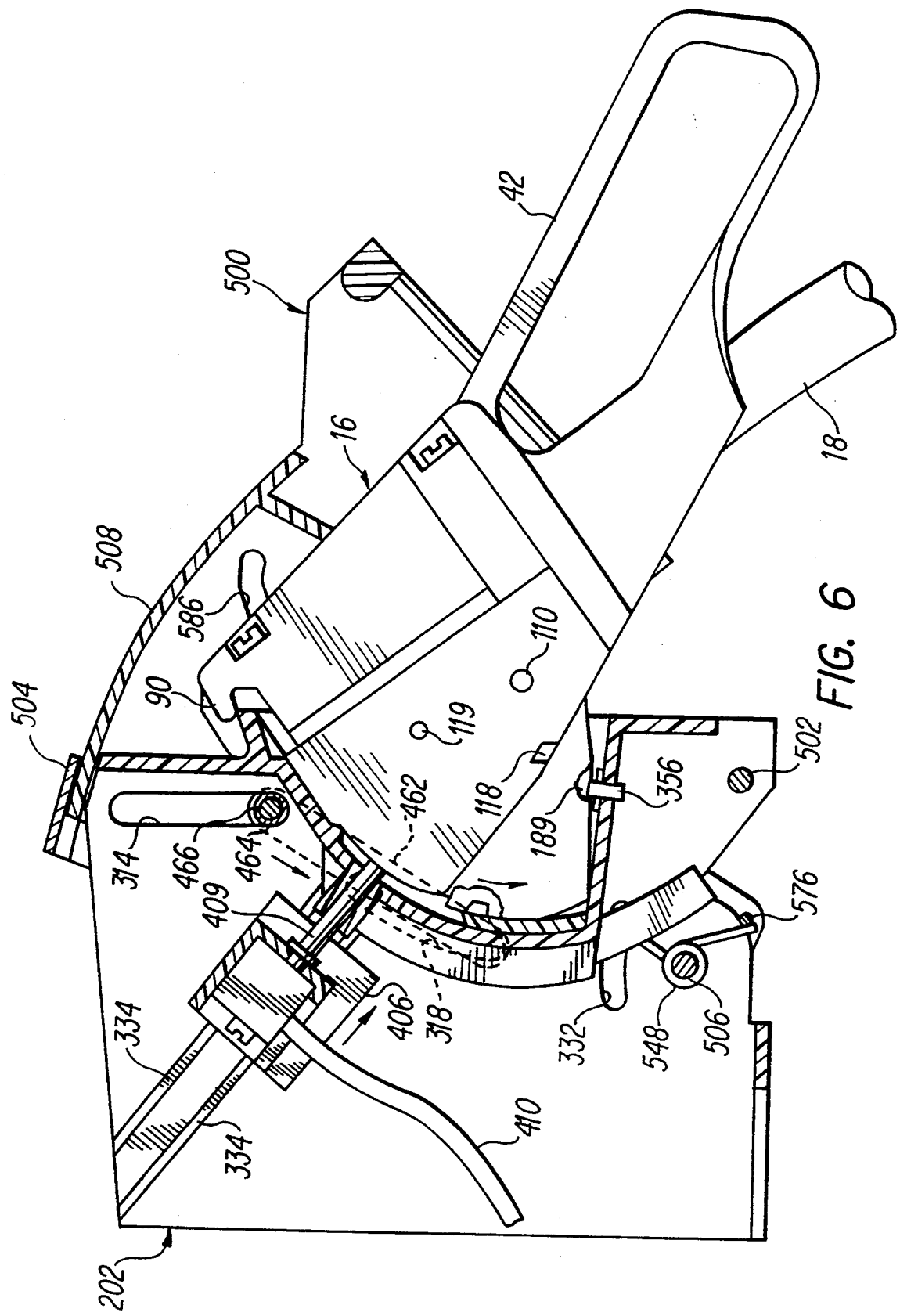
FIG. 6 is a partial elevational view of the electrical connector electrically coupled to the electrical connector inlet assembly, which is shown in partial cross-section with certain parts removed for clarity, and with the weathershield or hood fully extended.

Referring initially to FIGS. 1 and 2, an electrical connector assembly 10 especially designed for use with an electric car or vehicle 12 is illustrated in accordance with the present invention, and includes a power source or charging station 14 for dispensing electrical energy, a plug or male electrical connector 16 electrically coupled to power source 14 by an electrical and data/communications cable 18, a receptacle or female electrical connector inlet assembly 20 mounted in electric vehicle 12 for receiving electrical energy from electrical connector 16, a battery 22 located in vehicle 12 and electrically coupled to electrical connector inlet assembly 20 for receiving electrical energy therefrom, and an on-board microprocessor or computer 24 located in vehicle 12 for transmitting and receiving relevant data to and from power source 14 and to and from electrical connector inlet assembly 20 to control the operation thereof.

While electrical connector 16 and electrical connector inlet assembly 20 are illustrated in conjunction with an electric vehicle 12, it will become apparent from this disclosure that electrical connector 16 and electrical connector inlet assembly 20 can be used in many other electrical systems and applications. Moreover, it will be apparent to those skilled in the art from this disclosure that electrical connector 16 can be electrically coupled to battery 22 and on-board microprocessor 24 by cable 18, and that electrical connector inlet assembly 20 can be electrically coupled to the recharging station 14.

Power source or charging station 14 is preferably connected to the local electrical utility company's power line or to any other conventional source of electrical energy. Charging station 14 can be mounted in practically any location, including residential houses, apartment buildings, gas stations, parking garages, or even at the side of a curb so that power can be readily available to vehicle 12.

In residential applications, charging station 14 can be electrically connected in a conventional manner to a circuit breaker panel or power meter in a residential home or apartment. Electrical connections, breaker panels, and/or power meter are all conventional and well known, and thus they will not be discussed or illustrated in detail herein.

In commercial applications, charging station 14 can be constructed to use similar electronics as used in today's automated gas stations. For example, charging station 14 can be provided with a conventional power meter for determining the amount of electrical energy dispensed, a credit or debit card slot for payment of the dispensed electrical energy, and any other of the similar type of conveniences provided at automated gas stations. The electronics and circuits which can be used for operating charging station 14 in commercial applications are conventional and well known, i.e., similar electrical circuits are currently used to operate gas station pumps, and thus the electronics and circuits for charging station 14 will not be discussed or illustrated in detail herein.

Likewise, electric vehicle 12 with battery 22 and microprocessor 24 are all conventional and well known, and thus they will not be discussed or illustrated in detail.

Figure 7:
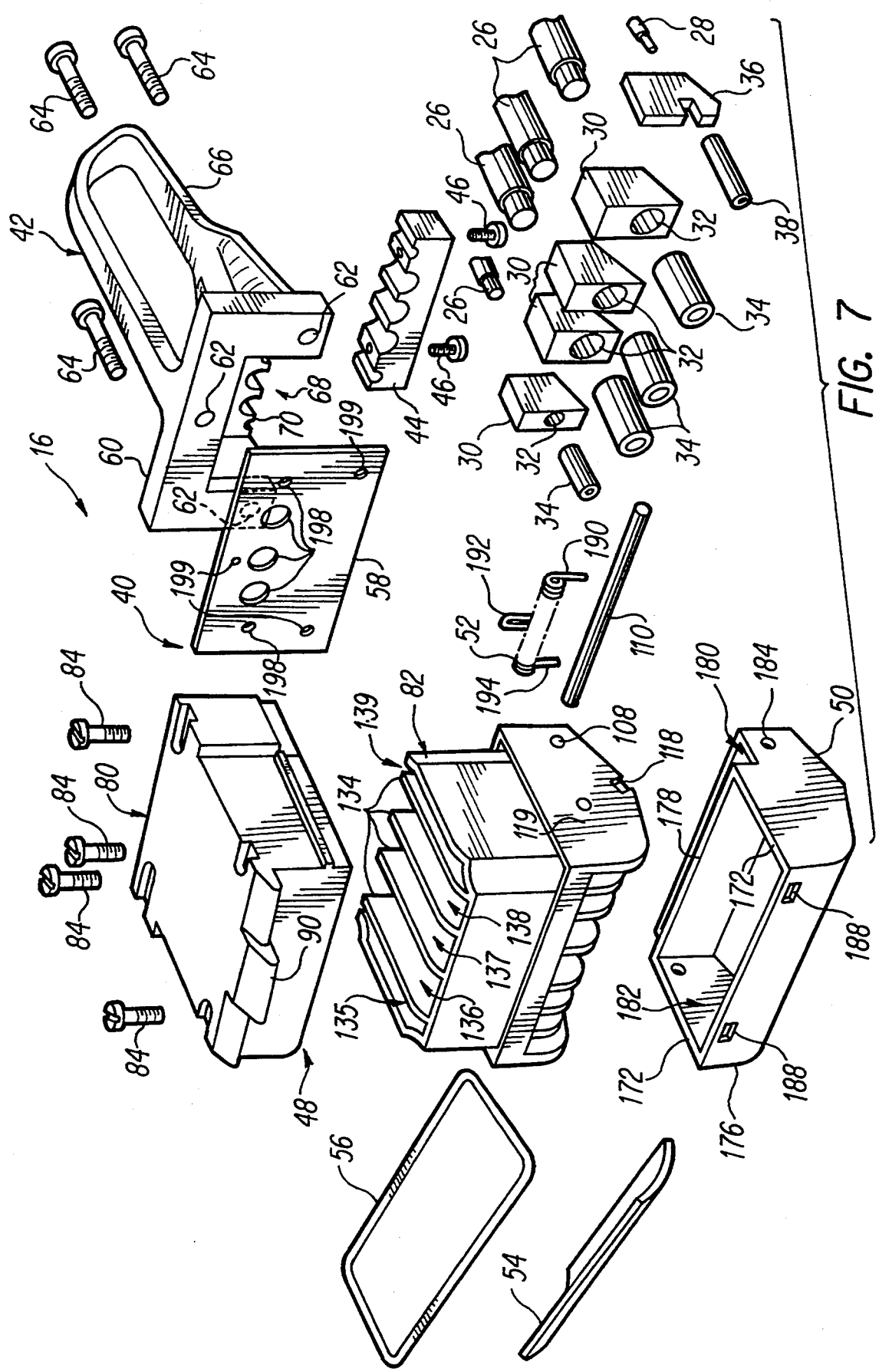
FIG. 7 is an exploded perspective view of the electrical connector or plug illustrated in FIGS. 1-6 in accordance with the present invention.

As seen in FIG. 7, cable 18 preferably includes four electrical power conductors 26 and a communications wire 28. Power conductors 26 are all substantially identical to each other, except that one of the conductors 26 is a ground, and the other three conductors 26 are current carrying-conductors.

Each conductor 26 is a conventional conductor with a conductive core and an insulating sheath covering the core. Accordingly, conductors, such as conductors 26, are well known, and thus will not be discussed or illustrated in detail herein.

Electrical Connector 16

As seen in FIG. 7, electrical connector 16 includes (1) four terminal blocks 30 with cylindrical bores 32 and cylindrical brush contacts 34, (2) a communications connector or data plug 36 with one or more communications contacts 38, and (3) an insulated housing 40 coupled to one end of cable 18 for housing contacts 34 and 38. Specifically, a terminal block 30 is fixedly coupled to one end of each of the conductors 26, while the other end of each of conductors 26 is electrically coupled to power source 14. Each terminal block 30 has a cylindrical bore 32 with a metallic, cylindrical, tubular brush contact 34 fixedly mounted within bore 32 and electrically coupled conductive to the core of the associated conductor 26.

Communications wire 28 is a conventional communications wire, and thus will not be discussed or illustrated in detail herein. While communications wire 28 is illustrated as a single conductor, it will be apparent from this disclosure that communications wire 28 is preferably a data plug with a plurality of insulated conductors which are each connected at one end to the electronic circuitry of power source 14 and at the other end to a plurality of contacts 38 contained in a communications connector 36. Communications connector or data plug 36 is a conventional connector with conventional electrical contacts 38 electrically connected to the insulated communications conductors. For example, communications wire 28 and communications connector 36 can be similar to a conventional telephone wire and telephone jacket which has a plurality of conductors and contacts. Accordingly, communications connector 36 as well as its contacts 38 will not be illustrated or discussed in detail herein.

Figure 8:
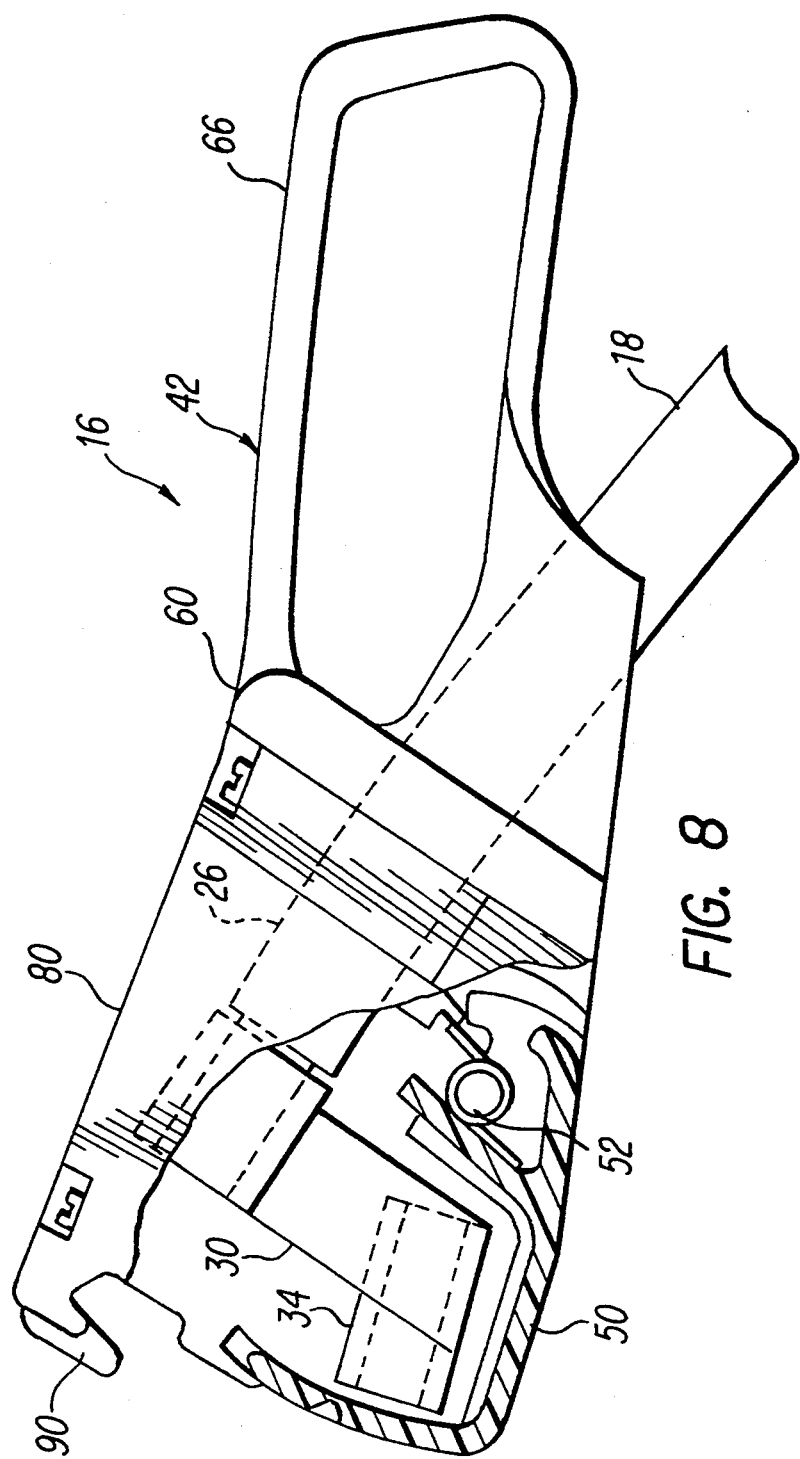
FIG. 8 is a schematic side elevational view of the electrical connector or plug illustrated in FIGS. 1-7 with a portion broken away to schematically show one of the contacts.
Figure 10:
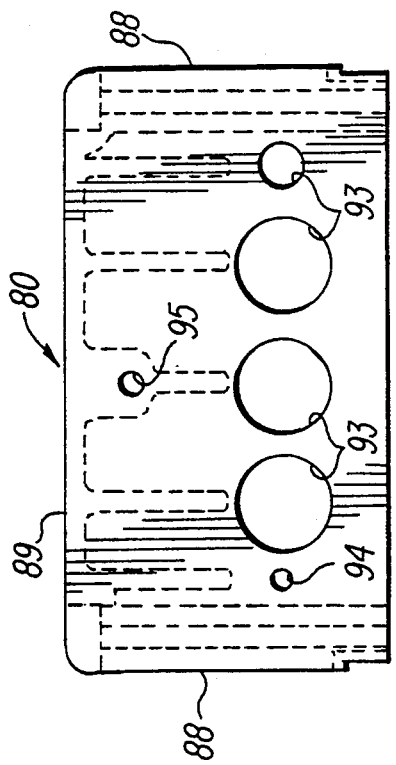
FIG. 10 is a rear elevational view of the upper half of the contact retainer body illustrated in FIG. 9.
Figure 12:
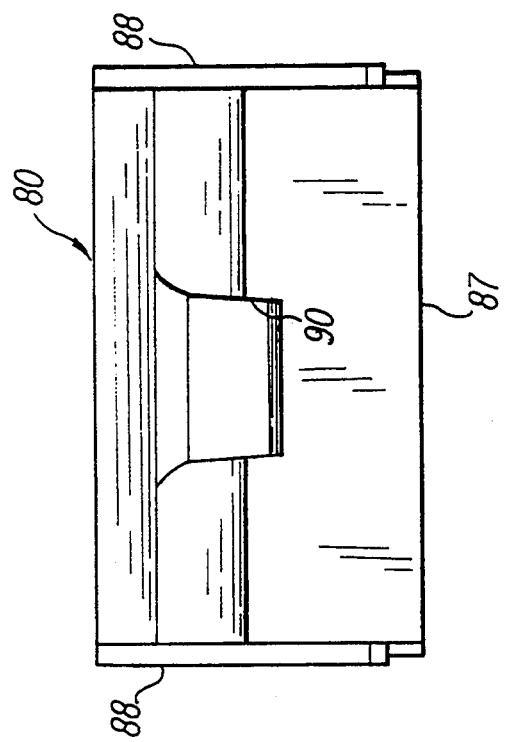
FIG. 12 is a front elevational view of the upper half of the contact retainer body illustrated in FIGS. 9-11.
Figure 9:
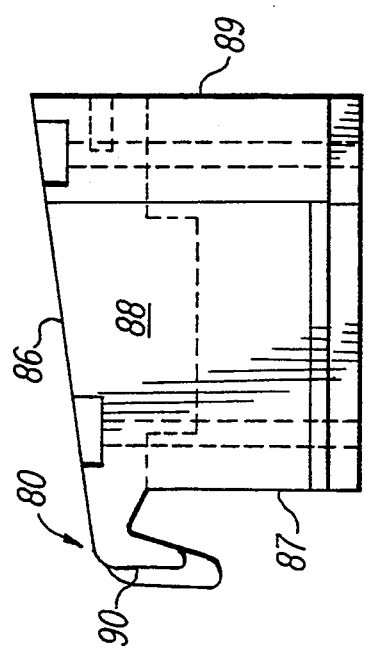
FIG. 9 is a right side elevational view of the upper half of the contact retainer body of the electrical connector or plug illustrated in FIGS. 1-9.
Figure 11:
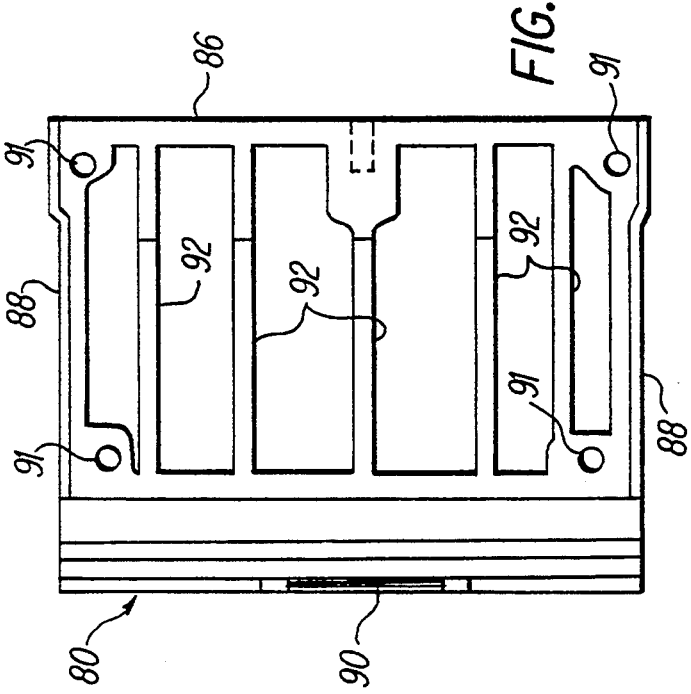
FIG. 11 is a bottom plan view of the upper half of the contact retainer body illustrated in FIGS. 9 and 10.
Figure 17:
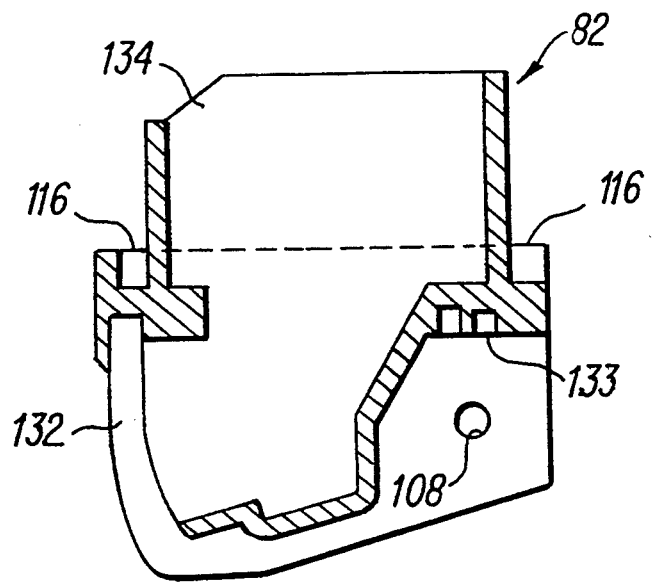
FIG. 17 is a cross-sectional view of the lower half of the contact retainer body illustrated in FIGS. 13-16 taken along line 17—17 of FIG. 13.

As seen in FIGS. 7 and 8, electrical connector 16 is coupled to the end of cable 18 for housing the contacts 34 and 38 of cable 18, and for selectively covering and exposing the contacts 34 and 38 of cable 18.

As particularly seen in FIG. 7, insulated housing 40 of electrical connector 16 is coupled to one end of cable 18 in a water-tight manner, and includes a handle portion 42, a cable clamp 44 removably coupled to handle portion 42 by two screws 46 for securing cable 18 thereto, a contact retainer body 48 for housing terminal blocks 30 and communications connector 36, a contact cover 50 pivotally coupled to contact retainer body 48 for selectively concealing and exposing the contacts 34 and 38 of cable 18, a torsion spring 52 coupled between contact retainer body 48 and contact cover 50 for biasing contact cover 50 to a closed position covering contacts 34 and 38, and three gaskets 54, 56 and 58 for protecting contacts 34 and 38 from the weather or other contaminants.

Handle portion 42 has a mounting portion 60 with three screw holes 62 for receiving screws 64 therethrough for attaching the handle portion 42 to the contact retainer body 48. The handle portion 42 also has a handle 66 extending rearwardly from mounting portion 60 and a cable receiving cavity 68 for receiving conductors 26 and communications wire 28 therein. Preferably, handle portion 42 is molded as an integral, one-piece, unitary member from a hard, rigid, non-conductive material such as plastic.

Cable receiving cavity 68 of electrical connector 16 has a cable clamping surface 70 with a pair of threaded holes (not shown) for threadedly receiving screws 46 to secure cable clamp 44 thereto. Specifically, conductors 26 and communications wire 28 are clamped between cable clamp 44 and cable clamping surface 70 for securing cable 18 to electrical connector 16. Preferably, cable clamping surface 70 and cable clamp 44 are both contoured with five complementary recesses for individually squeezing each of the power conductors 26 and communications wire 28 therebetween for securely clamping cable 18 to electrical connector 16.

As seen in FIGS. 7-17, contact retainer body 48 of electrical connector 16 includes an upper half or member 80 and a lower half or member 82 releasably coupled together by four screws or fasteners 84. Preferably, both the upper half 80 and the lower half 82 are molded as integral, one-piece, unitary members from hard, rigid non-conductive materials such as plastic.

Referring to FIGS. 9-12, upper half 80 includes a top wall 86, a front wall 87 extending from top wall 86, a pair of substantially identical side walls 88 extending from walls 86 and 87, a rear wall 89 extending between walls 86 and 88, and a hook 90 extending outwardly from the intersection of top wall 86 and front wall 87 for removably coupling electrical connector 16 to electrical connector inlet assembly 20 as discussed below.

Top wall 86 of upper half 80 has four holes 91 with one of the holes 91 being located at each of the corners for receiving screws 84 therethrough. Extending downwardly from top wall 86 are five positioning flanges 92 for engaging terminal blocks 30 and communications connector 36. In other words, positioning flanges 92 maintain power terminals 30 and communications connector 36 within lower half 82 to prevent movement therein.

The rear wall 89 of upper half 80 has four power conductor holes 93 for receiving power conductors 26 therethrough and one communications wire hole 94 for receiving communications wire 28 therethrough. Rear wall 89 also includes a threaded hole 95 for receiving one of the screws 64 to releasably couple contact retainer body 48 to handle portion 42.

Referring to FIGS. 7 and 13-17, lower half 82 of contact retainer body 48 has a pair of substantially identical side walls 100, a front wall 102, a rear wall 104 and a bottom wall 106. The side walls 100 are each provided with a circular hole 108 for receiving a pivot pin 110 therethrough. The side walls 100 have upper portions 112 and lower portions 114 which form a part of a ledge 116 therebetween so that the upper portions 112 of the side walls 100 are sized to be received between side walls 88 of upper half 80. In other words, lower portions 114 are spaced inwardly from upper portions 112 so that side walls 88 of upper half 80 sit on the ledge 116 of the lower half 82 when coupled together. The lower portions 114 of side walls 100 are each provided with a notch 118 which engages a portion of the electrical connector inlet assembly 20 as discussed below. One or both of the lower portions 114 of side walls 100 have a magnet 119 mounted therein for activating microprocessor 24 as discussed below in more detail.

Front wall 102 of lower half 82 has a upper portion 120 and a lower portion 122 with a large front opening 124 communicating with the interior space of lower half 82. Upper portion 120 is spaced inwardly from lower portion 122 for forming a part of ledge 116. Opening 124 is sized to frictionally receive gasket 54 therein.

Rear wall 104 of lower half 82 has a pair of threaded openings 126 for receiving two of screws 64 therein. Rear wall 104 also has five cutouts 127-131 for allowing conductors 26 and communications wire 28 to enter the interior space of lower half 82 of contact retainer body 48.

Bottom wall 106 of lower half 82 is recessed from the bottom edges of side walls 100 so as to form a cavity 132 for receiving contact cover 50 therein. Specifically, bottom wall 106 is substantially U-shaped so that cavity 132 is substantially U-shaped. Accordingly, contact cover 50 is received completely recessed within cavity 132. Bottom wall 106 has a notch 133 for engaging torsion spring 52 for biasing contact cover 50 to a closed position as discussed below.

The lower half 82 of contact retainer body 48 further includes four substantially identical dividers 134 which divide the interior of the lower half 82 of contact retainer body 48 into five contact receiving cavities 135-139. In particular, dividers 134 are substantially parallel with side walls 100 for maintaining terminal blocks 30 and communications connector 36 substantially parallel and aligned with one another. The middle three cavities 136, 137 and 138 are substantially identical in size and shape, while end cavity 135 is slightly smaller than middle cavities 136, 137 and 138. End cavity 139 is even smaller than the remaining cavities for receiving the communications connector 36 therein.

Ledge 116 has four threaded bores 140 for threadedly receiving screws 84 to secure upper half 80 of contact retainer body 48 to lower half 82 of contact retainer body 48. Of course, upper and lower halves 80 and 82 could be permanently fastened together by an adhesive or other fastening device.

Figure 18:
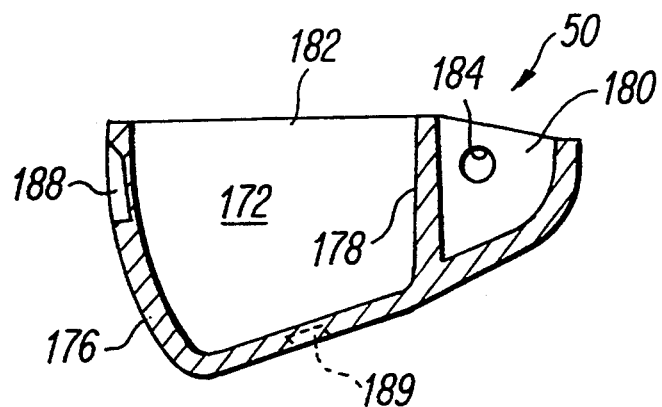
FIG. 18 is a cross-sectional view of the contact cover of the electrical connector or plug illustrated in FIGS. 1-8.

As seen in FIGS. 7 and 18, contact cover 50 includes a pair of substantially identical side walls 172 with a curved cover plate 176 extending therebetween and a divider plate 178 extending between side walls 172 so as to form a pair of recesses 180 and 182.

Each of the side walls 172 has a pivot hole 184 for receiving pivot pin 110 therethrough for pivotally coupling contact cover 50 to lower half 82 of contact retainer body 48. Pivot holes 184 are positioned to communicate with recess 180 so that pivot pin 110 passes through recess 180. Accordingly, recess 180 of contact cover 50 is sized to receive torsion spring 52 thereon. In particular, torsion spring 52 is wrapped around pivot pin 110 for engaging both contact cover 50 and lower half 82 of contact retainer body 48 for biasing contact cover 50 to its closed position against retainer body 48.

Cover 50 also has a pair of spaced notches 188 in the front portion of curved cover plate 176 for pivoting contact cover 50 between its open and closed positions by electrical connector inlet assembly 20 as discussed below. A locking recess 189 is formed in the bottom surface of curved cover plate 176 for engaging a portion of electrical connector inlet assembly 20 to retain electrical connector 16 relative to electrical connector inlet assembly 20.

Recess 182 of contact cover 50 is sized to encompass the lower portions of cavities 135-139. Accordingly, contact cover 50 completely conceals the contacts 34 and 38 when in the closed position.

As seen in FIG. 7, torsion spring 52 is a conventional torsion spring constructed of resilient wire which is helically wrapped. Torsion spring 52 has a first end 190, an intermediate tab 192 and a second end 194. First and second ends 190 and 194 engage divider plate 178 of contact cover 50, while the tab portion 192 engages notch 133 formed in bottom wall 108 of lower half 82 of contact retainer body 48.

As seen in FIG. 7, gaskets 54, 56 and 58 are conventional gaskets made of resilient material such as foam or rubber. Gasket 54 is curved and has five circular openings (not shown) therethrough for receiving the contacts of the electrical connector inlet assembly 20 therethrough as discussed below.

Gasket 56 is substantially circular in cross-section and forms a rectangular ring which is frictionally retained around bottom wall 106 within cavity 132 of lower half 82 of retainer body 48 so that the upper edges of side walls 172 as well as the upper edge of the curve cover plate 176 engages gasket 56 to ensure that the contact remained sealed when the cover 50 is in the closed position.

Gasket 58 is positioned between handle portion 42 and contact retainer body 48 for sealing the interface therebetween. In particular, gasket 58 is substantially rectangular with five circular openings 198 for receiving conductors 26 and communications wire 28 therethrough. Preferably, the holes 198 are sized to cause a friction fit around the conductors 26 and communications wire 28 so as to create a seal therebetween. The gasket 58 also has three of holes 199 for receiving screws 64 therethrough.

Electrical Connector Inlet Assembly 20

Referring now to FIGS. 19–53, electrical connector inlet assembly 20 includes (1) an outer stationary inlet housing 200 fixedly coupled to vehicle 12, (2) an inner movable inlet housing 202 movably coupled to outer inlet housing 200, (3) a universal joint assembly 204 for movably coupling inner inlet housing 202 to outer inlet housing 200, (4) an inlet contact assembly 206 movably coupled to inner inlet housing 202, (5) an actuation assembly 208 movably coupled to inner inlet housing 202 for operating inlet contact assembly 206, and (6) a break-away assembly 210 for releasing electrical connector 16 from electrical connector inlet assembly 20 upon application of an excessive force between electrical connector 16 and electrical connector inlet assembly 20.

Outer Inlet Housing 200

Referring to FIGS. 20–23 and 40–50, outer inlet housing 200 is preferably molded as an integral, one-piece, unitary member from a hard, rigid non-conductive material such as plastic. Outer inlet housing 200 has a top wall 220, a pair of substantially identical side walls 222 extending downwardly and substantially perpendicularly to top wall 220, a bottom wall 226 extending between the lower ends of side walls 222, a rear wall 228 for mounting outer inlet housing 200 to vehicle 12, and an open front 230 for receiving inner movable inlet housing 202 therethrough. Accordingly, outer inlet housing 200 is rigidly coupled to vehicle 12 and movably supports inner inlet housing 202 to vehicle 12 as discussed below.

Top wall 220 of outer inlet housing 200 has an inverted U-shaped channel 234 and a pair of flat sections 236 and 238 extending outwardly from inverted U-shaped channel 234 to side walls 222 of outer inlet housing 200. Inverted U-shaped channel 234 has a pair of horizontally aligned pivot holes 240 extending therethrough with their longitudinal axis extending substantially perpendicular to side walls 222. Pivot holes 240 are horizontally aligned to receive a portion of universal joint assembly 204 for pivotally coupling inner inlet housing 202 about a horizontal axis between side walls 222 of outer inlet housing 200.

Side walls 222 of outer inlet housing 200 are preferably substantially flat planar members which extend substantially perpendicular to top wall 220 as well as bottom wall 226 and rear wall 228. Side walls 222 are substantially parallel to each other, and spaced apart for receiving inner inlet housing 202 therebetween.

Bottom wall 226 is a substantially flat wall with a mounting hole 242 extending therethrough for mounting a portion of break-away assembly 210 thereto. Bottom wall 226 is substantially parallel to flat sections 236 and 238 of top wall 220 and spaced from top wall 220 for receiving inner inlet housing 202 therebetween.

Rear wall 228 of outer inlet housing 200 has three mounting holes 244 for fixedly and rigidly securing outer inlet housing 200 to vehicle 12. The rear wall 228 also has a conductor mounting section 246 formed along its lower end for securing the electrical conductors of the inlet contact assembly 206 thereto as discussed below in more detail.

Conductor mounting section 246 includes five passageways 251, a clamping plate 256 removably coupled to rear wall 228 by four screws 258 to overly portions of passageways 251 and to secure the inlet conductors thereto. Passageways 251 are defined by four dividers 261 as well as by a first flange 266 with five cutouts 271 and a second flange 276 with five cutouts 277. Dividers 261 extend from the rear wall 228 into the interior of outer inlet housing 200. Dividers 261 are tapered at their free ends and provide insulation between the inlet conductors.

Inner Inlet Housing 202

Figure 24:
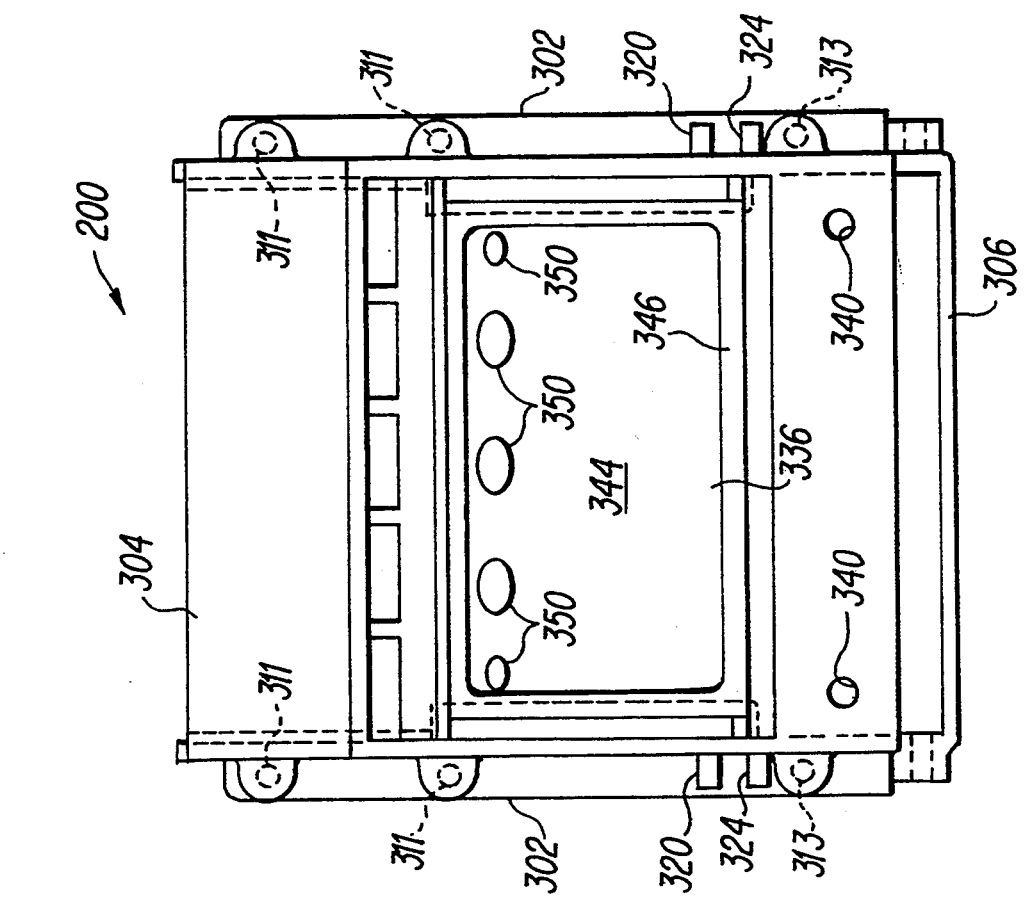
FIG. 24 is a front elevational view of the inner inlet housing of the electrical connector inlet assembly illustrated in FIGS. 19 and 20.
Figure 23:
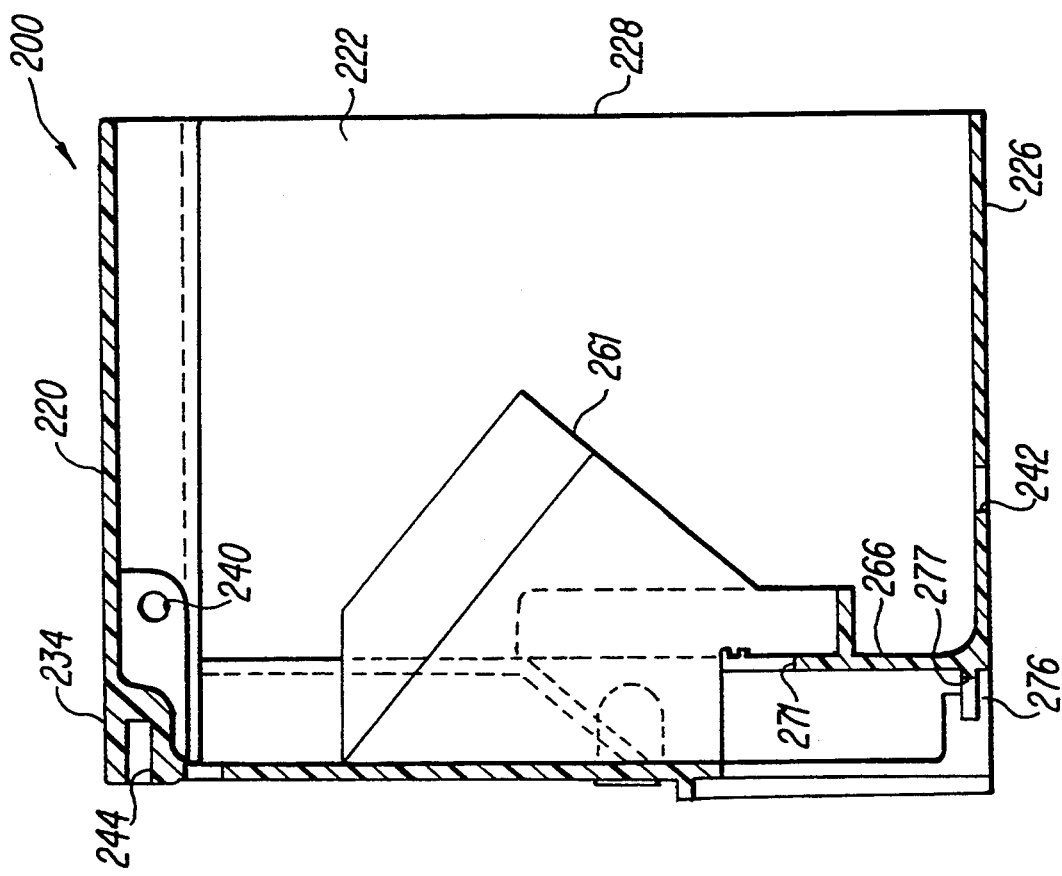
FIG. 23 is a longitudinal cross-sectional view of the outer inlet housing of the electrical inlet assembly illustrated in FIGS. 19-22.
Figure 26:
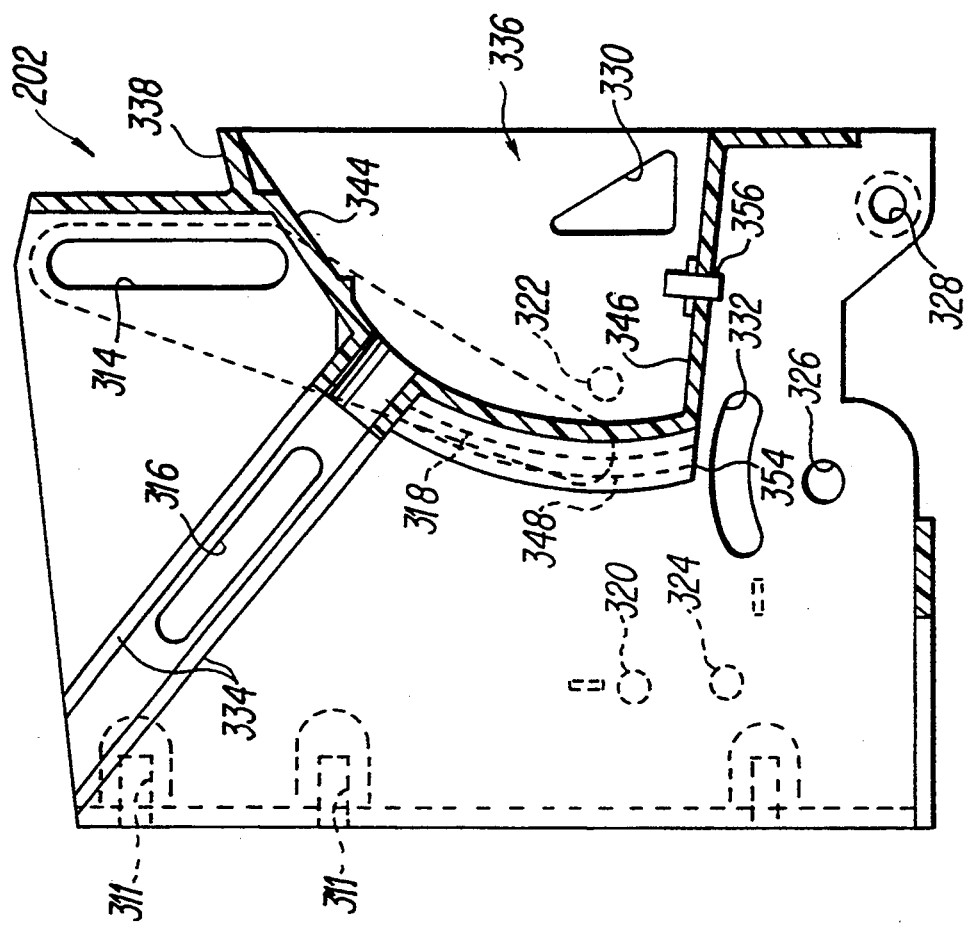
FIG. 26 is a longitudinal cross-sectional view of the inner inlet housing of the electrical connector inlet assembly shown in FIGS. 19, 20, 24 and 25.
Figure 25:
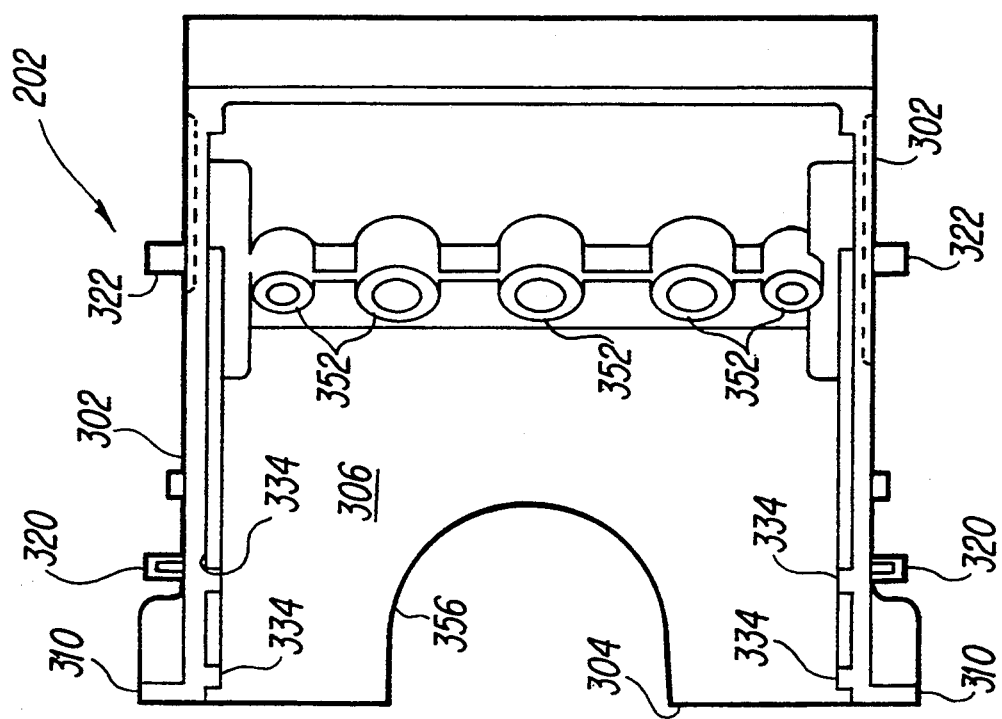
FIG. 25 is a top plan view of the inner inlet housing of the electrical connector inlet assembly illustrated in FIGS. 19, 20 and 24.

Referring to FIGS. 24–26, inner inlet housing 202 includes a pair of substantially identical side walls 302, a front contoured wall 304 extending between side walls 302, and a bottom wall 306 extending between side walls 302. Preferably, inner inlet housing 202 is molded as an integral, one-piece, unitary member from a hard, rigid non-conductive material such as plastic. Inner inlet housing 202 is movably coupled to outer inlet housing 200 by universal joint assembly 204 as discussed below.

Side walls 302 of inner inlet housing 202 are substantially identical, and thus like reference numerals will be used to identify the same parts on each of the side walls 302. Each of the side walls 302 includes an outwardly extending mounting flange 310 with a pair of upper mounting holes 311 for mounting a portion of universal joint assembly 204 to inner inlet housing 202 via screws (not shown), and a lower mounting hole 313 for mounting a portion of break-away assembly 210 to inner inlet housing 202.

Each of the side walls 302 further includes a vertical control slot 314, an angled control slot 316, and a curved control slot 318. Control slots 314, 316 and 318 control the movement of the inlet contact assembly 206 relative to inner inlet housing 202 for exposing and extending the inlet contacts as well as concealing and retracting the inlet contacts.

Each of the side walls 302 is also provided with three pivot pins 320, 322 and 324, two pivot holes 326 and 328, a triangular clearance opening 330 and an arcuate clearance opening 332 for coupling actuation assembly 208 thereto as discussed below in more detail. The inside surface of each of the side walls 302 has a pair of rails 334 extending parallel to angled control slot 316 for engaging and controlling the movement of part of the inlet contact assembly 206 as discussed below.

Front wall 304 of inlet housing 202 includes an inlet cavity 336 for receiving electrical connector 16 therein, a ledge 338 for cooperating with hook 90 of electrical connector 16, a pair of threaded holes 340 for securing the front portion of universal joint assembly 204 thereto by screws 342.

Inlet cavity 336 is formed by a substantially curved wall 344 and a lower flat wall 346 which extend between side walls 302 to form an inlet pocket with a rectangular opening for receiving electrical connector 16 thereon. Curved wall 344 includes an arcuate recess 348 positioned adjacent each of the side walls 302 of inner inlet housing 202. Recesses 348 are arcuate and aligned with curved slots 318 formed in side walls 302. Curved wall 344 also includes five spaced contact openings 350 and five reinforcing tubes 352 extending from the interior surface of curved wall 344 and aligned with contact openings 350.

Lower wall 346 of inlet cavity 336 includes a pair of clearance openings 354 which are aligned with recesses 348, and a locking pin 356 projecting upwardly into inlet cavity 336 for engaging recess 189 formed in contact cover 50 of electrical connector 16. The clearance openings 354 permit movement of the inlet contact assembly 206, while locking pin 356 retains electrical connector 16 within inlet cavity 336, as discussed below.

Bottom wall 306 of inner inlet housing 202 is substantially planar and extends between side walls 302. Bottom wall 306 is provided with a semicircular cutout 356 for accommodating a part of the break-away assembly 310 as discussed below.

Figure 42:
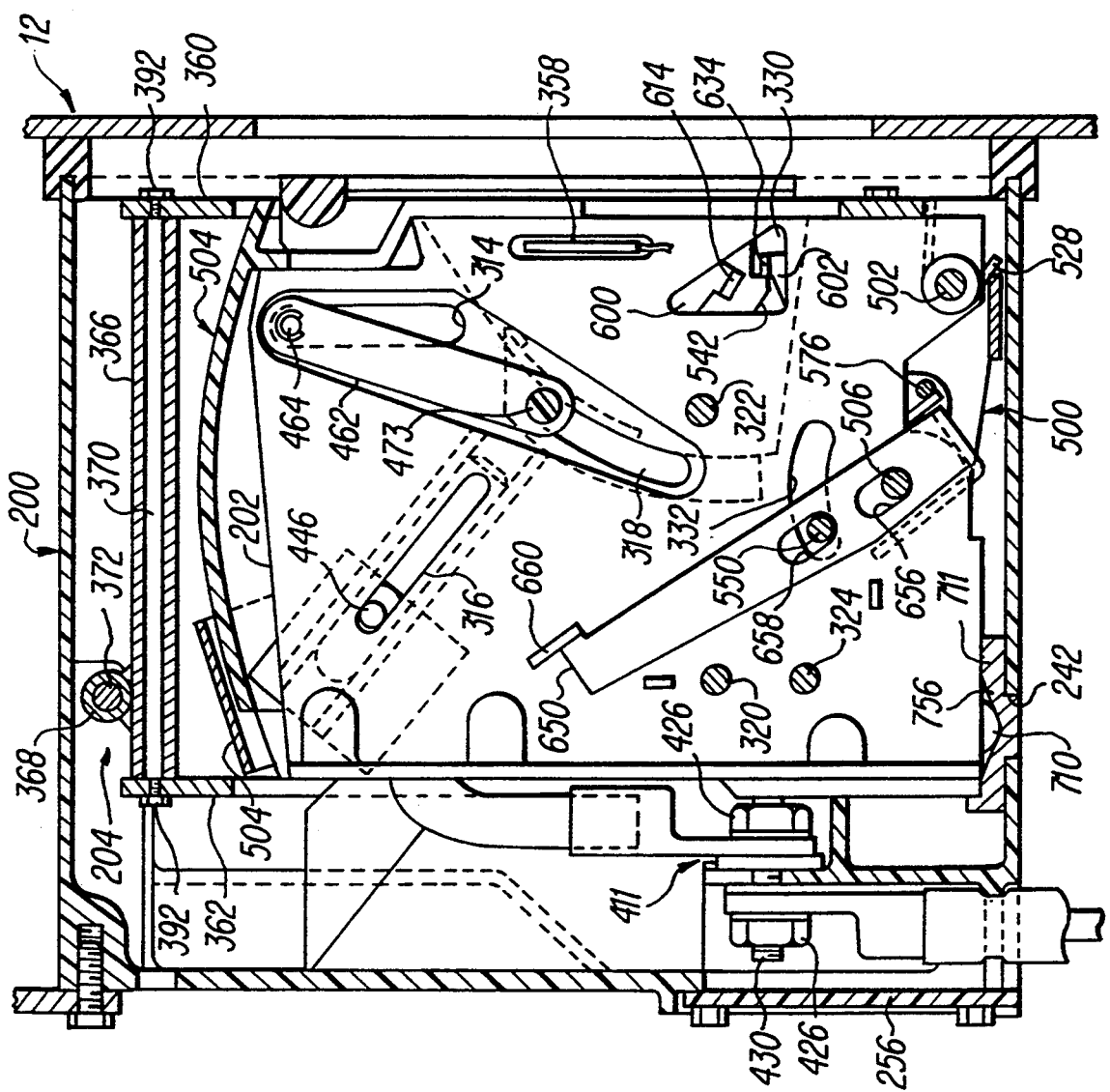
FIG. 42 is a cross-sectional view of the electrical connector inlet assembly taken along a vertical plane illustrating the release latch in the retracted position.
Figure 43:
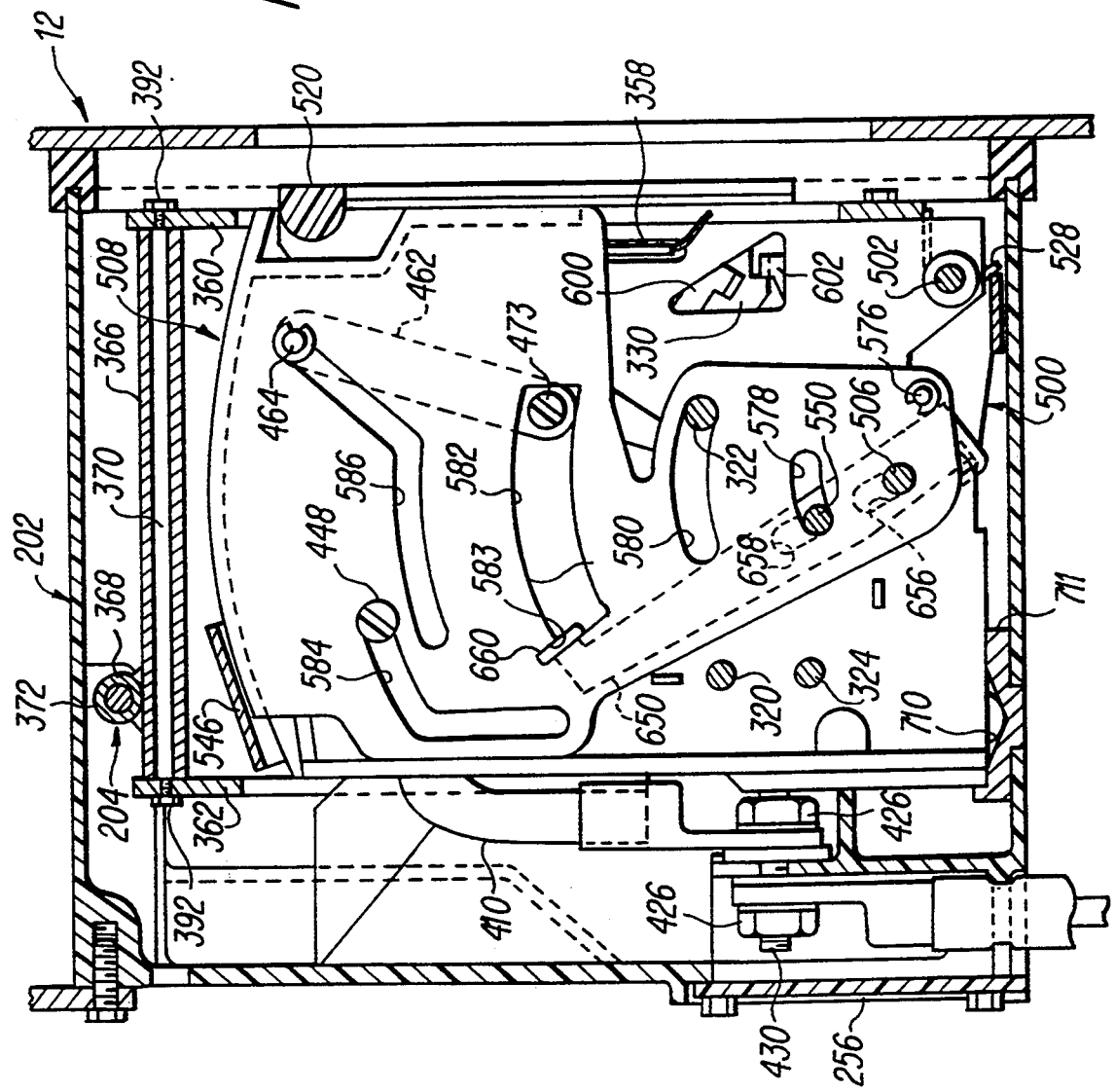
FIG. 43 is a cross-sectional view of the electrical connector inlet assembly taken along a vertical plane illustrating the cam plate in the retracted position.
Figure 44:
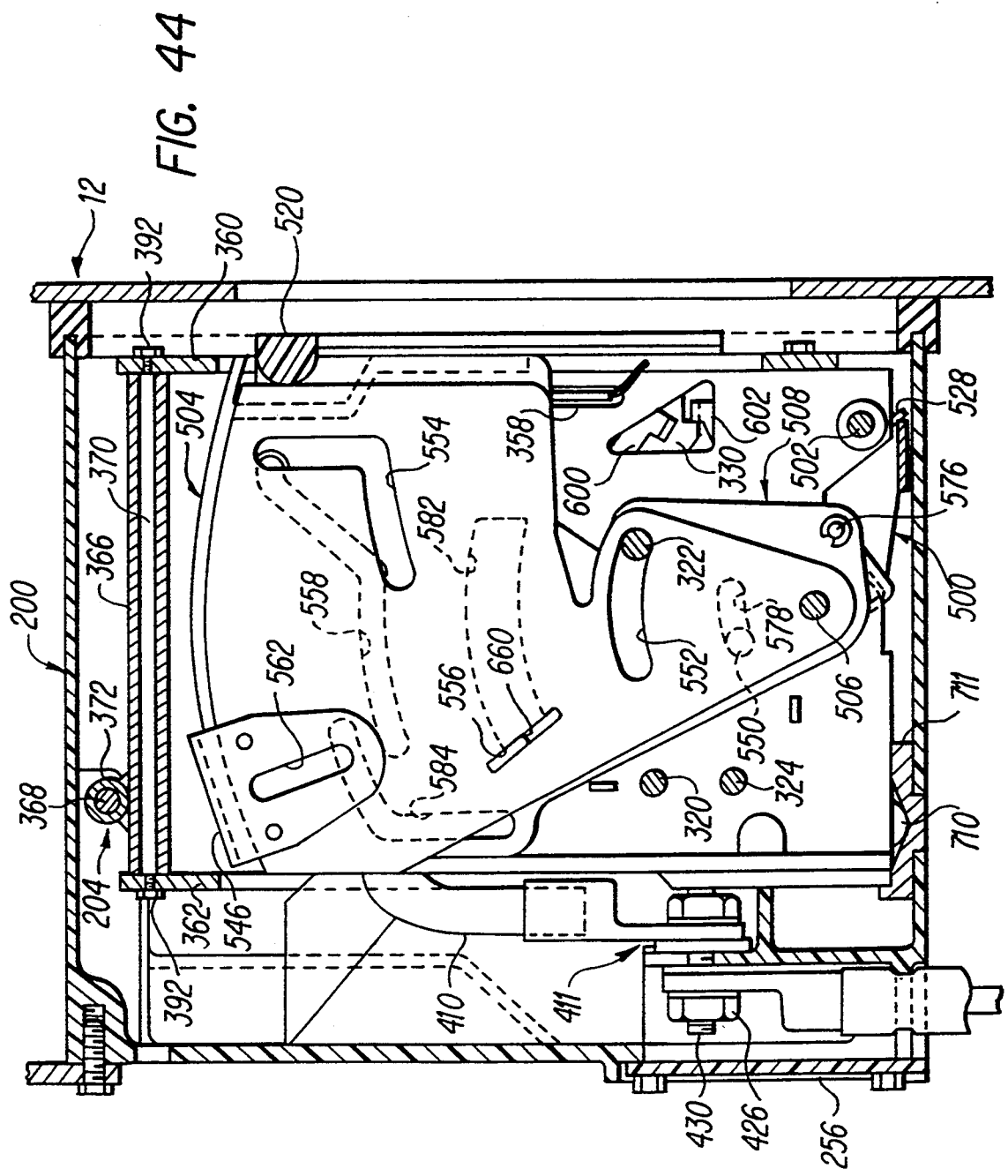
FIG. 44 is a cross-sectional view of the electrical connector inlet assembly taken along a vertical plane illustrating the drive plate in the retracted position.
Figure 45:
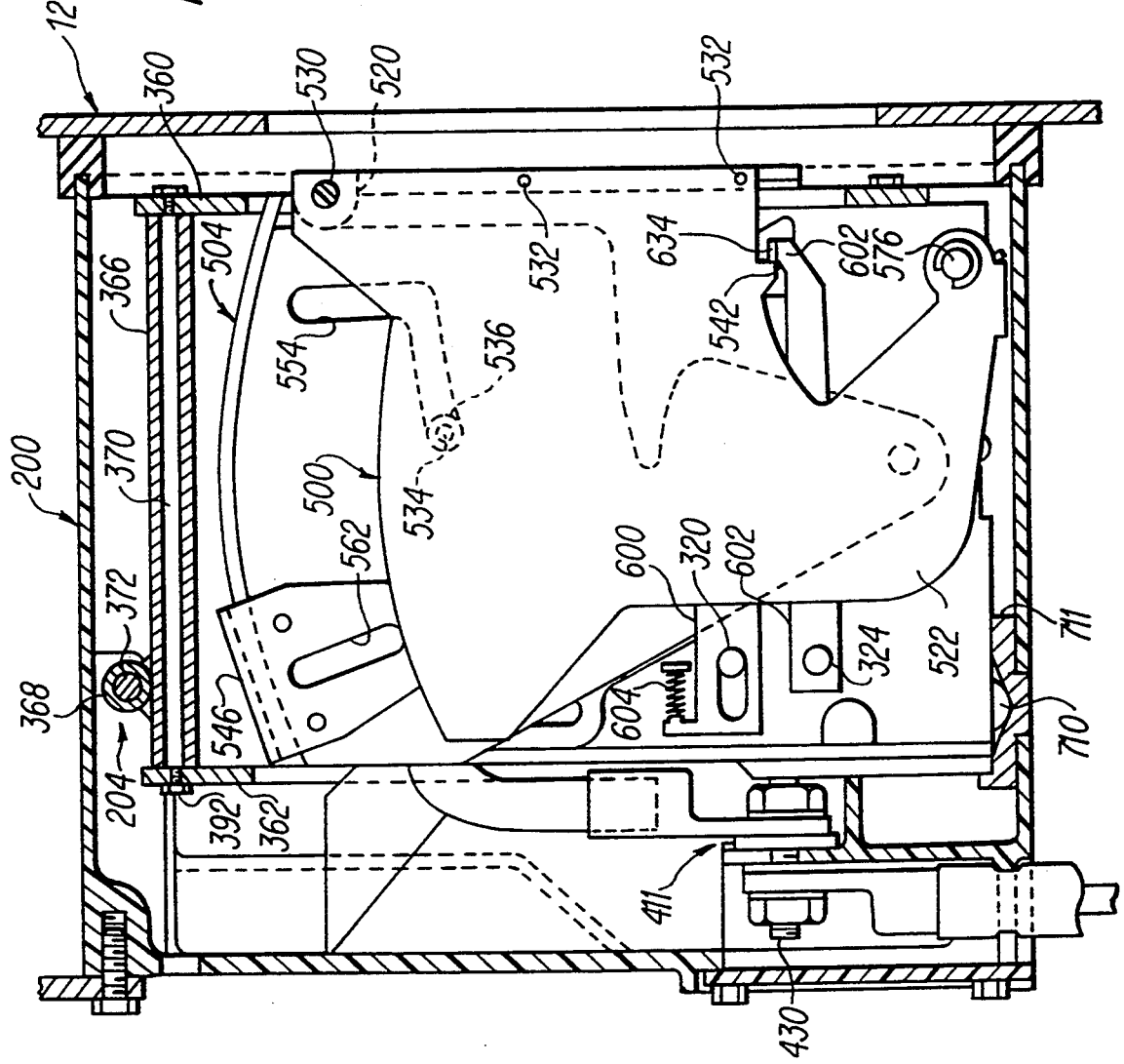
FIG. 45 is a cross-sectional view of the electrical connector inlet assembly taken along a vertical plane illustrating the actuation plate in the retracted position.
Figure 46:
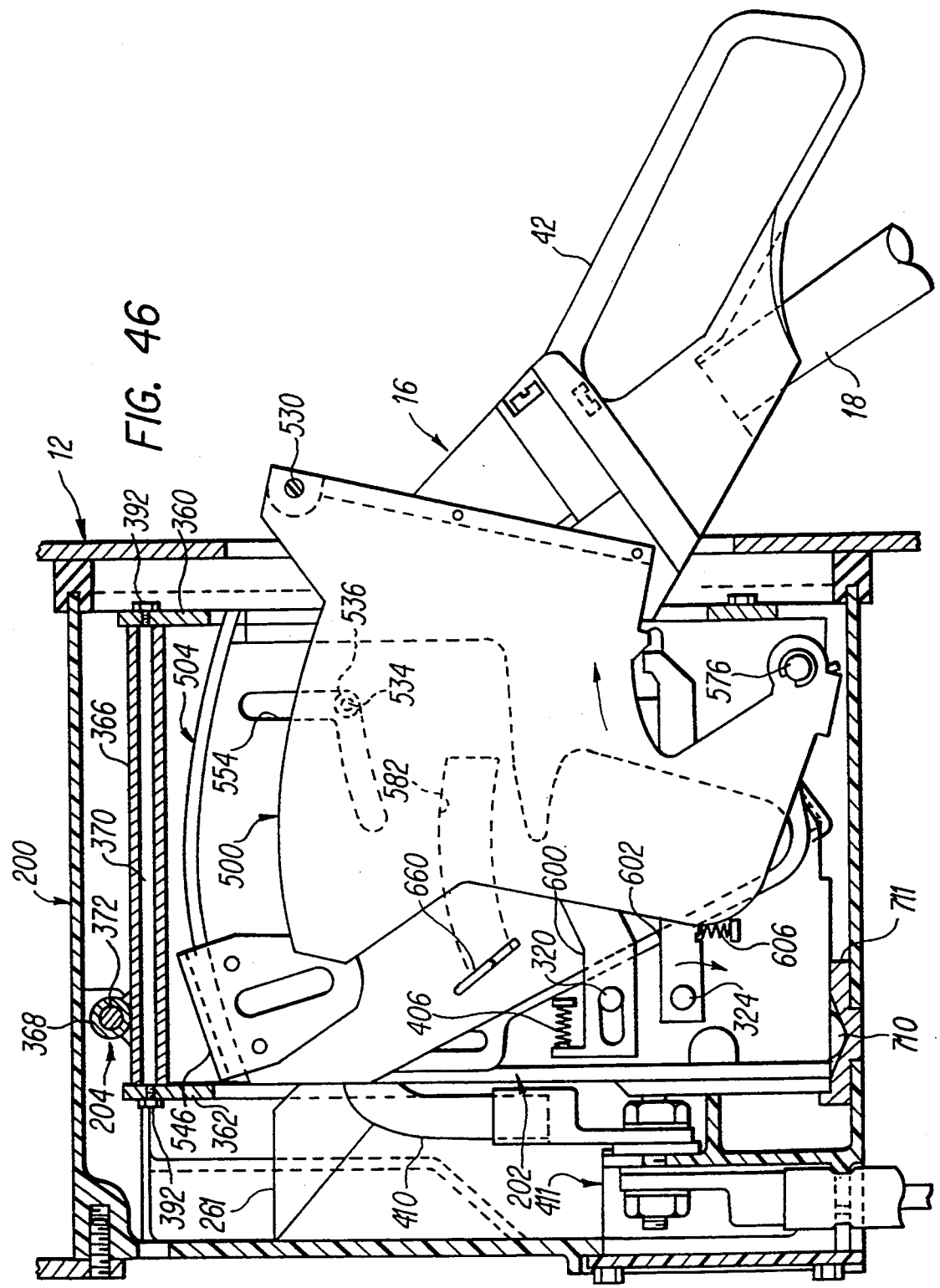
FIG. 46 is cross-sectional view of the electrical connector inlet assembly taken along a vertical plane illustrating the actuation plate in a grab position.
Figure 47:
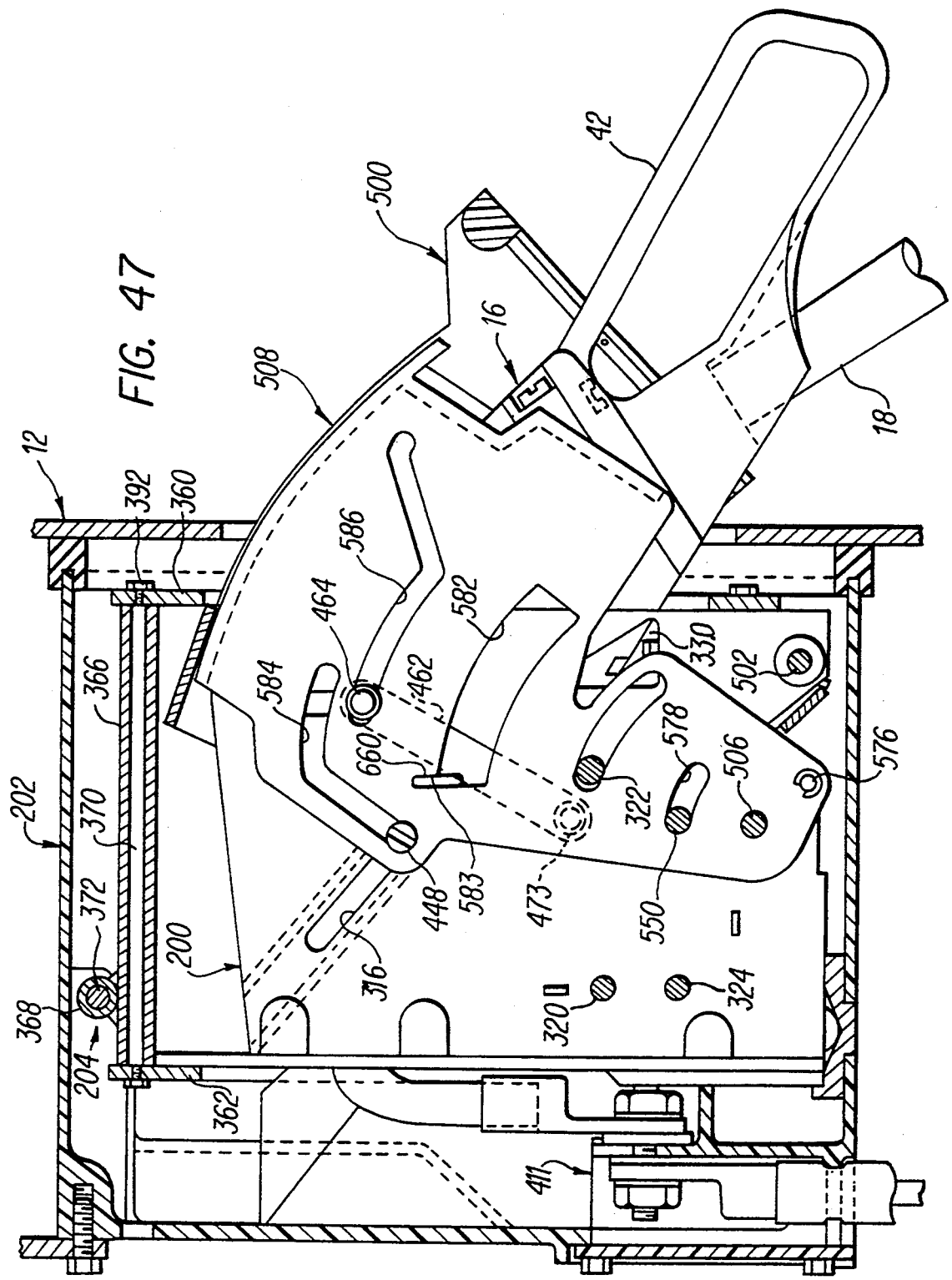
FIG. 47 is a cross-sectional view of the electrical connector inlet assembly taken along a vertical plane illustrating the cam plate in an extended position.
Figure 48:
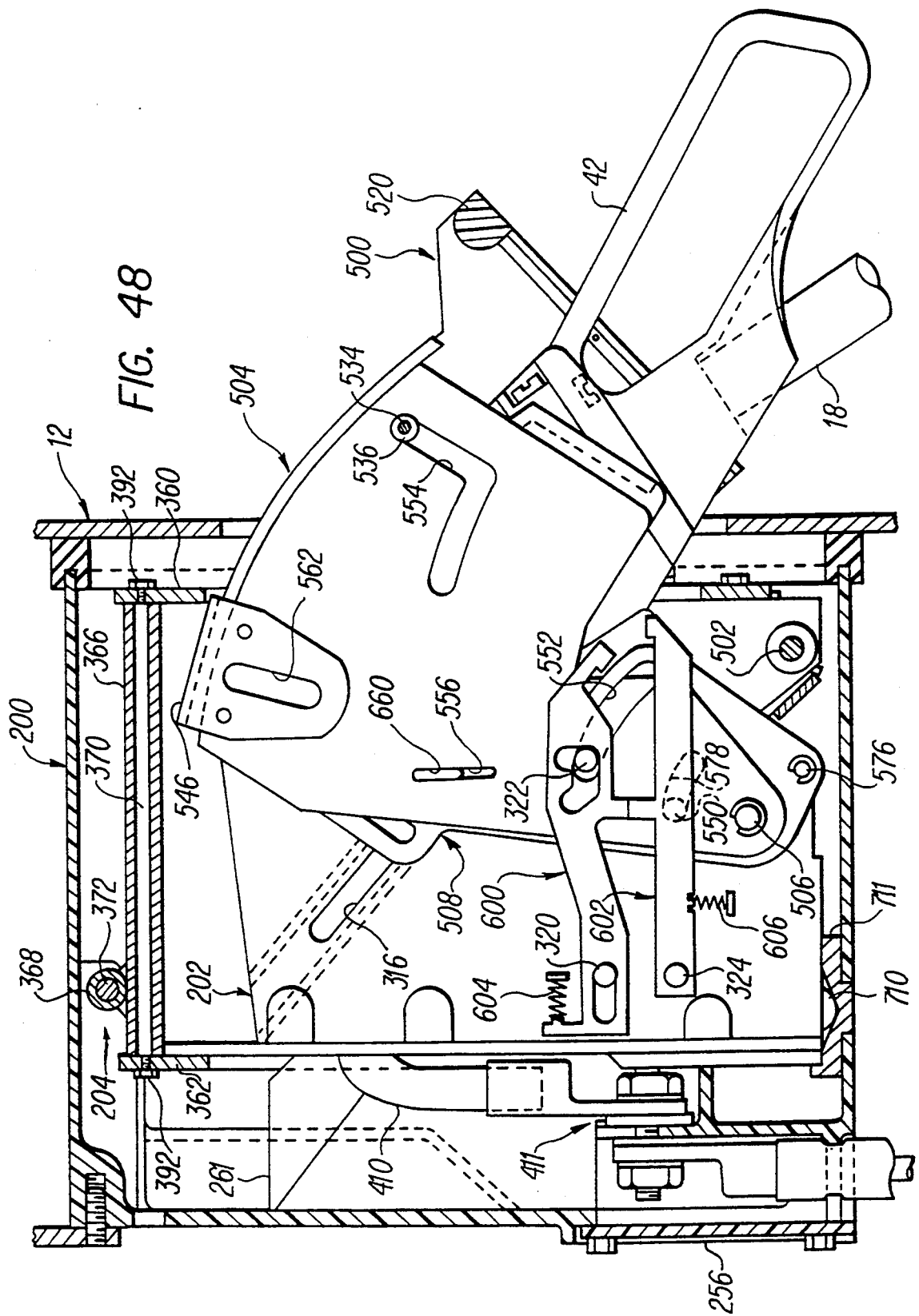
FIG. 48 is a cross-sectional view of the electrical connector inlet assembly taken along a vertical plane illustrating the drive plate in the extended position.
Figure 49:
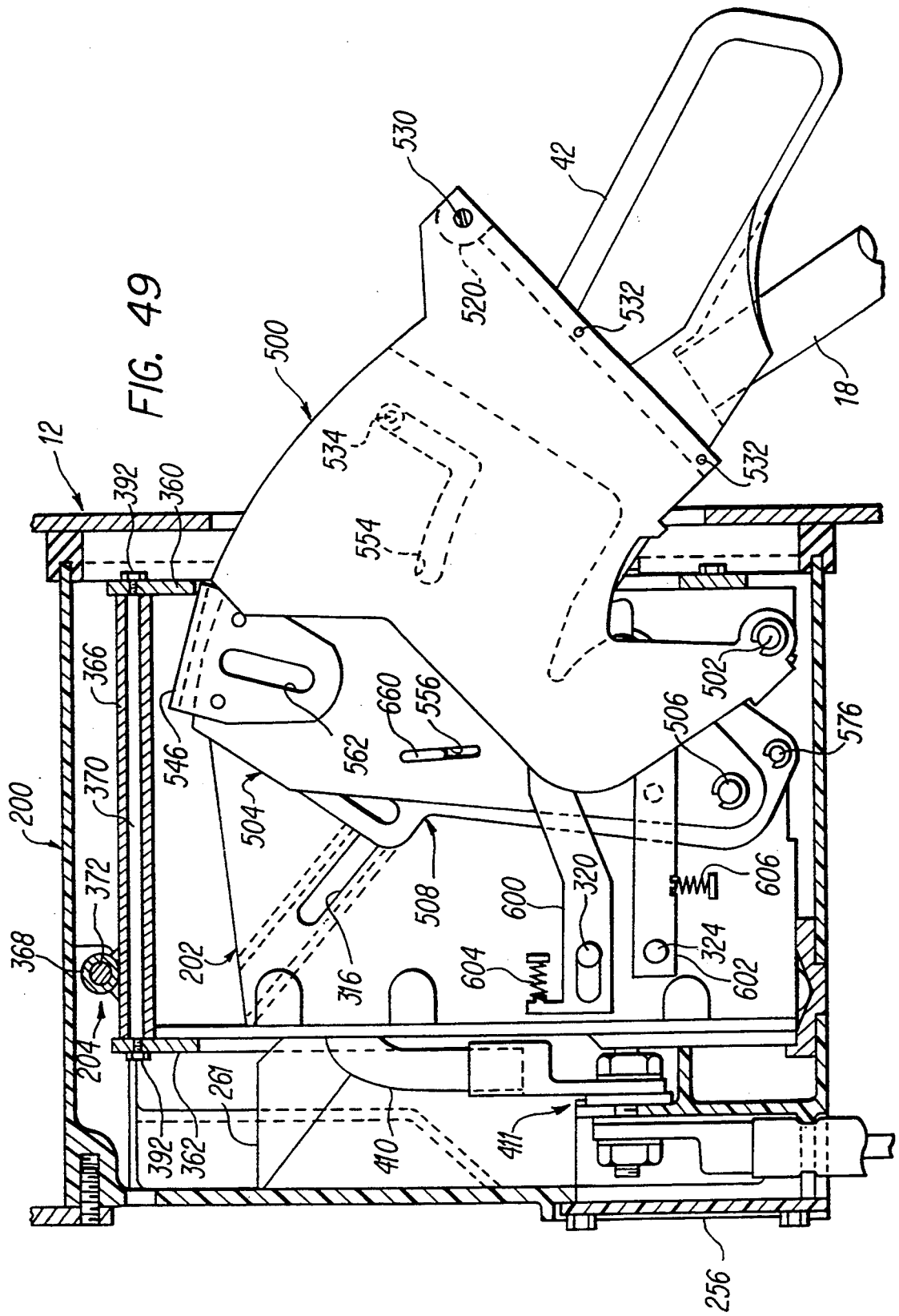
FIG. 49 is a cross-sectional view of the electrical connector inlet assembly taken along a vertical plane illustrating the actuation plate in the extended position.

Optionally, a sensor 358 can be mounted in a recess formed in each of the side walls 302 of inner inlet housing 202 adjacent inlet cavity 336 as seen in FIG. 42. Sensors 358 are electrically coupled to microprocessor 24 to provide various information to the microprocessor such as the charging capability of electrical connector 16.

In particular, sensors 358 are preferably reed switches coupled to the side walls 302 of inner inlet housing 202 adjacent inlet cavity 336. Sensors 358 are activated by one or more of the magnets 119 on electrical connector 16. Specifically, when electrical connector 16 is inserted into cavity 336 of electrical inlet connector assembly 20, one or more of the magnets 119 will be positioned adjacent the reed switches or sensors 358 for activating microprocessor 24. Accordingly, microprocessor 24 will not be actuated until the electrical connector 16 is correctly positioned within inlet cavity 336. If the electrical connector 16 is absent from inlet cavity 336 or not correctly positioned within the inlet cavity 336, the reed switches or sensors 358 will sense the absence or incorrect positioning of the electrical connector 16 to prevent the contact pins 409 and the hood 510 from being extended.

Reed switches or sensors 358 are conventional reed switches or sensors, and thus, will not be discussed or disclosed in detail herein. Moreover, their electrical connections with microprocessor 24 are conventional electrical connections which will not be disclosed or illustrated in detail herein. Basically, reed switches 358 preferably include a pair of spaced contacts which are normally open, but closed when subjected to the magnetic field of magnets 119. Accordingly, the closing of the contacts of the reed switches 358 conveys information to microprocessor 24 as discussed below.

Magnets 119 are mounted in side walls 100 of electrical connector 16 so that they are positioned adjacent one or more of the sensors 358. Specifically, by selecting one or more magnets 119, the reed switches 358 can signal the microprocessor 24 to indicate the current flow or amperage rating of the electrical connector 16.

In other words, by selecting the number of magnets 119, it is possible to indicate whether a slow charge, fast charge or normal charge is being supplied to vehicle 12 by electrical connector 16. More specifically, if a magnet is applied to the right side wall 100 of electrical connector 16, then the corresponding sensor 358 will be activated by the right side magnet to indicate a slow charge. If a magnet is coupled to the left side wall 100 of electrical connector 16 with no magnet on the right side wall 100 of electrical connector 16, then electrical connector 16 will activate the left side sensor 358 of the inlet assembly 20 to indicate a normal charge to microprocessor 24. If a magnet 119 is attached to both the right and left side walls 100 of electrical connector 16, then both the right and left sensors 358 will be activated by the magnets 119 to indicate a fast charge to the microprocessor 24.

In this manner, microprocessor 24 can adjust the circuitry of vehicle 12 to accommodate the amperage rating or magnitude of power from the electrical connector 16. In addition, microprocessor 24 can send a signal via communications wire 28 to power source 14 to prevent any current flow from electrical connector 16 to inlet assembly 20, if the electrical connector 16 is incompatible with the circuitry of the vehicle 12.

Universal Joint Assembly 204

Figure 19:
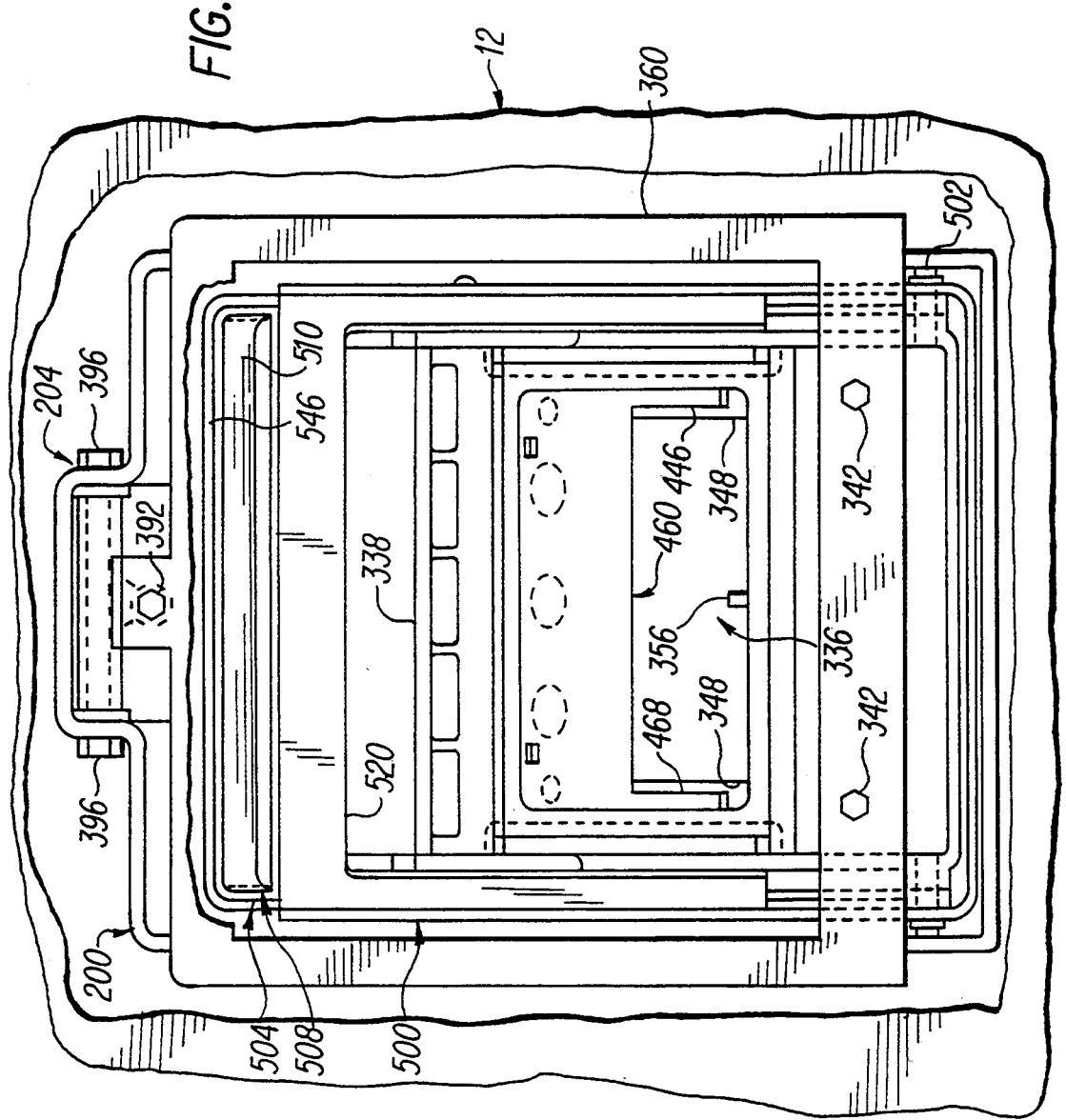
FIG. 19 is a front elevational view of the electrical connector inlet assembly or receptacle in accordance with the present invention with certain parts removed for clarity.
Figure 20:
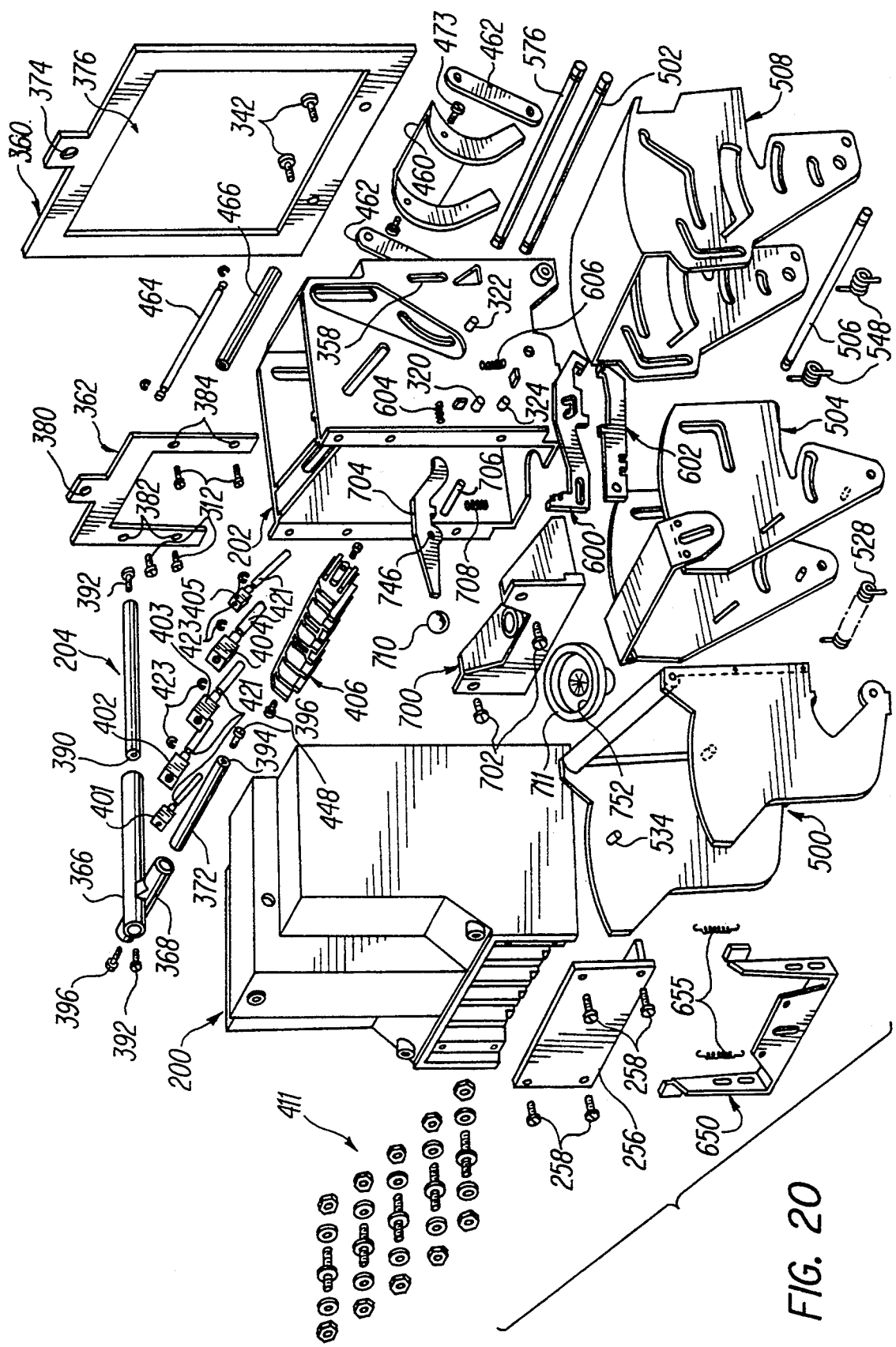
FIG. 20 is an exploded perspective view of selected parts of the electrical connector inlet assembly or receptacle illustrated in FIG. 19.
Figure 22:
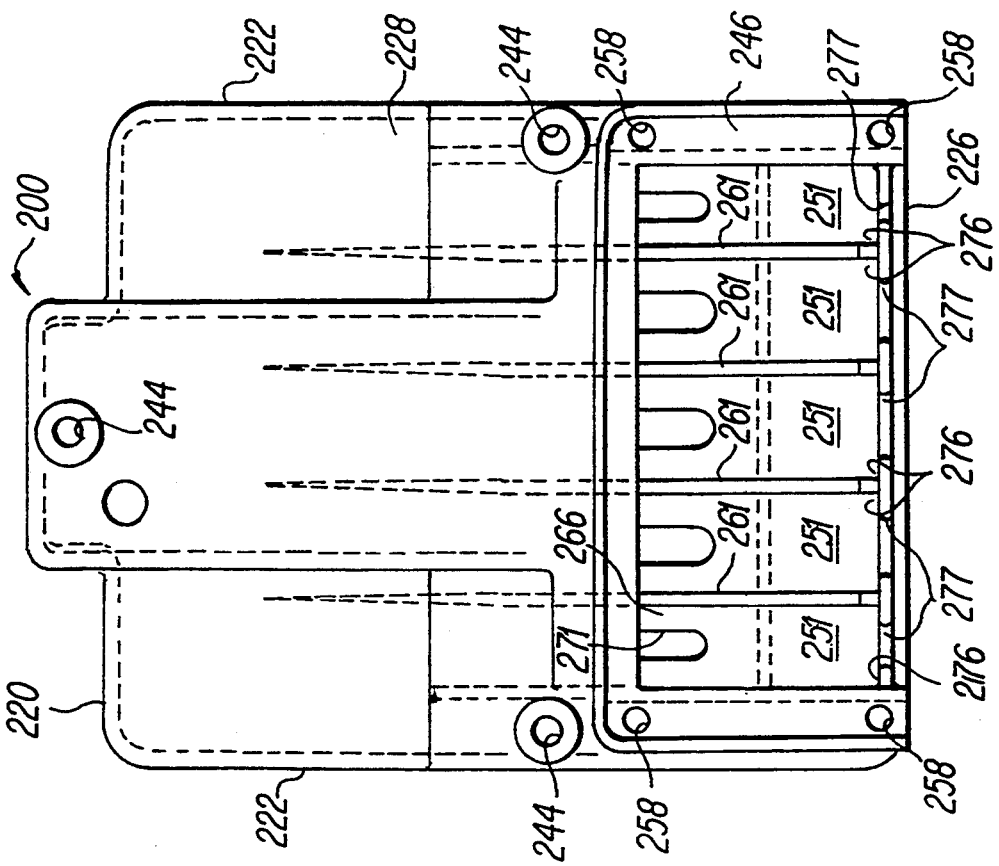
FIG. 22 is a rear elevational view of the outer inlet housing of the electrical connector inlet assembly illustrated in FIGS. 19-21.
Figure 21:
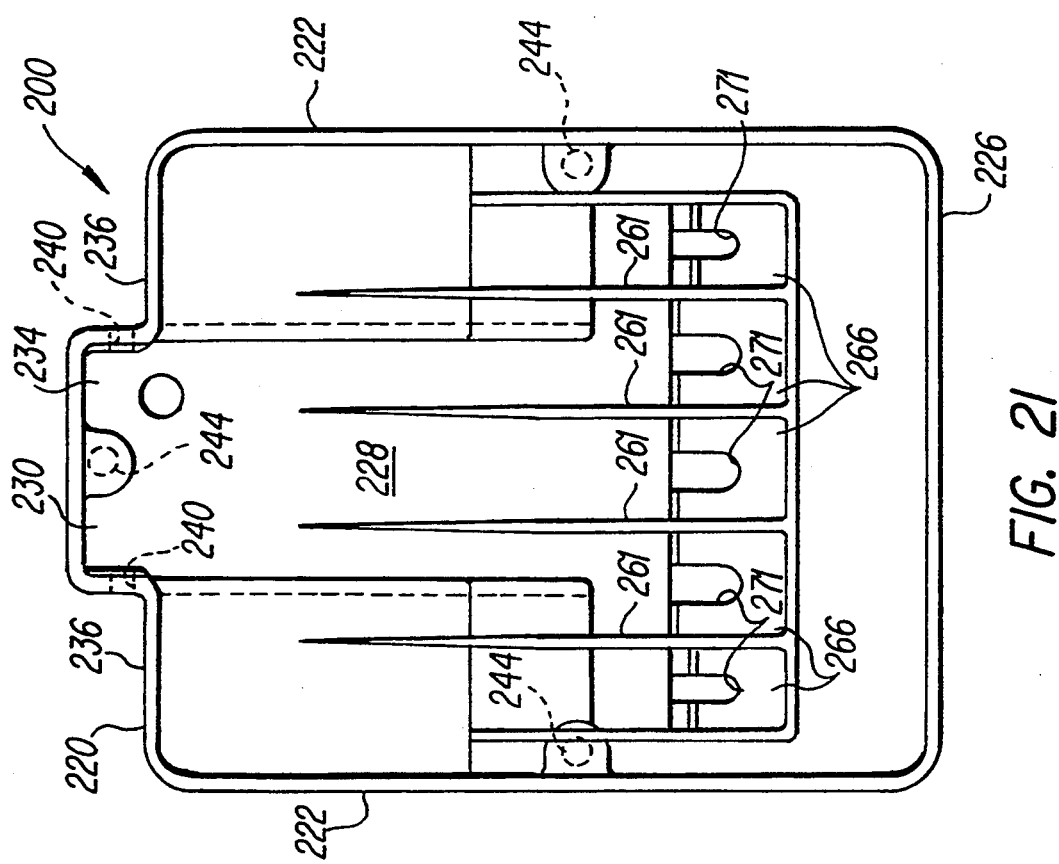
FIG. 21 is a front elevational view of the outer inlet housing of the electrical connector inlet assembly illustrated in FIGS. 19 and 20.
Figure 41:
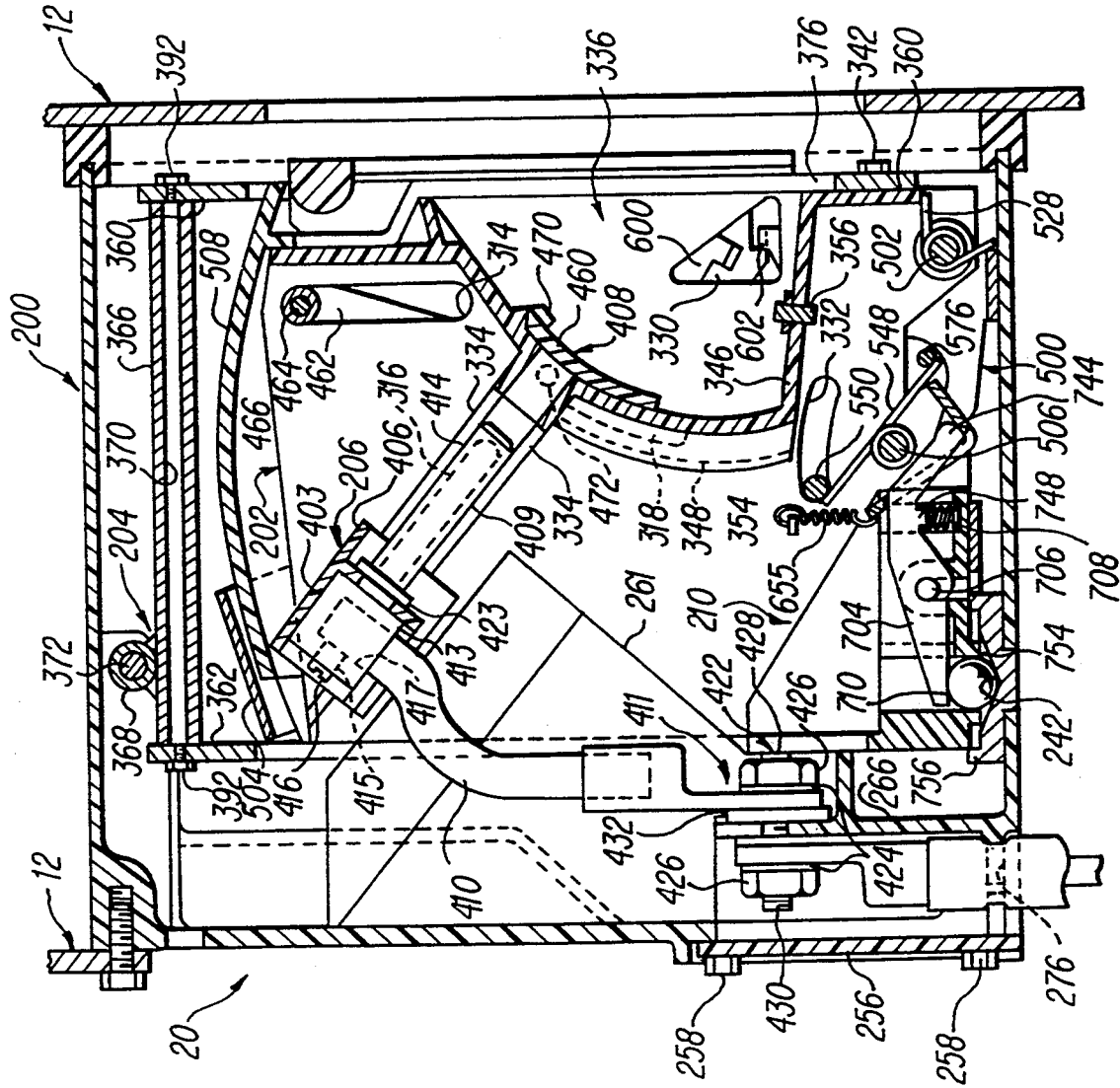
FIG. 41 is a cross-sectional view taken along a vertical plane extending through the center of the electrical connector inlet assembly illustrating the inlet contact assembly and break-away assembly.

As seen in FIGS. 19, 20 and 41, universal joint assembly 204 includes a front mounting bracket 360 coupled to the front end of inner inlet housing 202 by screws 342, a rear mounting bracket 362 coupled to the rear end of inner inlet housing 202 by screws 312, a first pivot tube 366 extending between mounting brackets 360 and 362, a second pivot tube 368 rigidly coupled perpendicularly to first pivot tube 366, a first pivot pin 370 rotatably received within first pivot tube 366, and a second pivot pin 372 rotatably received within second pivot tube 368.

Front bracket 360 includes a pivot hole 374, a rectangular opening 376 and a pair of mounting holes 378. Pivot hole 374 couples the front end of inner inlet housing 202 to first pivot pin 370 of universal joint assembly 204. Rectangular opening 376 is sized to overly the opening of inlet cavity 336 to allow electrical connector 16 to pass therethrough as well as parts of actuation assembly 208. Mounting holes 378 are sized to receive screws 342 for securing front bracket 360 to inner inlet housing 202.

Rear bracket 362 is substantially U-shaped with a centrally located pivot hole 380 located along its bight portion, a first pair of mounting holes 382 formed along one of the leg portions, and a second pair of mounting holes 384 along the other leg portion. Pivot hole 380 pivotally couples the rear portion of inner inlet housing 202 to outer inlet housing 200 via pivot pin 370 of universal joint assembly 204. Mounting holes 382 and 384 receive screws 312 for securing rear bracket 362 to side walls 302 of inner inlet housing 202 via threading screws 312 into mounting holes 311 formed in inner inlet housing 202.

First pivot tube 366 extends substantially perpendicularly to second pivot tube 368. First pivot tube 366 receives first pivot pin 370 therein for rotational movement, while second pivot tube 368 receives second pivot pin 372 therein for rotational movement. First pivot pin 370 has a threaded bore 390 at each end for receiving a screw 392 for fastening first pivot pin 370 to front bracket 360 and rear bracket 362 of inner inlet housing 202. Likewise, second pivot pin 372 has a threaded bore 394 at each end for receiving one of the screws 396 to secure pivot pin 372 to outer inlet housing 200.

Accordingly, universal joint assembly 204 allows inner inlet housing 202 to rotate or move about the longitudinal axes of pivot tubes 366 and 368 relative to outer inlet housing 200. The amount of movement between the two housings 200 and 202 is limited by the clearance between the two housings 200 and 202. Moreover, the break-away assembly 210 also limits or prevents relative movement between the two housing 20 and 207 as discussed below.

Inlet Contact Assembly 206

As seen in FIGS. 20, 34–36 and 41, inlet contact assembly 206 includes five electrical inlet contacts 401–405 movably coupled to inner inlet housing 202 by a movable contact bail 406, and a movable contact cover assembly 408 for exposing and concealing electrical contacts 401–405. Inlet contact assembly 206 is operatively coupled to actuation assembly 208 such that actuation assembly 208 moves the inlet contacts 401–405 as well as moves contact cover assembly 408 upon insertion of electrical connector 16 into inlet cavity 336.

Each of the electrical contacts 401–404 are substantially identical except for their relative size. Specifically, electrical contacts 402, 403 and 404 are power contacts which are all substantially the same size. Electrical contact 401 is a ground contact which is slightly smaller than the electrical power contacts 402, 403 and 404. Electrical contact 405 is a communications connector with a plurality of contacts.

Each of the electrical inlet contacts 401–405 includes a contact pin 409 fixedly coupled to contact bail 406 for movement therewith, a conductive wire 410 coupled at one end to one of the contact pins 409, and an end connector 411 coupled to the other end of each conductive wire 410 for coupling one of the electrical conductors 412 of vehicle 12 thereto, respectively. The communications contact 405 has a plurality of contacts for engaging communications connector 36, while the contact pins 409 of the remaining contacts 401–404 are solid, single contacts for engaging contacts 34 of electrical connector 16. Of course, communications contact 405 can have a single contact, if desired.

Contact pins 409 of contacts 401–405 each have a main body portion 413 for coupling conductive wire 410 thereto, and a cylindrical pin portion 414 for electrically coupling the electrical connector inlet assembly 20 to electrical connector 16. Main body portion 413 has an axially extending threaded hole 415 for receiving a thumb screw 416, and a transverse bore 417 communicating with hole 415 for receiving conductive wire 410.

Bore 417 is sized to receive one of the ends of its respective conductive wire 410 therein. Conductive wires 410 are secured to main body portions 413 of contact pins 409 by thumb screws 416. Specifically, thumb screws 416 are threaded into holes 415 until they engage conductive wires 410 to crimp them within bores 417. Thus, thumb screw 416 electrically couples conductive wire 410 to main body portion 413.

Cylindrical pin portion 414 of each contact pin 409 is provided with an annular recess 421 for receiving a C-clip 423 to retain contact pin 409 within bail 406. Contact pins 409 are constructed of any suitable conductive material such as brass. Each of the contact pins 409 are coupled to bail 406 for reciprocal movement therewith to electrically engage and disengage contacts 34 and 38 of electrical connector 16.

Each of the end connectors 411 includes a connector pin 422, a pair of washers 424, and a pair of nuts 426. One of the washers 424 and one of the nuts 426 are attached on opposite ends of each of the connector pins 422. Specifically, each of the connector pins 422 has a pair of oppositely extending threaded shafts 428 and 430 with a centrally located flange 432 positioned between shafts 428 and 430.

End connectors 411 are fixedly coupled within passageways 251 by positioning one of the shafts 430 within each of the cutouts 271 and then securing each of the end connectors 411 therein via one of the washers 424 and one of the nuts 426. The other shafts 428 of end connectors 411 are fixedly coupled to conductors 416 in a conventional manner via the other one of the washers 424 and the other one of the nuts 426.

Contact drive bail 406 is a substantially rectangular member having five contact receiving cavities 434 for supporting main bodies 413 of inlet contact pins 409. Each of these cavities 434 has a rectangular cross-section with a cutout 436 in one wall for receiving one of the conductive wires 410 therein, and a bore 438 for receiving pin portion 414 of one of the inlet contact pins 409 therein. Each of the cavities 434 receives one of the main bodies 413 of electrical inlet contact pins 409, while each of the bores 438 receives one of the pin portions 414 of electrical inlet contact pins 409.

Contact pins 409 are secured within cavities 434 by C-clips 423 to prevent relative movement therebetween. Contact drive bail 406 also includes a slide member 440 and a pair of parallel rails 442 extending outwardly from each of its opposite longitudinal ends for engaging rails 334 on the interior surfaces of side walls 302 of inner inlet housing 202 therein. In other words, rails 442 on each of the side walls 302 straddle one of the slide members 440 to form a pair of parallel slots for slidably receiving rails 334 of inlet housing 202. Each of the slide members 440 has a threaded hole 446 for receiving a threaded pin 448. Pins 448 are designed to slidably secure contact drive bail 406 to side walls 302 of inner inlet housing 202 via angled control slots 316. Preferably, contact drive bail 406 is molded as an integral, one-piece unitary member from a hard, rigid nonconductive material such as plastic.

Contact Cover Assembly 408

As seen in FIGS. 20, 33, 41–44 and 47, contact cover assembly 408 includes a curved contact cover 460, a pair of drive links 462 and a connecting rod 464. Contact cover assembly 408 is preferably controlled by actuation assembly 208 so that a user can expose or conceal the inlet contact pins 409 only after mating electrical connector 16 has been fully inserted into inlet cavity 336.

Contact cover 460 is preferably molded as an integral one-piece, unitary member from a hard, rigid non-conductive material such as plastic. Contact cover 460 has a pair of arcuate slide arms 468 located at each of its ends, and a pair of detentes 470 for engaging notches 188 formed in contact cover 50 of electrical connector 16 to expose contacts 34 and 38 of electrical connector 16 to inlet contact pins 409. Each of the arms 468 has a pivot hole 472 for receiving a threaded pin 473 which extends outwardly therefrom for engaging curved control slots 318. Specifically, pivot holes 472 extend through curved control slots 318, and are then coupled to one of the ends of its respective drive link 462 via pins 473. The other ends of the drive links 462 are connected to the ends of connecting rod 464 in a conventional manner such as by C-clips or screws.

Connecting rod 464 is slidably received in vertical control slots 314 of side walls 302 for sliding movement relative to inner inlet housing 202. Accordingly, movement of connecting rod 464 causes drive links 462 to reciprocate contact cover 460 via pivot pins 472 sliding in curved control slots 318. Preferably, connecting rod 464 has an overlying sleeve 466 for engaging vertical control slots 314 to provide smooth sliding movement of connecting rod 464 within control slots 314.

Arcuate slide arms 468 are positioned within curved recesses 348 of inlet cavity 336 of the inner inlet housing 202 for sliding movement therein. Accordingly, as connecting rod 464 slides vertically within vertical control slot 314, arcuate slide arms 468 of cover 460 reciprocate within curved recesses 348 with a portion of arms 468 moving through clearance openings 354 formed in lower wall 346 of inlet cavity 336.

Actuation Assembly 208

Referring to FIGS. 20, 27–29 and 40–53, actuation assembly 208 includes (1) an actuation unit 500 pivotally coupled to inner inlet housing 202 by a first pivot rod 502, (2) a drive unit 504 pivotally coupled to inner inlet housing 202 via a second pivot rod 506, (3) a cam unit 508 pivotally coupled to inner inlet housing 202 via second pivot rod 506, (4) a hood or weathershield 510 fixedly coupled to cam unit 508 for movement therewith, and (5) a pair of connector control latch units 512 with one coupled to each of the side walls 302 of inner inlet housing 202.

Actuation unit 500 includes a handle 520, a pair of substantially identical side actuation plates 522 rigidly coupled to handle 520, a lower connecting plate 526 extending between side actuation plates 522, and a torsion spring 528 positioned on first pivot rod 502 for biasing actuation unit 500 forwardly to a grab position or an extended position.

Handle 520 is preferably molded as a unitary, one-piece, unitary member from a hard, rigid non-conductive material such as plastic. Handle 520 is preferably U-shaped and fixedly coupled to each of the side actuation plates 522 by screws 530 and pins 532.

Side actuation plates 522 are substantially identical, and each includes an inwardly extending drive pin 534 with a steel bushing 536 thereon for engaging drive unit 504. Each of the side actuation plates 522 also includes a pivot hole 538 for receiving pivot rod 502, and a stop member 542. Preferably, side actuation plates 522 are integrally formed with lower connecting plate 526, and are constructed of a sheet material such as aluminum.

Torsion spring 528 is a conventional torsion spring which is positioned on pivot rod 502 with one end of the torsion spring engaging lower connecting plate 526 and the other end of torsion spring engaging a portion of the inner inlet housing 202 for normally biasing actuation unit 500 forwardly to a grab position or an extended position.

Figure 28:
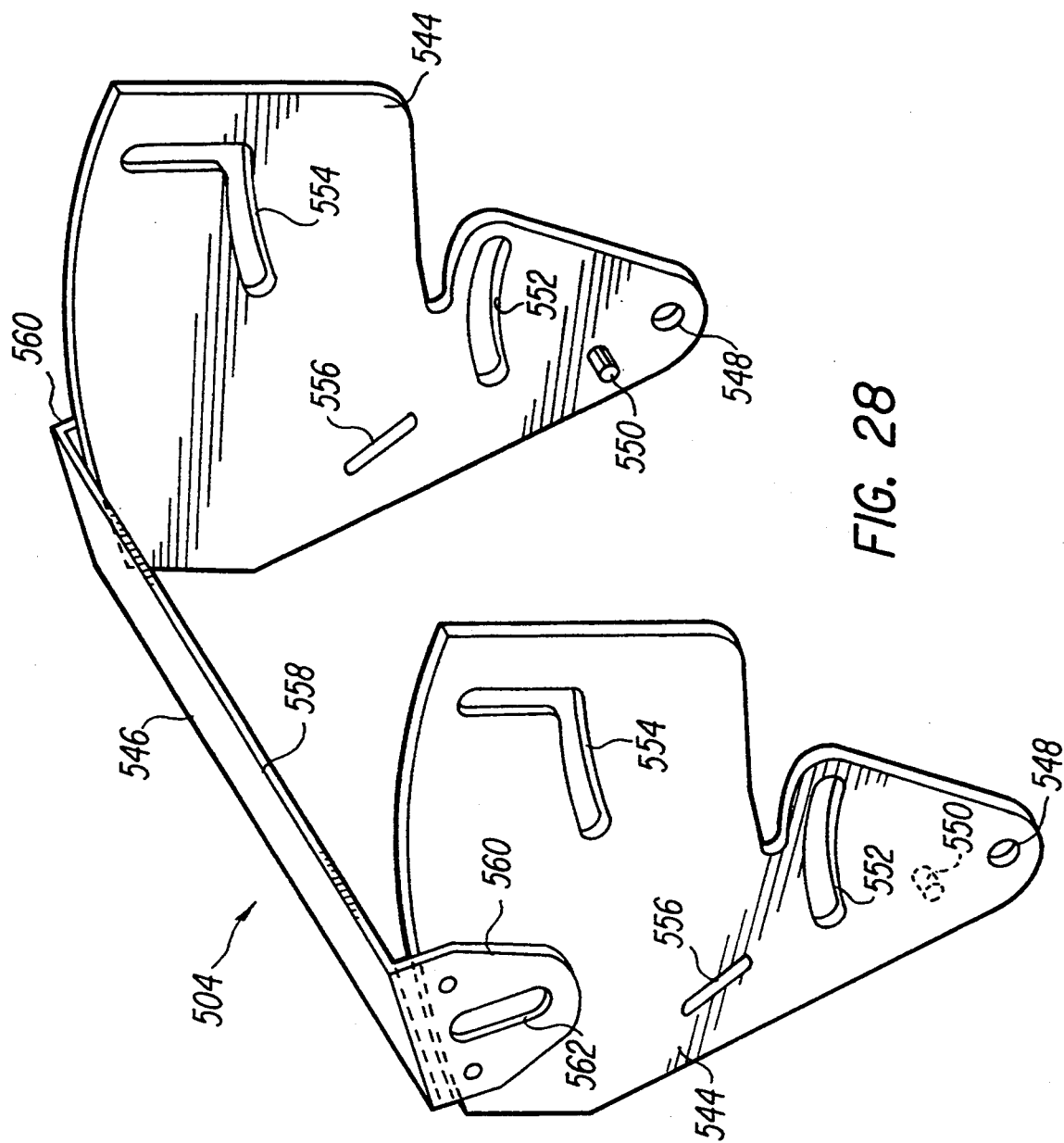
FIG. 28 is a left side perspective view of the drive plate unit of the electrical connector inlet assembly illustrated in FIGS. 19 and 20.
Figure 29:
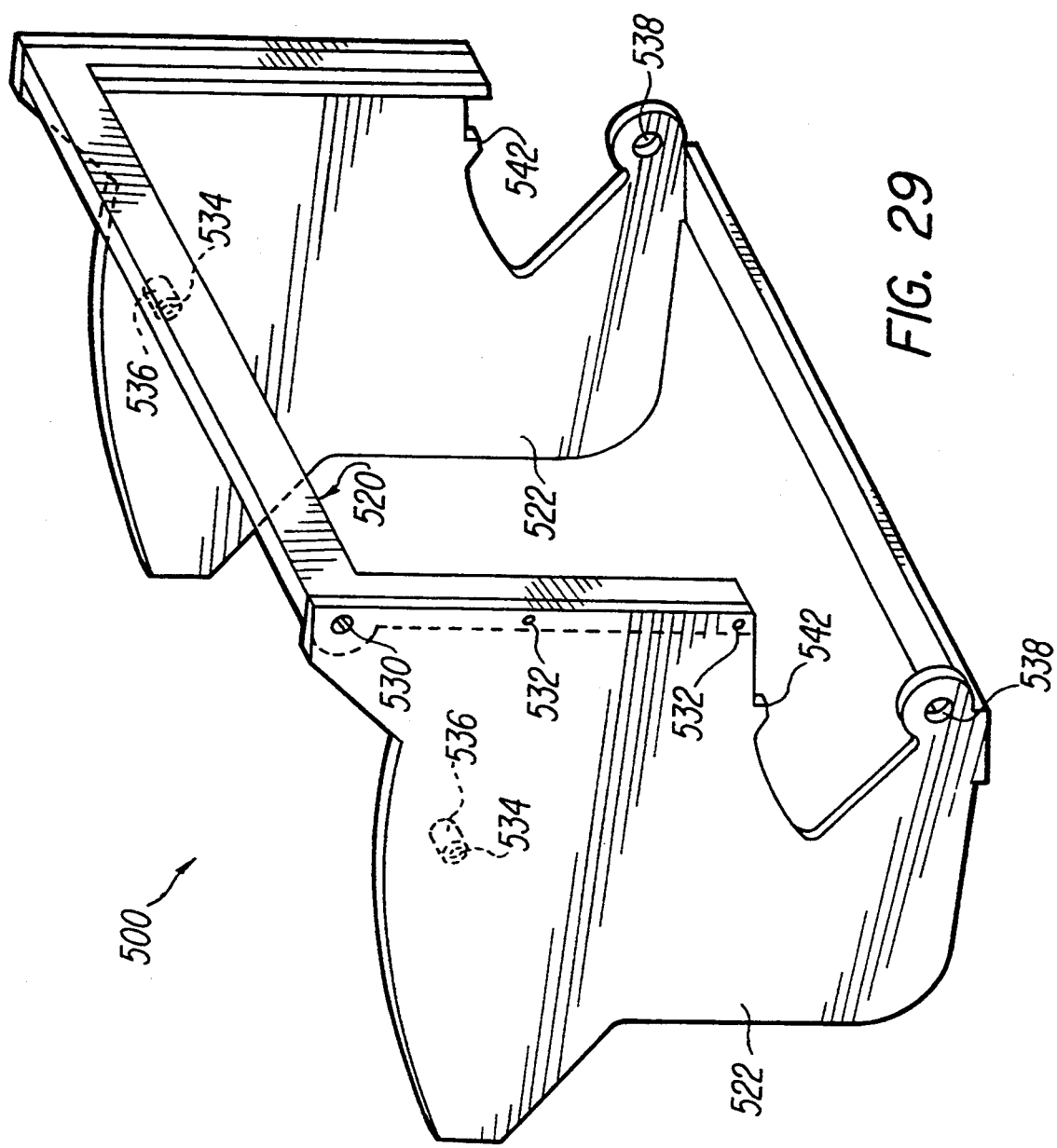
FIG. 29 is a left side perspective view of the actuation unit of the electrical connector inlet assembly illustrated in FIGS. 19 and 20.

As seen in FIG. 28, drive unit 504 is substantially U-shaped and preferably made of sheet material such as steel. Drive unit 504 includes a pair of substantially identical side drive plates 544, an upper U-shaped connecting member 546, and a pair of torsion springs 548 positioned on the ends of pivot rod 506 for normally biasing drive plates 544 forwardly to an extended position.

Each of these drive plates 544 includes a pivot hole 548 for receiving pivot rod 506, an inwardly extending pin 550 for engaging one of the torsion springs 548 positioned on pivot rod 506, an arcuate slot 552 for receiving the outwardly extending pivot pin 322 of inner inlet housing 202, an L-shaped control slot 554 for receiving drive pin 534 with bushing 536 of actuation unit 500, and a latch slot 556 for engaging connector control latch unit 512.

Connecting member 546 is secured to each of the drive plates 544 by rivets or other conventional fasteners. In particular, the connector member 546 includes a bight portion 558 extending between drive plates 544, and a pair of legs 560. Each of the legs 560 is connected to one of the respective drive plates 544, and includes a control slot 562 for use with the motor driven version discussed below.

Figure 27:
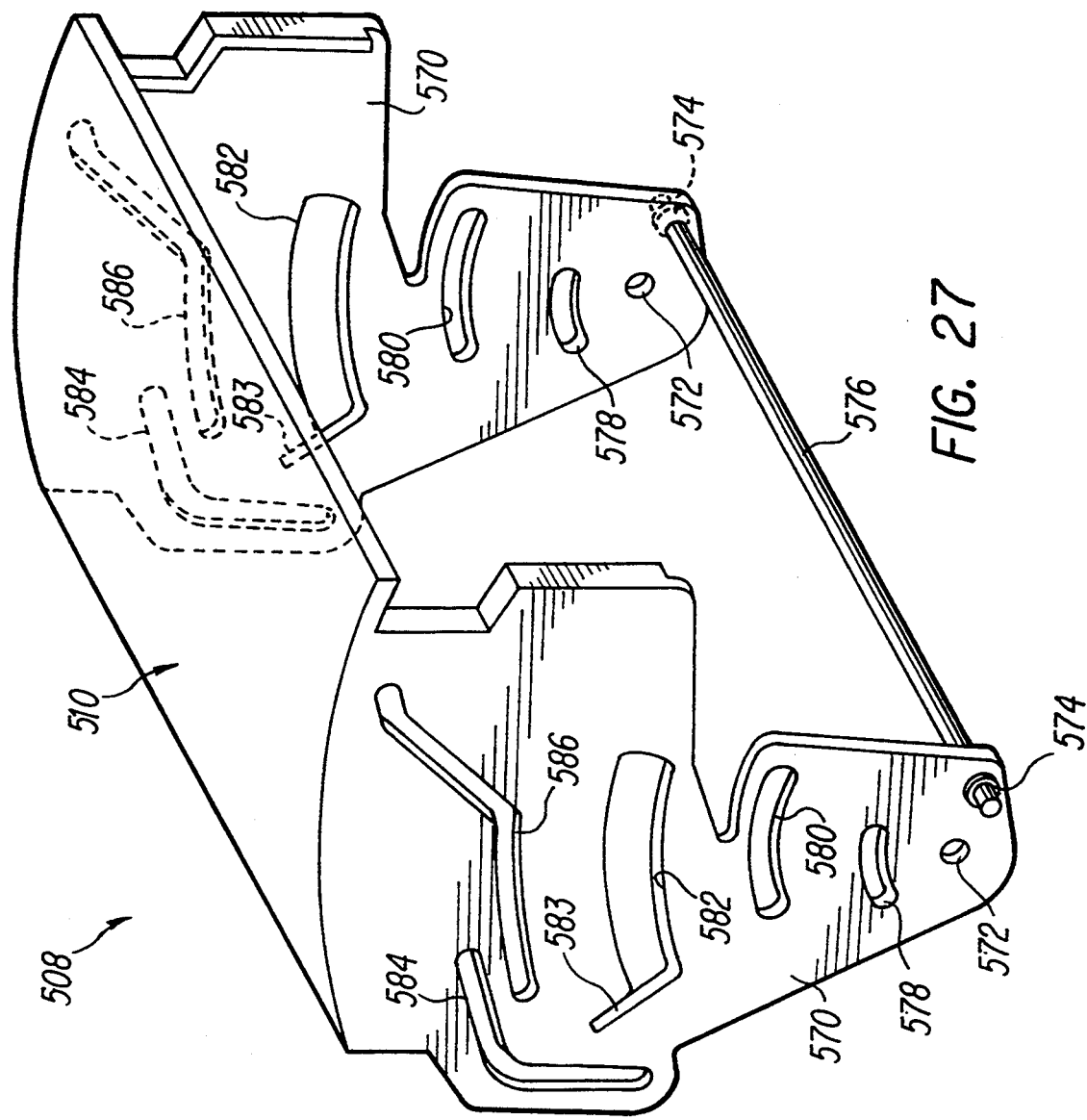
FIG. 27 is a left side perspective view of the cam plate unit of the electrical connector inlet assembly illustrated in FIGS. 19 and 20.

As seen in FIG. 27, cam unit 508 is substantially U-shaped and molded as an integral, one-piece, unitary member from a hard, rigid non-conductive material such as plastic or any other suitable material. Control unit 508 includes a pair of substantially identical cam plates 570 connected to opposite ends of hood 510. Cam plates 570 are substantially parallel to each other and pivot together about pivot rod 506.

Each of the cam plates 570 includes (1) a pivot hole 572 for receiving pivot rod 506 therein, (2) a hole 574 for receiving a connecting rod 576 therein, (3) a first arcuate slot 578 with its arc positioned about the pivot hole 572 for receiving pin 550 of one of the drive plates 544, (4) a second arcuate slot 580 with its arc positioned around pivot hole 572 for receiving pivot pin 324 of inner inlet housing 202 therethrough, (5) a third arcuate slot 582 with its arc positioned about the pivot hole 572 for engaging release latch 650, (6) a first cam slot 584 for controlling movement of the contact bail 406, and (7) a second cam slot 586 for receiving the ends of connecting rod 464 to control the movement of contact cover 460.

The pair of torsion springs 548 normally bias cam unit 508 and hood 510 rearwardly for retracting the contact pins 409 and for moving the contact cover 460 to conceal the contact pins 409 from inlet cavity 336. Specifically, one end of each of the torsion springs 548 engages one of the pins 550 of drive plates 544 and the other ends of each of the torsion springs 548 engages the connecting rod 576. Accordingly, torsion springs 548 causes a scissor action between drive plates 544 and cam plates 570, i.e., drive plates 544 are biased forwardly, while cam plates 570 are biased rearwardly by springs 548.

Figure 30:
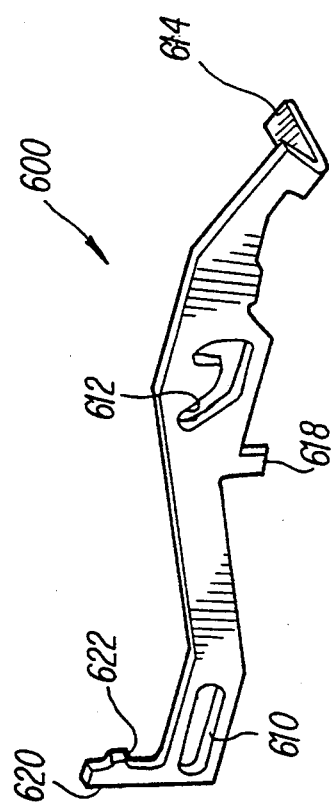
FIG. 30 is a left side perspective view of the upper latch of the electrical connector inlet assembly illustrated in FIGS. 19 and 20.
Figure 31:
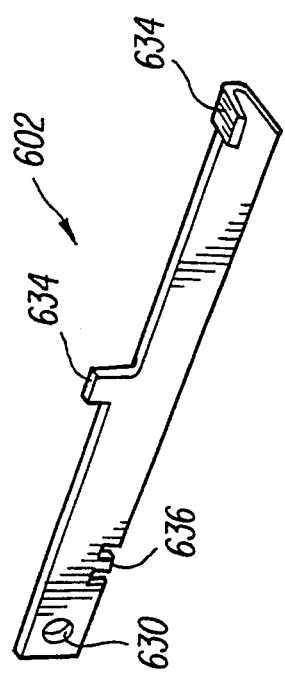
FIG. 31 is a left side perspective view of the lower latch of the electrical connector inlet assembly illustrated in FIGS. 19 and 20.
Figure 35:
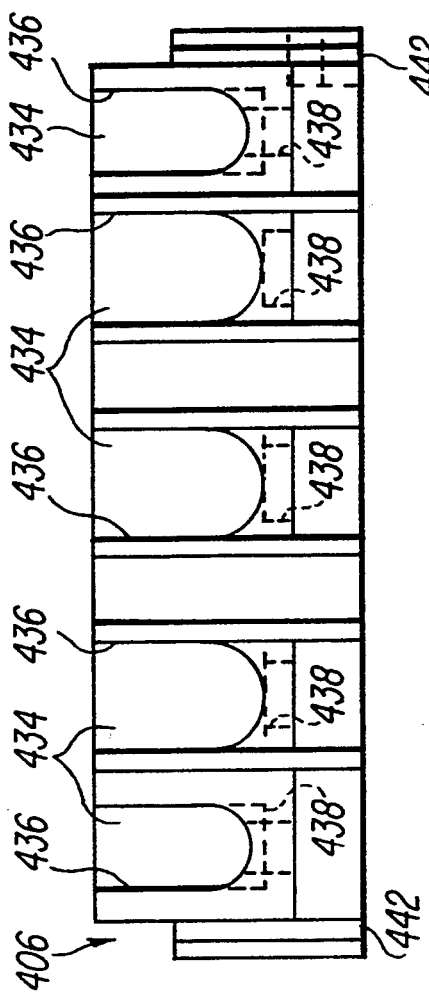
FIG. 35 is a rear elevational view of the contact bail illustrated in FIG. 34.
Figure 36:
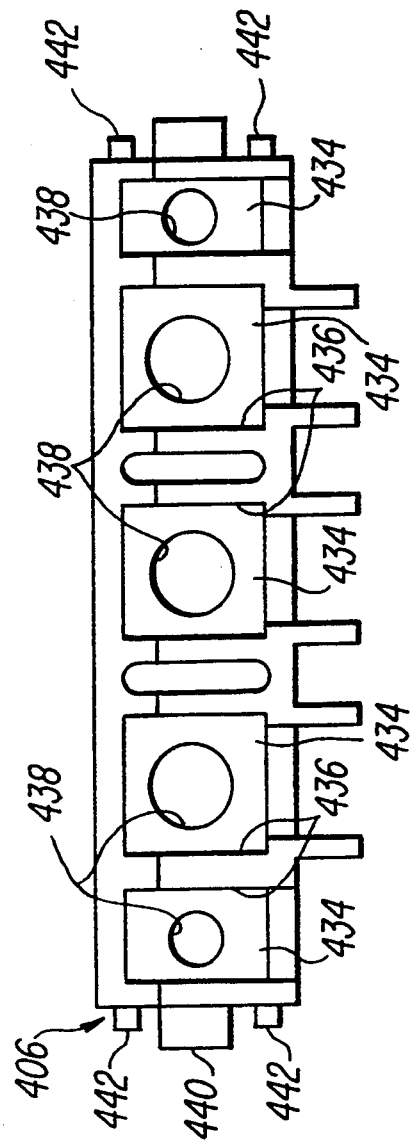
FIG. 36 is a top plan view of the contact bail illustrated in FIGS. 34 and 35.
Figure 34:
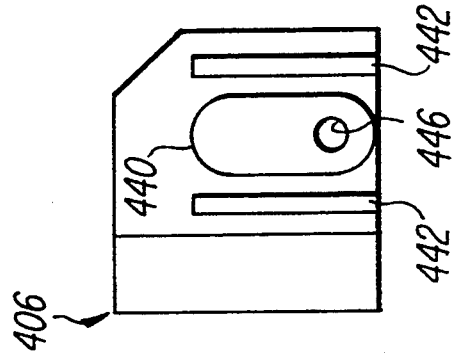
FIG. 34 is a left side elevational view of the contact bail of the contact assembly for the electrical connector inlet assembly.

Each of the connector latch units 512 is coupled to one of the side walls 302 of inner inlet housing 202. As seen in FIGS. 30 and 31, each of the connector latch units 512 includes an upper connector latch 600 for engaging electrical connector 16 to release actuation unit 500, a lower connector latch 602 for locking actuation unit 500 in the retracted position, and a pair of compression springs 604 and 606 for controlling the movement of latches 600 and 602. Upper latch 600 is movably coupled to inner inlet housing 202 by pins 320 and 322 and biased in a counterclockwise direction about pin 320 by first compression spring 604. Lower latch 602 is pivotally coupled to inner inlet housing 202 by pin 324 and biased in a counterclockwise direction about pin 324 by second compression spring 606.

As seen in FIG. 30, upper latch 600 includes a first slot 610 extending horizontally for receiving pin 320 of inner inlet housing 202, a second slot 612 with a U-shaped configuration for receiving pin 322 of inner inlet housing 202, a first tab 614 extending through rectangular clearance opening 330 of inner inlet housing 202 for engaging electrical connector 16, a downwardly extending abutment member 618 for engaging lower latch 602, and an upwardly extending spring abutment 620 with a horizontally extending tang 622 for engaging first compression spring 604.

As seen in FIG. 31, lower latch 602 includes a pivot hole 630 at one end for receiving pin 324 of inner inlet housing 202, and a latching tab 634 at the other end for engaging stop 542 of actuation plate 522. Lower latch 602 also includes an upwardly extending abutment 634 for engaging downwardly extending abutment 618 of upper latch 600, and a downwardly extending abutment 636 for engaging second compression spring 606.

As seen in FIGS. 52-55, when electrical connector 16 is inserted into inlet cavity 336 of inner inlet housing 202, first tabs 614 of upper latches 600 will engage the bottom edges of side walls 100 of electrical connector 16. First tabs 614 of upper latches 600 will then slide along the bottom edges of side walls 100 of electrical connector 16 causing upper latches 600 to move downwardly against the force of compression springs 604. Eventually, notches 118 of electrical connector 16 will engage first tabs 614 of upper latches 600 once electrical connector 16 is completely inserted into inlet cavity 336.

This downward movement of upper latches 600 by electrical connector 16 also causes lower latches 602 to move downwardly since abutments 618 of upper latches 600 engage abutments 634 of lower latches 602. Abutments 618 of upper latches 600 are maintained vertically aligned with abutments 634 of lower latches 602 since springs 604 hold pins 322 in the forward legs of U-shaped slots 612. Accordingly, as lower latches 602 pivot downwardly about pivot pins 324, tabs 634 of lower latches 602 will disengage from stops 542 of actuation plates 522, which in turn allows the torsion spring 528 of actuation unit 500 to move actuation plates 522 and handle 520 forwardly to a grab position. In other words, actuation unit 500 will be pivoted forward about pivot rod 502 by torsion spring 528 until pins 534 of actuation plates 522, which are positioned within L-shaped slots 554 of drive plates 544, abut against the forward vertical edges of L-shaped slots 554 of drive plates 544.

Now, a user may grab the handle 520 to further pivot actuation unit 500 forwardly. This further movement of actuation member 500 causes the drive unit 504 and the cam unit 508 also to move forwardly which in turn causes the inlet contact cover 460 to move upwardly and the contact pins 409 to extend within the inlet cavity 336. Specifically, further forward movement of actuation unit 500 by the user also causes drive unit 504 to move forwardly since pins 534 of actuation plates 522 engage the forward vertical edges of L-shaped slots 554. Thus, drive unit 504 moves forwardly as pins 534 of actuation plates 522 move along the vertical portions of L-shaped slots 554 of drive plates 544. This is possible since actuation unit 500 has a different pivot axis from the pivot axis of drive unit 504. Since drive unit 504 is coupled to cam unit 508 by release latch 650, cam unit 508 also moves forwardly with actuation unit 500 and drive unit 504 upon forward movement of actuation unit 500 from the grab position to the extending position.

Figure 32:
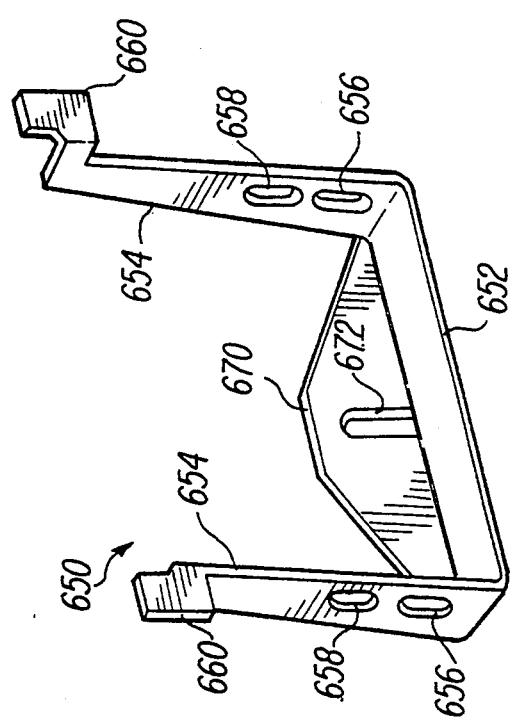
FIG. 32 is a left side perspective view of the release latch of the electrical connector inlet assembly illustrated in FIGS. 19 and 20.
Figure 33:
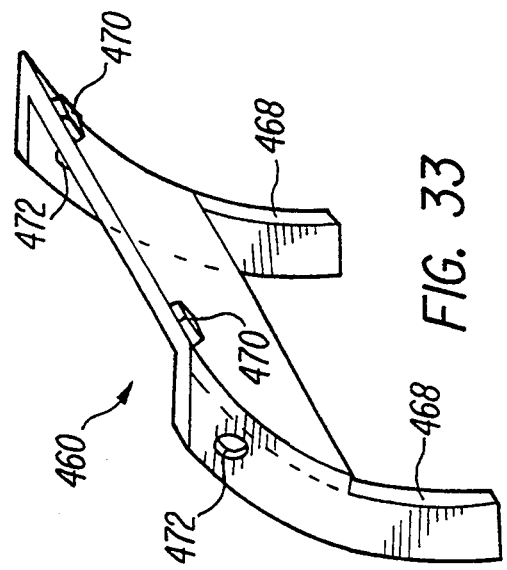
FIG. 33 is a left side perspective view of the inlet contact cover of the electrical connector inlet assembly illustrated in FIG. 19.
Figure 40:
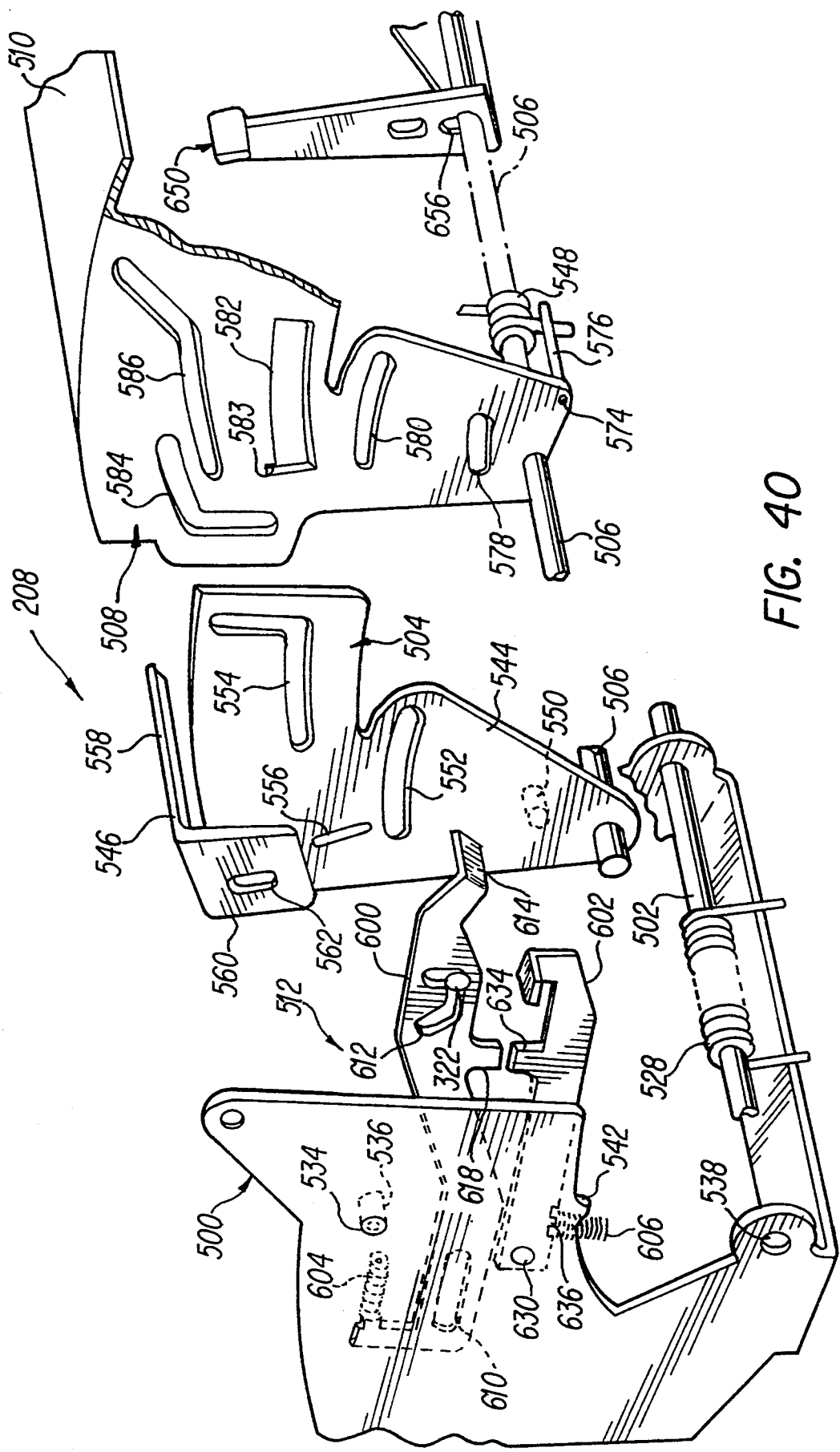
FIG. 40 is a partial, exploded perspective view of selected parts of the actuation assembly for the electrical connector inlet assembly or receptacle.

As seen in FIGS. 32 and 40, release latch 650 is releasably coupled to cam unit 508 and fixedly coupled to drive unit 504 so that they all normally move together. However, if a break-away force occurs between outer inlet housing 200 and inner inlet housing 202 as discussed below, then release latch 650 disengages from cam unit 508 to allow cam unit 508 to pivot rearwardly by torsion springs 588. Drive unit 504 and release latch 650, on the other hand, remain coupled together and biased forwardly by torsion springs 548.

As electrical connector 16 is removed from inlet cavity 336 of inner inlet housing 202, upper latches 600 will be pulled forward by electrical connector 16 to allow lower latches 602 to move upwardly to lock actuation unit 500 in the retracted position. Specifically, the forward movement of upper latches 600 occurs because first tabs 614 are positioned within notches 118 of electrical connector 16 and the outward movement of electrical connector 16 is transmitted to upper latches 600. The forward movement of upper latches 600 by electrical connector 16 disengages abutments 618 of upper latches 600 from abutments 634 of lower latches 602. New, compression springs 606 pivot lower latches 602 upwardly about to pivot pins 324 so that latching tabs 634 engage stops 542 of actuation plates 522. This forward movement of upper latches 600 is permitted due to pins 320 riding along the horizontal slots 610 and pins 322 riding in the U-shaped slots 612. In other words, pins 320 and 322 along with slots 610 and 612 control the movement of each of the upper latches 600. When upper latches 600 are moved forward by electrical connector 16, compression springs 604 are compressed between a ledge of inner inlet housing 202 and spring abutment 620. Once electrical connector 16 is completely removed from inlet cavity 336, tabs 614 disengage notches 118 of electrical connector 16, which in turn causes compression springs 604 to move upper latches 600 rearwardly to their original positions. As upper latches 600 move rearwardly, pins 322 move from the rearward legs of the U-shaped slots 612 back to the bottom of the bight portions of the U-shaped slots 612 beneath the forward legs of the U-shaped slots 612.

Release latch 650 is substantially U-shaped, and includes a bight portion 652 and a pair of leg portions 654 extending upwardly from bight portion 652. Preferably, release latch 650 is constructed from a hard, rigid material such as steel or any other suitable material. Release latch 650 is normally biased upwardly by a pair of springs 655 which are attached at one of their ends to the bight portion 652 and at their other ends to one of the inner side walls 302 of inner inlet housing 202 as seen in FIG. 41.

Each of the leg portions 654 of release latch 650 is substantially identical, and includes a first pivot slot 656 extending vertically for receiving pivot rod 506 therein, a second slot 658 extending vertical for receiving one of the pins 550 of drive plates 544 therein, and an outwardly extending flange 660 for releasably coupling cam unit 508 to drive unit 504. Each of the leg portions 654 are positioned between one of the side walls 302 of inner inlet housing 202 and one of the cam plates 570 of cam unit 508.

First pivot slot 656 is a longitudinally extending oblong hole so that release latch 650 can move longitudinally on pivot rod 506 as well as pivot about pivot rod 506. Similarly, second slot 658 is also a longitudinally extending oblong hole for allowing longitudinal movement of release latch 650 about pins 550 of drive plates 544. Thus, release latch 650 can move longitudinally along drive plates 544, but always pivots with drive plates 544.

Specifically, release latch 650 moves with drive unit 504, since the drive plates 544 and the leg portions 654 all pivot about pivot rod 502 and the leg portions 654 of release latch 650 are secured to drive plates 544 by pins 550 of drive plates 544 as well as by flanges 660 of release latch 650. Accordingly, as drive unit 504 moves forwardly or rearwardly, the release latch 650 will also move forwardly or rearwardly with drive unit 504.

During normal use, release latch 650 is coupled to cam unit 508, since flanges 660 of release latch 650 engage shelves 583 of slots 582 formed in cam plates 570. Accordingly, as drive unit 504 moves forwardly or rearwardly by actuation unit 500, cam unit 508 will also move forwardly or rearwardly with drive unit 504 so long as flanges 660 of release latch 650 engage shelves 583 of cam plates 570. However, if a sufficient breakaway force occurs between the outer inlet housing 200 and the inner inlet housing 202, then break-away assembly 210 will move release latch 650 downwardly so that flanges 660 of release latch 650 disengage shelves 583 of cam plates 570. Now, flanges 660 of release latch 650 can freely slide within slots 582 of cam plates 570 so that torsion springs 588 can move cam plates 570 rearwardly. This rearward movement causes the contact pins 409 to retract from electrical connector 16 and to move inlet contact cover 460 to conceal the retracted contact pins 409.

Bight portion 652 has an upwardly extending flange 670 with an upwardly extending slot 672 for receiving a portion of break-away assembly 210 to move release latch 650 between a latched position coupling drive unit 504 to cam unit 508 and an unlatch as discussed below.

Break-away Assembly 210

Referring now to FIGS. 20, 41, 50 and 51, breakaway assembly 210 includes (1) a trigger support 700 rigidly coupled to inner inlet housing 202 by a pair of screws 702, (2) a trigger lever 704 pivotally coupled to trigger support 700 by a pivot pin 706, (3) a compression spring 708 positioned within trigger support 700 for biasing trigger lever 704 in a counterclockwise direction, (4) a ball bearing 710 positioned within trigger support 700 for engaging trigger lever 704, and (5) a ball bearing cup 711 located in support hole 242 of the outer inlet housing 200 for engaging ball bearing 710.

Figure 39:
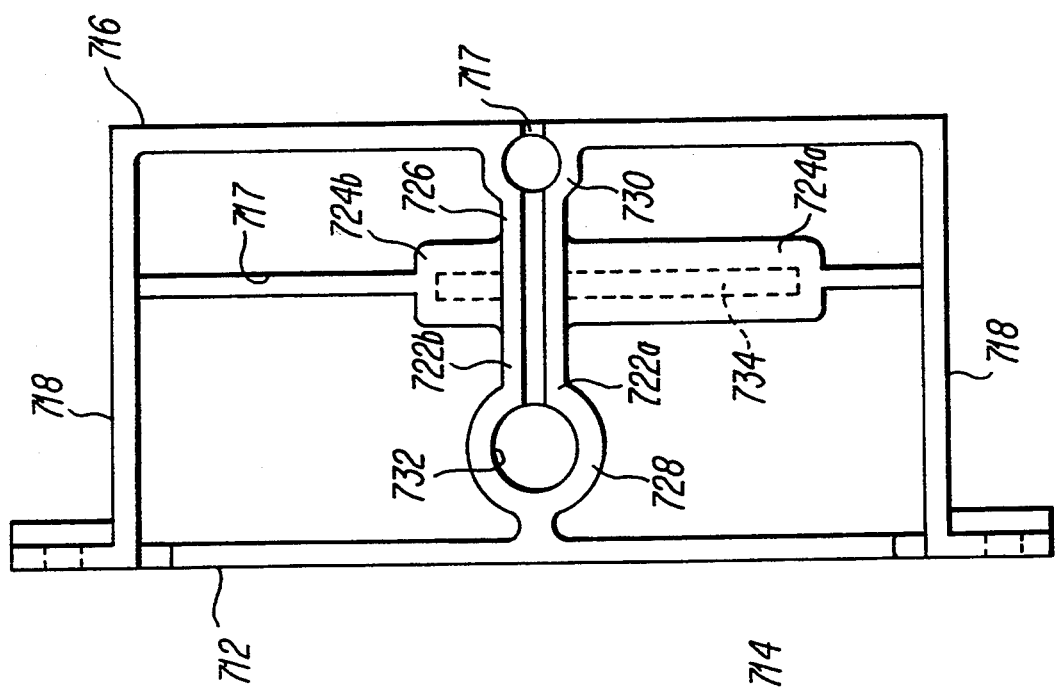
FIG. 39 is a top plan view of the trigger support of the break-away assembly illustrated in FIGS. 37 and 38.
Figure 37:
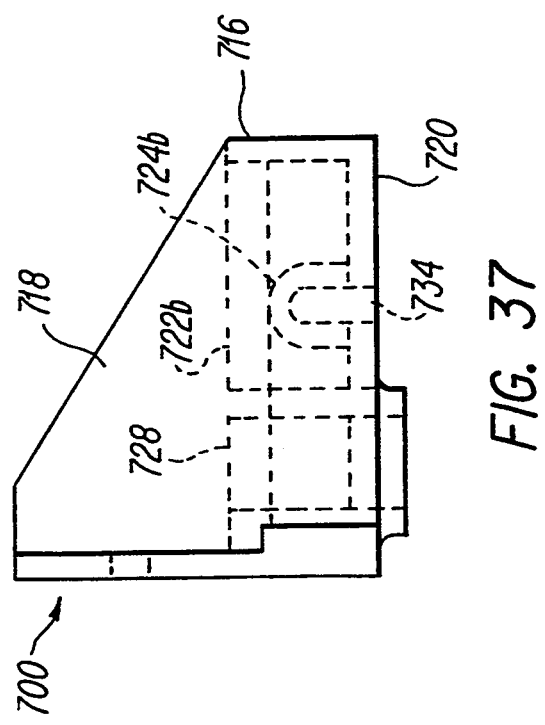
FIG. 37 is a left side elevational view of the trigger support of the break-away assembly for the electrical connector inlet assembly.
Figure 38:
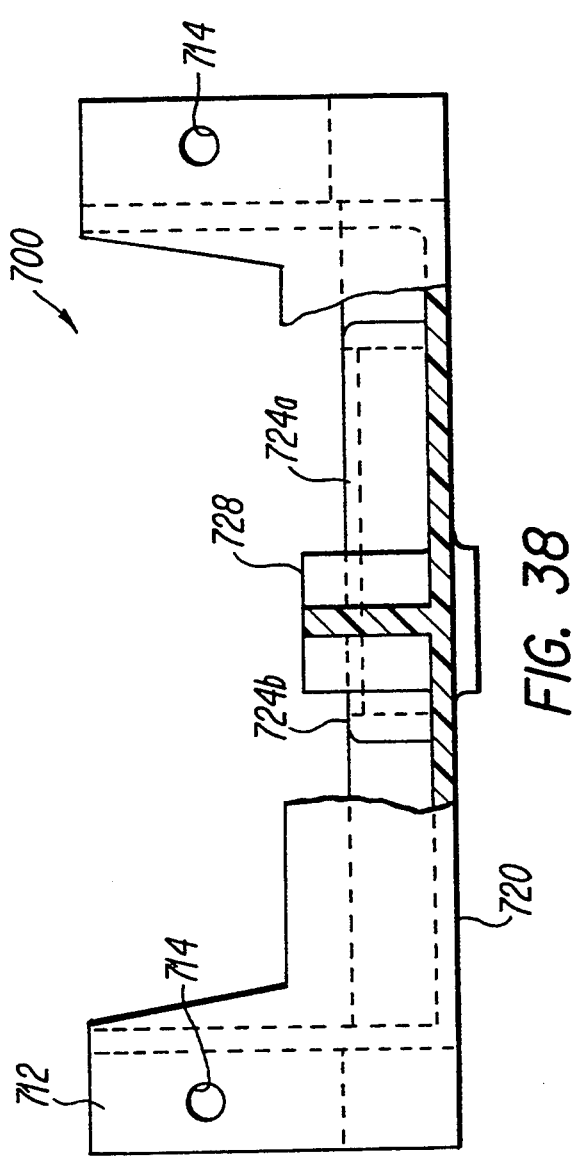
FIG. 38 is a rear elevational view of the trigger support of the break-away assembly illustrated in FIG. 37 with a portion broken away for clarity.

As best seen in FIGS. 37-39, trigger support 700 includes a rear wall 712 with a pair of mounting holes 714, a front wall 716 extending substantially parallel to rear wall 712 with a slot 717, a pair of side walls 718 extending perpendicularly between rear wall 712 and front wall 716, and a bottom wall 720 for supporting trigger lever 704 as well as ball bearing 710 and compression spring 708.

In particular, bottom wall 720 has a pair of intermediate support walls 722a and 722b extending upwardly from bottom wall 720 and between rear wall 712 and front wall 716, and a pair of U-shaped walls 724a and 724b extending upwardly from bottom wall 720 and outwardly from support walls 722a and 722b, respectively. Support walls 722a and 722b form a channel 726 which is aligned with slot 717 of front wall 716 for receiving trigger lever 704 therein. Support walls 722a and 722b also form a pair of cylinders 728 and 730 for supporting ball bearing 710 and compression spring 708 therein. Cylinder 728 is aligned with a hole 732 extending through bottom wall 720 for slidably supporting ball bearing 710 therein. The cylinder 730, on the other hand, supports compression spring 708 therein. Specifically, the bottom end of the compression spring 708 engages bottom wall 720, while the top end of compression spring 708 engages a portion of trigger lever 704. The U-shaped walls 724a and 724b are aligned with a slot 734 formed in bottom wall 720 for receiving pivot pin 706 therein.

Trigger lever 704 is positioned within channel 726 formed by the pair of parallel support walls 722a and 722b which extend upwardly from bottom wall 720, while pivot pin 706 is positioned in slot 734 which extends perpendicularly to channel 726. Accordingly, trigger lever 704 is pivotally held within channel 726 by pivot pin 706 so that one end of trigger lever 704 is received within cylinder 728 for engaging ball bearing 710 and the other end of the trigger lever 704 extends through cylinder 730 for engaging compression spring 708 to bias trigger lever 704 about pivot pin 706 and against bight portion 652 of release latch 650.

Figure 50:
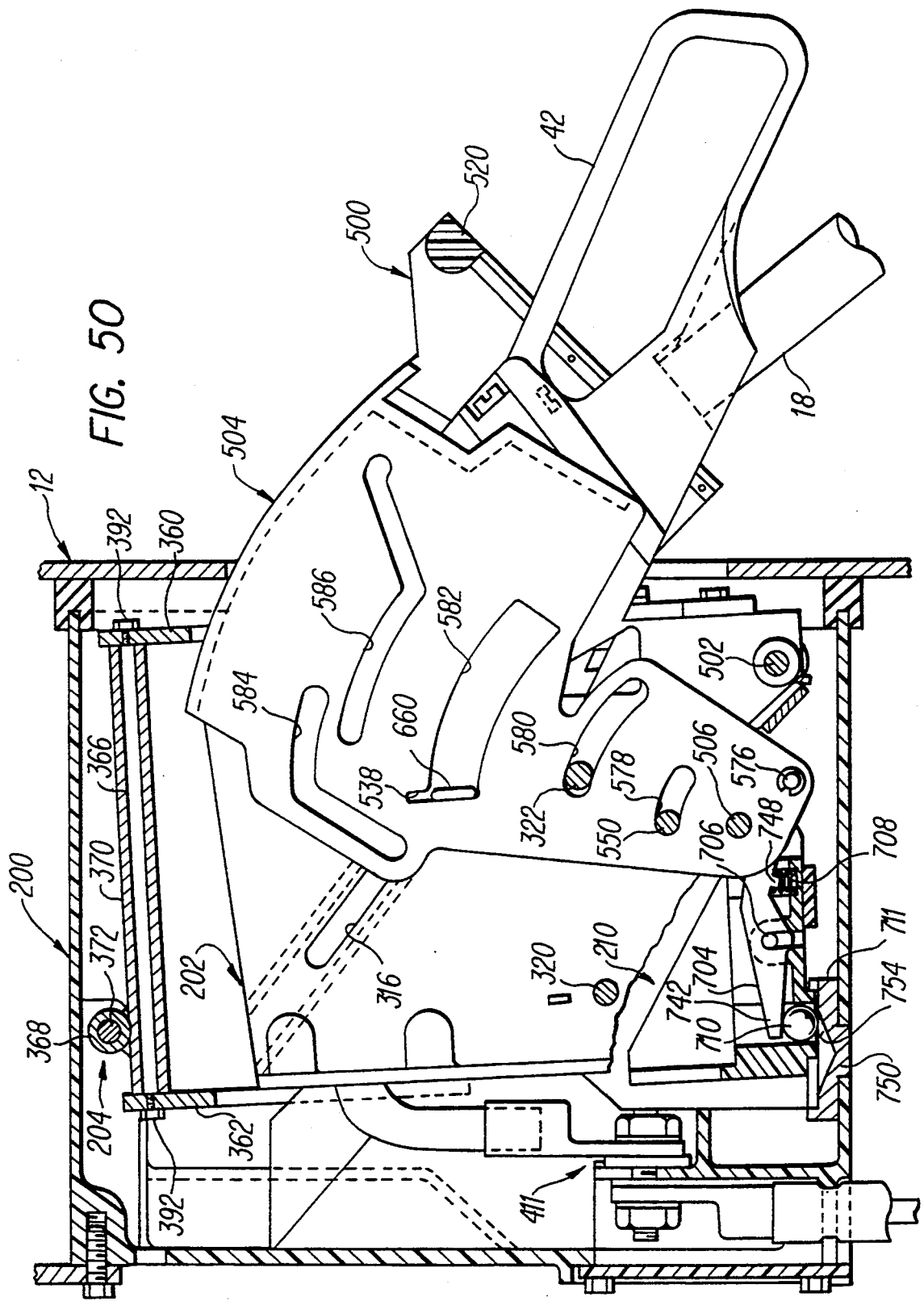
FIG. 50 is a cross-sectional view of the electrical connector inlet assembly taken along a vertical plane illustrating the cam plate and release latch in their break-away positions after a break-away force has been applied to the electrical connector inlet assembly, but prior to retraction of the cam plate.
Figure 53:
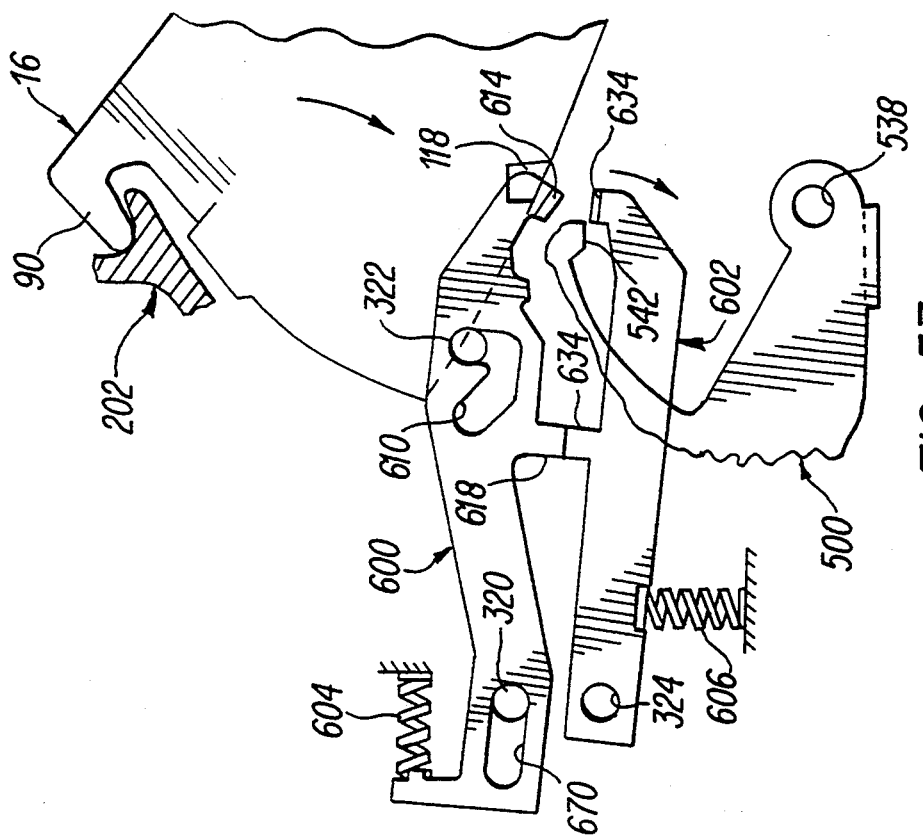
FIG. 53 is a schematic view of the electrical connector or plug shown in partial elevation and illustrating the engagement of the upper latch with the lower latch after movement of the upper latch by the electrical connector or plug.
Figure 52:
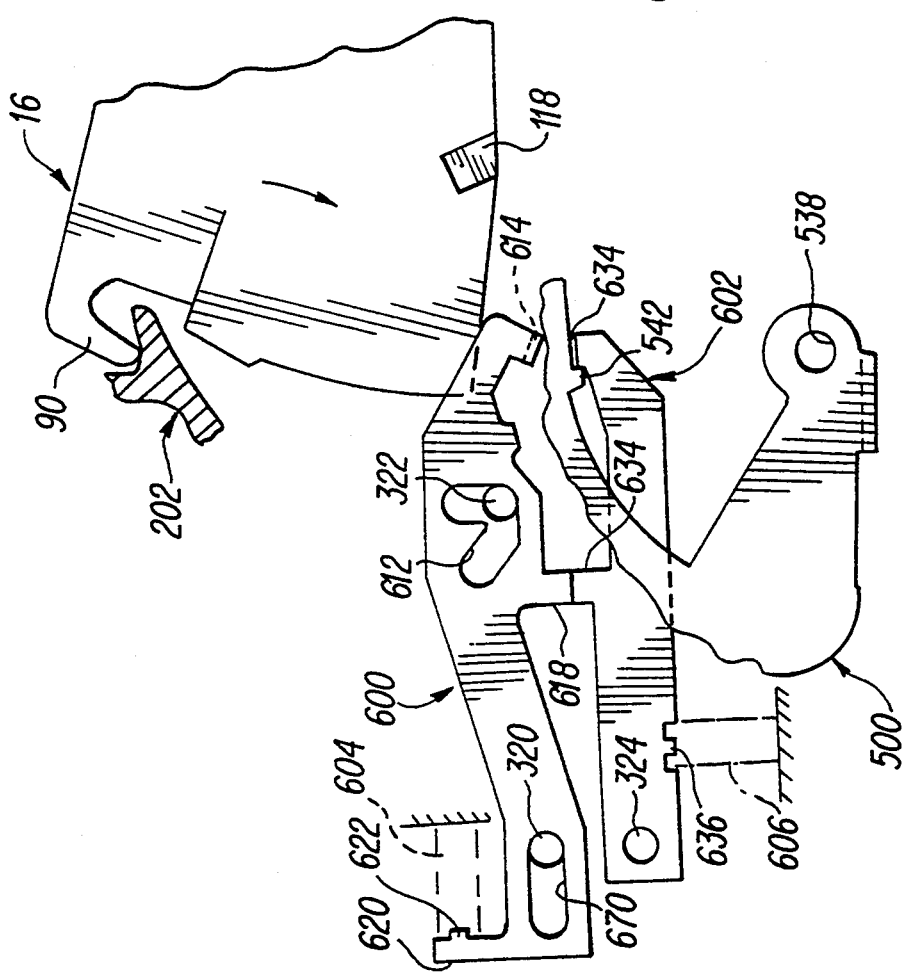
FIG. 52 is a schematic view of the electrical connector or plug shown in partial elevation and illustrating the engagement with the upper latch prior to movement of the upper latch by the electrical connector or plug.
Figure 55:
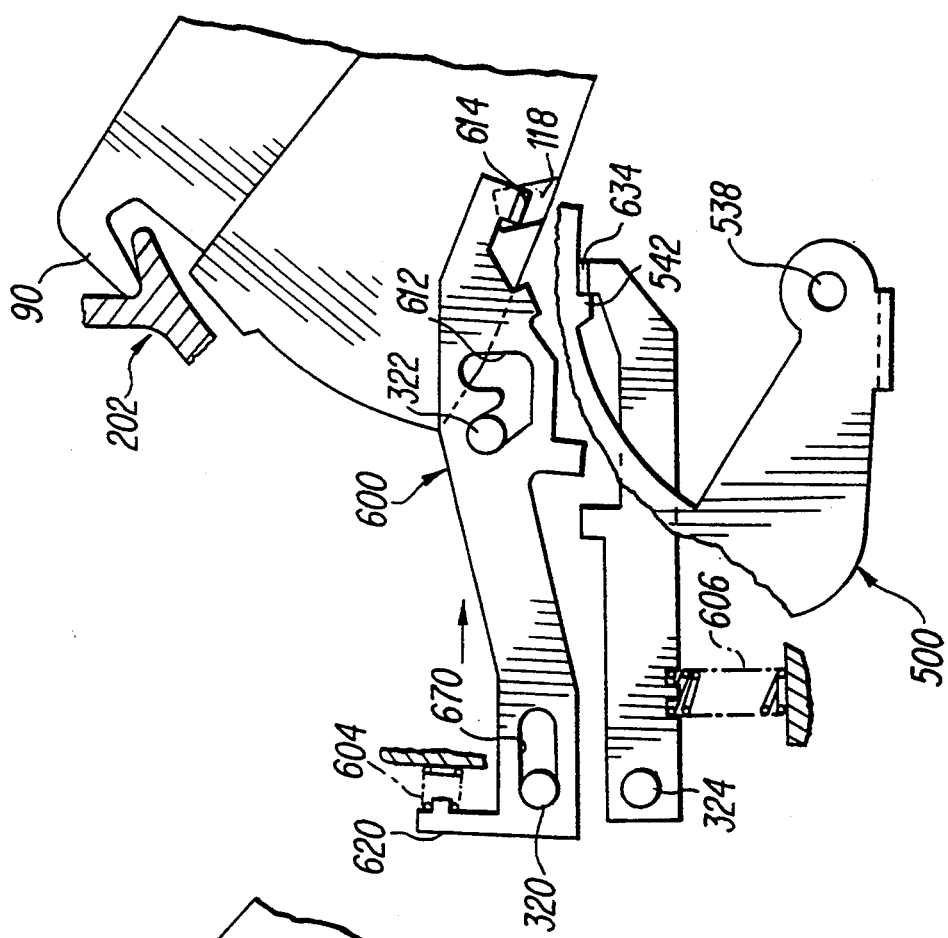
FIG. 55 is a schematic view of the electrical connector or plug shown in partial elevation and illustrating the movement of upper and lower latches upon partial removal of the electrical connector or plug from the inlet cavity.
Figure 54:
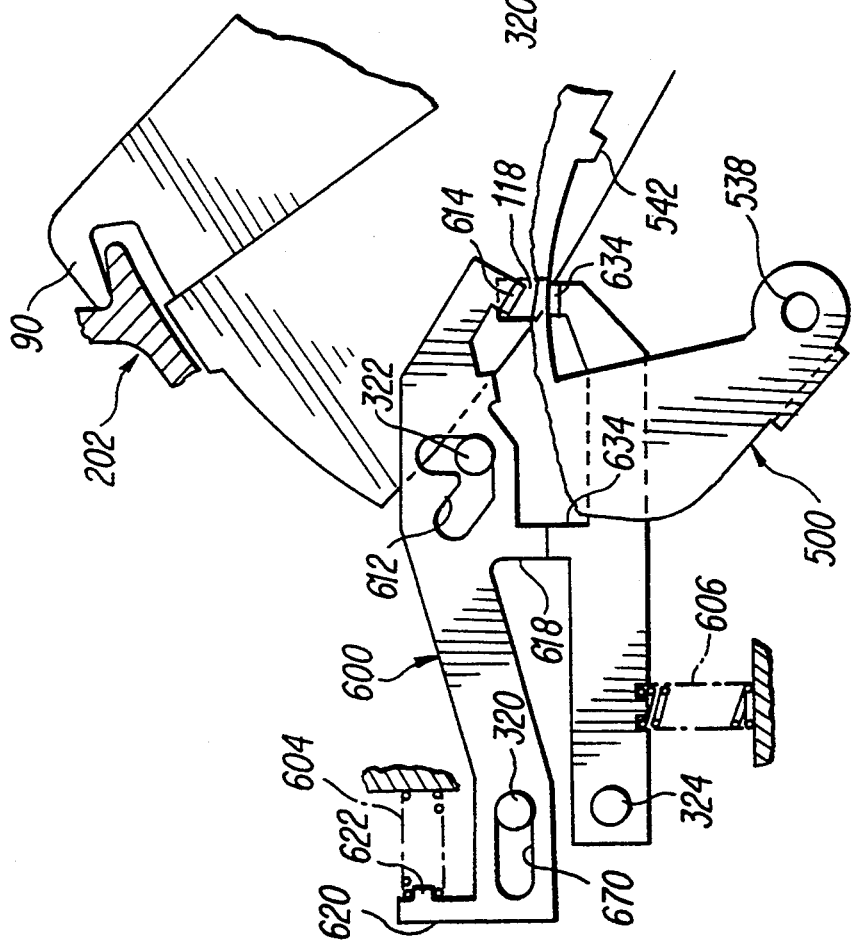
FIG. 54 is a schematic view of the electrical connector or plug shown in partial elevation and illustrating the movement of upper and lower latches after full insertion of the electrical connector into the inlet cavity and the actuation plate moved to a grab position.

As seen in FIGS. 20, 41 and 50, trigger lever 704 has a first end 742, a second end 744, a pivot hole 746, and a spring engaging protrusion 748 located between second end 744 and pivot hole 746 for engaging the upper end of compression spring 708. Trigger lever 704 is normally biased in a counterclockwise direction by compression spring 708 about pivot pin 706 so that first end 742 of trigger lever 706 pushes ball bearing 710 downwardly against ball bearing cup 711 and second end 744 of trigger lever engages flange 670 for biasing release latch 650 upwardly. More specifically, the second end 744 of trigger lever 704 is sized that the upper surface of trigger lever 704 engages the upper end of slots 672 of release latch 650 and the lower surface of second end 744 of trigger lever 704 engages bight portion 652 of release latch 650. Accordingly, upward or downward movement of trigger lever 704 will cause release latch 650 to move either upwardly or downwardly therewith.

Compression spring 708 and ball bearing 710 are conventional, and thus, will not be discussed in detail. Of course, it will be apparent to those skilled in the art from this disclosure that other biasing mechanisms and sliding members can be used in place of compression spring 708 and ball bearing 710 as needed or desired.

Ball bearing cup 711 is substantially circular in top plan view and has a short circular shaft 750 extending downwardly from its bottom surface for engaging support hole 242 of the outer inlet housing 200, and an upper recess 752 for receiving ball bearing 710 which is supported in inner inlet housing 202 by trigger support 700.

Recess 752 of ball bearing cup 711 includes a conical portion 754 and a cylindrical portion 756 concentrically arranged about conical portion 754 such that in the normal rest position ball bearing 710 sits within conical portion 754. Upon a force being applied between outer inlet housing 200 and inner inlet housing 202, ball bearing 710 will ride out of conical portion 754 up into cylindrical portion 756 against the force of first end 742 of trigger lever 704. Specifically, ball bearing 710 is normally held within conical portion 754 by first end 742 of trigger lever 704 due to the counterclockwise force applied to trigger lever 704 by compression spring 708. When the break-away force is applied between outer inlet housing 200 and inner inlet housing 202, inner inlet housing 202 along with ball bearing 710 will move relative to outer inlet housing 200 and ball bearing cup 711 since universal joint assembly 204 movably couples inner inlet housing 202 to outer inlet housing 200. This relative movement between inner inlet housing 202 and outer inlet housing 200 causes the ball bearing 710 to ride up onto cylindrical portion 756 of ball bearing cup 711, which in turn causes trigger lever 704 to pivot clockwise about pivot pin 706. Trigger lever 704 then moves release latch 650 downwardly causing flanges 660 of release latch 650 to disengage from the shelves 583 of the cam plates 570. Once release latch 650 disengages the shelves 583 of cam plates 570, the cam unit 508 with hood 510 will be biased rearwardly by torsion spring 528 to retract contact pins 409 and move contact cover 460 to conceal contact pins 409.

Operation of Electrical Connector Assembly 10

Referring now to FIGS. 3-6 and 40-55, electrical connector 16 has its electrical contacts 34 and 38 completely concealed by contact cover 50 prior to insertion of electrical connector 16 into electrical connector inlet assembly 20, while the contact pins 409 of electrical connector inlet assembly 20 are completely concealed by contact cover 460. Thus, inadvertent contact with either of the electrical contacts 34 and 38 of electrical connector 16 or the electrical contact pins 409 of electrical connector inlet assembly 20 by the user is prevented, as well as, the ingress of water or contaminants.

In operation, electrical connector 16 is inserted into inlet cavity 336 of electrical connector inlet assembly 20 by first engaging hook 90 of electrical connector 16 on ledge 338 of inner inlet housing 202, and then swinging electrical connector 16 downwardly into inlet cavity 336 of electrical connector inlet assembly 20. Inlet cavity 336 is sized to receive electrical connector 16 therein with little or no hand force by the user to insert electrical connector 16 into electrical connector inlet assembly 20. Moreover, the cavity 336 is sized to allow contact cover 50 of electrical connector 16 to be pivoted between its closed position and its open position for exposing contacts 34 and 38.

Once electrical connector 16 is fully inserted into inlet cavity 336 of inlet assembly 20, side walls 100 of electrical connector 16 engage tabs 614 of upper latches 600 to release actuation unit 500 from the retracted position to the grab position. Also, full insertion of electrical connector 16 causes the notches 188 formed in contact cover 50 of electrical connector 16 to engage detentes 470 formed on contact cover 460 of inlet assembly 20. Specifically, during the downward swinging of electrical connector 16, the upper latches 600 are moved downwardly by electrical connector 16 since tabs 614 are positioned to engage the side walls 100 of electrical connector 16 before electrical connector 16 is completely swung downwardly to its rest position. This downward movement of upper latches 600 causes lower latches 602 to also move downwardly since abutments 618 of upper latches 600 engage abutment 634 of lower latches 602. In other words, upper latches 600 are pivoted downwardly against the force of compression springs 604 by electrical connector 16 and lower latches 602 are moved downwardly against the force of compression springs 606 by upper latches 600. This downward movement of lower latches 602 disengages tabs 632 from stop members 542 of actuation plates 522 to allow actuation unit 500 with handle 520 to rotate forwardly about pivot rod 502 due to torsion spring 528. In other words, lower latches 602 release actuation unit 500 so that spring 528 rotates handle 520 to a grab position for permitting a user to make the electrical connection between electrical connector 16 and electrical connector inlet assembly 20.

Now that the electrical connector 16 is fully inserted into inlet cavity 336, the magnet or magnets 119 will activate sensor or sensors 358. The sensor or sensors 358 will then send a signal to microprocessors 24 to indicate the magnitude or level of the charging power being supplied by electrical connector 16. The microprocessor 24 can then adjust its circuitry to accept or reject the power or energy from the power source 14 once electrical connection is accomplished. In other words, the microprocessor 24 can prevent the power source from sending power to recharge the battery 22 if the current of the electrical connector 16 is incompatible with the vehicle's circuitry. Preferably, the vehicle's circuitry is designed to adjust its input to accommodate the current level being supplied thereto.

Now, the user grabs handle 520 of actuation unit 500 and pulls it forward about pivot rod 502 which in turn causes drive unit 504, cam unit 508 and release latch 650 all to pivot forwardly along with hood 510. Specifically, drive pin 534 with bushing 536 of actuation unit 500 engages the L-shaped slot 554 of drive plates 544 for moving drive unit 504 forwardly with actuation unit 500. Drive unit 504 in turn moves cam unit 508 therewith since latching tabs 660 of release latch 650 engage latch slots 556 of drive unit 504 and engage shelves 583 of cam unit 508. Accordingly, movement of the actuation unit 500 from the grab position to the extended position causes drive unit 504 as well as cam unit 508 and release latch 650 to also move forwardly to the extended position.

This movement of cam unit 508 drives the inlet contact pins 409 from their retracted position to their extended position to engage electrical contacts 34 and 38 of electrical connector 16. Also, simultaneously the contact covers 50 and 460 are moved out of the way for exposing the respective contacts 34 and 38 of electrical connector 16 to inlet contact pins 409 of inlet assembly 20. Specifically, the forward movement of the cam plates 570 with each of their three control slots 314, 316 and 318 control the movement of inlet contact assembly 206 for exposing and extending the inlet contact pins 409 as well as for concealing and retracting the inlet contact pins 409. More specifically, the contact pins 409 are driven from the retracted positions to their forward or extended positions since contact drive bail 406 is slidably coupled within angled control slots 316 and engage first cam slots 584 of cam plates 570. In other words, as cam plates 570 move forward, the first cam slots 584 engage the pins of the contact drive bail 406 to move the contact drive bail 406 along angled control slots 316.

The contact covers 50 and 460 are also controlled by the forward movement of cam plates 470 to expose and conceal the contacts of the respective connectors 16 and 20. In particular, the ends of connecting rod 464 are positioned within second cam slots 586 so that the forward movement of cam plates 570 causes the connecting rod 464 to move vertically downwardly within vertical control slots 314. This downward movement of connecting rod 464 in turn causes drive links 462 to move contact cover 460 along arcuate control slots 318 from a position concealing contact pins 409 to a position exposing contact pins 409. Specifically, pivot pins 472 of contact cover 460 are connected to one of the ends of drive links 462 and positioned with arcuate control slots 318. Moreover, the arcuate slide arms 468 of contact cover 460 are received in the recesses 348 of the inlet cavity 336 to ensure smooth movement of contact cover 460 from a position concealing contact pins 409 to a position exposing contact pins 409.

This sliding movement of contact cover 460 causes the contact cover 50 of electrical connector 16 to also pivot downwardly to expose contacts 34 and 38 of electrical connector 16. In particular, detentes 470 of contact cover 460 are received in notches 188 of contact cover 50 so that contact cover 460 and contact cover 50 move together when cam unit 508 pivots about second pivot rod 506.

Now that the electrical contacts 34 and 38 of electrical connector 16 are engaged with the contact pins 409 of the inlet assembly 20, microprocessor 24 sends a signal to power source 14 via communications wire 28 to indicate whether to start charging the battery 22 of vehicle 12 or to prevent charging of the battery 22 due to incompatibility. Once the microprocessor 24 initiates the charging processes, the energy is then supplied from power source 14 to the battery 22 of vehicle 12. Upon full charge of battery 22, microprocessor 24 will send another signal to the power source 14 via communications wire 28 to stop the flow of current.

In the event that the vehicle 12 is hit when being recharged, the break-away assembly 210 will cause the inlet contact assembly 205 to retract the inlet contact pins 409 from the contacts 34 and 38 of the electrical connector 16 as well as cause the inlet contact cover 460 to move from its position exposing the contact pins 409 to its retracted position concealing contact pins 409 and the contact cover 50 to move from its open position exposing contacts 34 and 38 to its closed position concealing contacts 34 and 38. Specifically, any relative movement between outer inlet housing 20 and inner inlet housing 202 will cause break-away assembly 210 to cause release latch 650 to disengage shelves 583 of the cam plates 570 which in turn allows torsion springs 588 to rotate cam plates 570 rearwardly. This rearward movement of cam plates 570 by torsion spring 588 causes the contact pins 409 to retract and the inlet cover 460 to move from a position exposing the contact to a position concealing the contact pins 409 as discussed above in more detail. In other words, cam slots 584 and 586 engages the ends of contact drive bail 406 and the ends of connecting rod 464, respectively, to retract contact pins 409 and contact cover 460, respectively. Accordingly, once the contact pins 409 have been retracted and the contact covers 50 and 460 closed, electrical connector 16 is free to be pulled from inlet cavity 336.

Second Embodiment of the Invention

Figure 56:
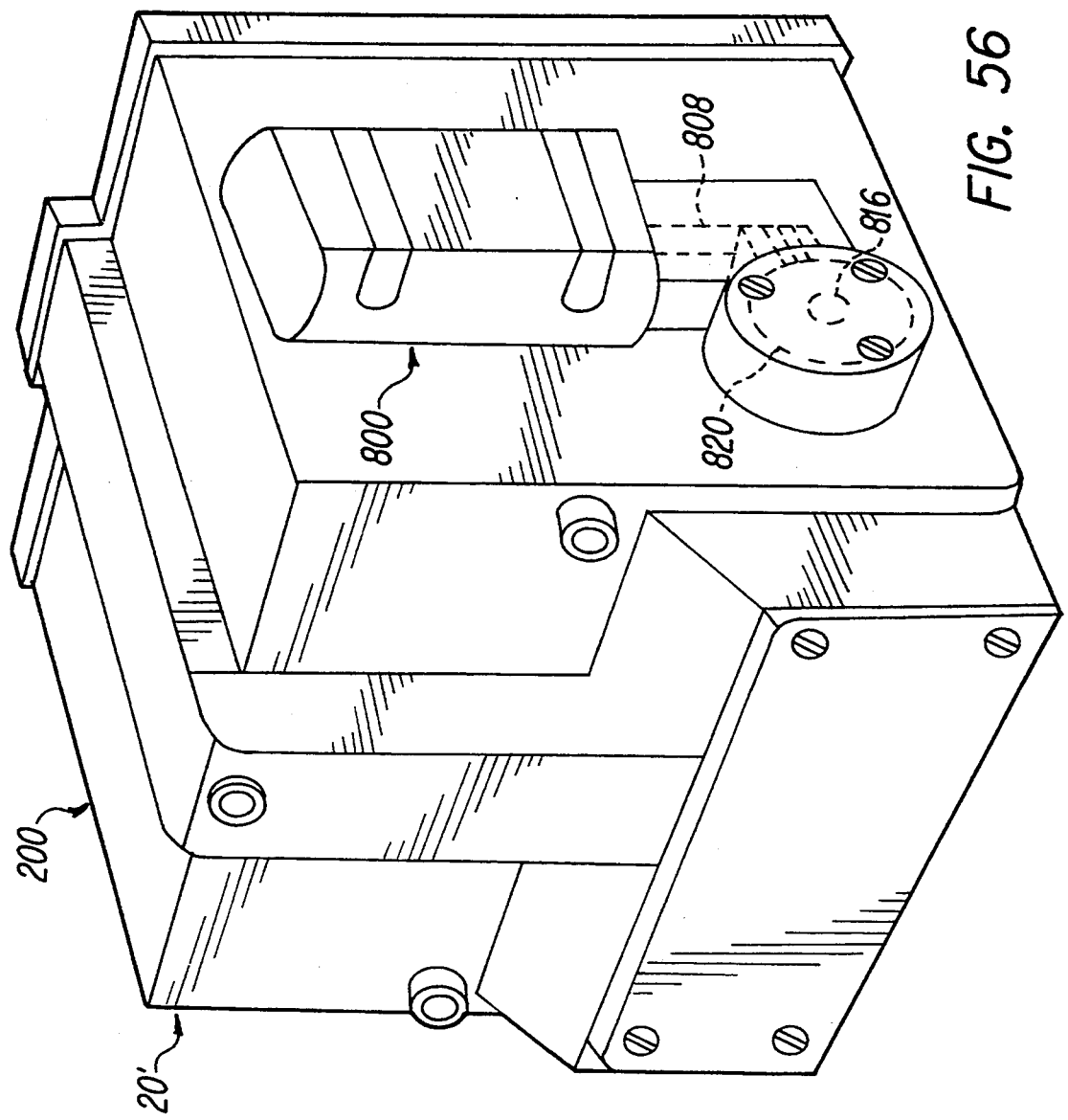
FIG. 56 is a side perspective view of an automatic version of an electrical connector inlet assembly in accordance with a second embodiment of the present invention.

As seen in FIGS. 56–58, a second embodiment of an electrical connector inlet assembly 20' in accordance with the present invention is illustrated in conjunction with electrical connector 16. Electrical connector inlet assembly 20' is substantially identical to electrical connector inlet assembly 20 of the first embodiment illustrated in FIGS. 1–55, except that electrical connector inlet assembly 20' has been modified to be an automatic or motorized version of the first embodiment. More specifically, the actuation unit 500 of the first embodiment has been replaced with a motor 800, and a drive arm 802 for automatically driving the drive unit 504 as well as cam unit 508 upon insertion of electrical connector 16, into inlet cavity 336.

Electrical connector 16 includes one or more magnets 119 mounted thereto for activating one or both of the sensors 358 of the electrical connector inlet assembly 20'. Accordingly, the construction and assembly of electrical connector inlet assembly 20' will not be discussed or illustrated in detail herein.

Referring to electrical connector inlet assembly 20' shown in FIG. 57, motor 800 is fixedly coupled to one of the side walls 222 of outer inlet housing 200 in a conventional manner, such as by a bracket and a pair of threaded fasteners. Motor 800 is a conventional reversible electric motor which is powered by battery 22 of vehicle 12 as shown in FIG. 1. Motor 800 has an output shaft 808 with a cylindrical worm 810 fixedly coupled thereto for rotation therewith.

As particularly seen in FIG. 58, drive arm 802 has a connecting portion 812 with a first drive pin 814 at one end and a second drive pin 816 at the other end. Specifically, first drive pin 814 extends outwardly from one end of connecting portion 812 for engaging control slot 562 of connecting member 546 of drive unit 504, while second pin 816 extends outwardly from the other end of connecting portion 812 in the opposite direction for pivotal movement within a hole formed in side wall 222 of outer inlet housing 200.

As seen in FIG. 56, drive pin 816 has a worm gear 820 fixedly coupled thereto for engaging cylindrical worm 810 of motor 800. While drive arm 802 is illustrated as being movably coupled to motor 800 by worm 810 and worm gear 820, it will be apparent to those skilled in the art from this disclosure that drive arm 802 can be movably coupled to motor 800 in many different ways. For example, motor 800 can be mounted directly to drive pin 816.

Accordingly, when motor 800 is energized by battery 22 via microprocessor 24, motor 800 will rotate output shaft 808 and cylindrical worm 810. Cylindrical worm 810 will then rotate the worm gear 820 coupled to the second drive pin 816 for moving drive arm 802. The drive arm 802 will in turn extend or retract drive unit 504 which is coupled to cam unit 508 via release latch 650 to extend or retract contact pins 409 as fully discussed above pertaining to the first embodiment.

Motor 800 is preferably activated by sensors 358 which detect the insertion of plug or electrical connector 16 therein via magnets 119. Sensors 358 and magnets 119 are illustrated in the figures relating to the first embodiment, and thus, are not illustrated in the figures of this embodiment. Therefore, only the differences will now be discussed in this embodiment. In particular, sensors 358 are preferably reed switches coupled to the side walls 302 of inner inlet housing 202 adjacent inlet cavity 336. Sensors 358 are activated by one or more magnets 119 on electrical connector 16. Specifically, when electrical connector 16 is inserted into cavity 336 of electrical inlet connector assembly 20', one or more of the magnets 119 will be positioned adjacent the reed switches or sensors 358 for activating the motor via microprocessor 24. Accordingly, motor 800 will not be actuated until the electrical connector 16 is correctly positioned within inlet cavity 336. If the electrical connector 16 is absent from inlet cavity 336 or not correctly positioned within the inlet cavity 336, then reed switches or sensors 358 will sense the absence or incorrect positioning of the electrical connector 16 to prevent the contact pins 409 and the hood 510 from being extended. Once the vehicle 12 has been fully charged, then microprocessor 24 sends a signal to motor 800 for rotating drive unit 504 and cam unit 508 rearwardly by drive arm 802. Drive unit 504 is releasably coupled to cam unit 508 by release latch 650 for disconnecting electrical connector 16 from inlet assembly 20' in substantially the same manner as discussed above with reference to the manual version of the first embodiment.

Reed switches or sensors 358 are conventional reed switches or sensors, and thus, will not be discussed or disclosed in detail herein. Moreover, their electrical connection with microprocessor 24 and microprocessors connection with motor 800 are conventional electrical connections which will not be disclosed or illustrated in detail herein.

Magnets 119 are mounted in side walls 100 of electrical connector 16 so that they are positioned adjacent one or more of the sensors 358. Specifically, by selecting one or more magnets, the reed switches can signal the microprocessor 24 to indicate the voltage rating of the electrical connector 16. In other words, by selecting the number of magnets coupled to electrical connector 16, it is possible to indicate whether a slow charge, a fast charge or a normal charge is being supplied to vehicle 12 by electrical connector 16. More specifically, if only a magnet is coupled to the right side wall 100 of electrical connector 16, then the only corresponding sensor 358 will be activated by the right side magnet to indicate a slow charge to the microprocessor. If only a magnet 119 is coupled to the left side wall 100 of electrical connector 16 with no magnet on the right side wall 100 of electrical connector 16, then electrical connector 16 will activate the left side sensor 358 of the inlet assembly 20' to indicate a normal charge to microprocessor 24. If a magnet 119 is coupled to both the right and left side walls 100 of electrical connector 16, then both the right and left sensors 358 will be activated by the magnets 119 to indicate a fast charge to the microprocessor 24.

Third Embodiment of the Invention

Figure 59:
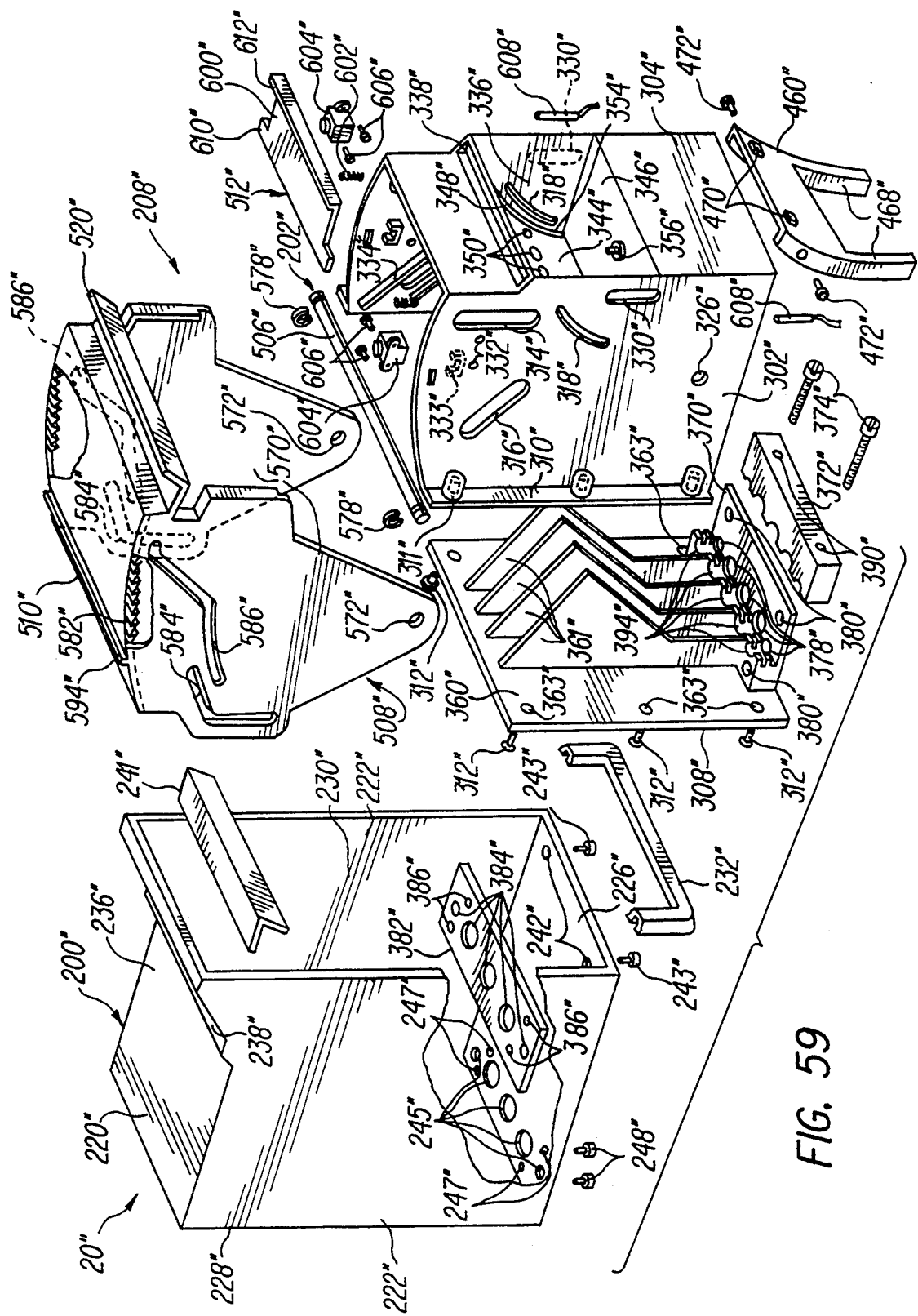
FIG. 59 is an exploded perspective view of selected parts of modified electrical connector inlet assembly illustrated in FIGS. 1–55 in accordance with a third embodiment of the present invention.
Figure 60:
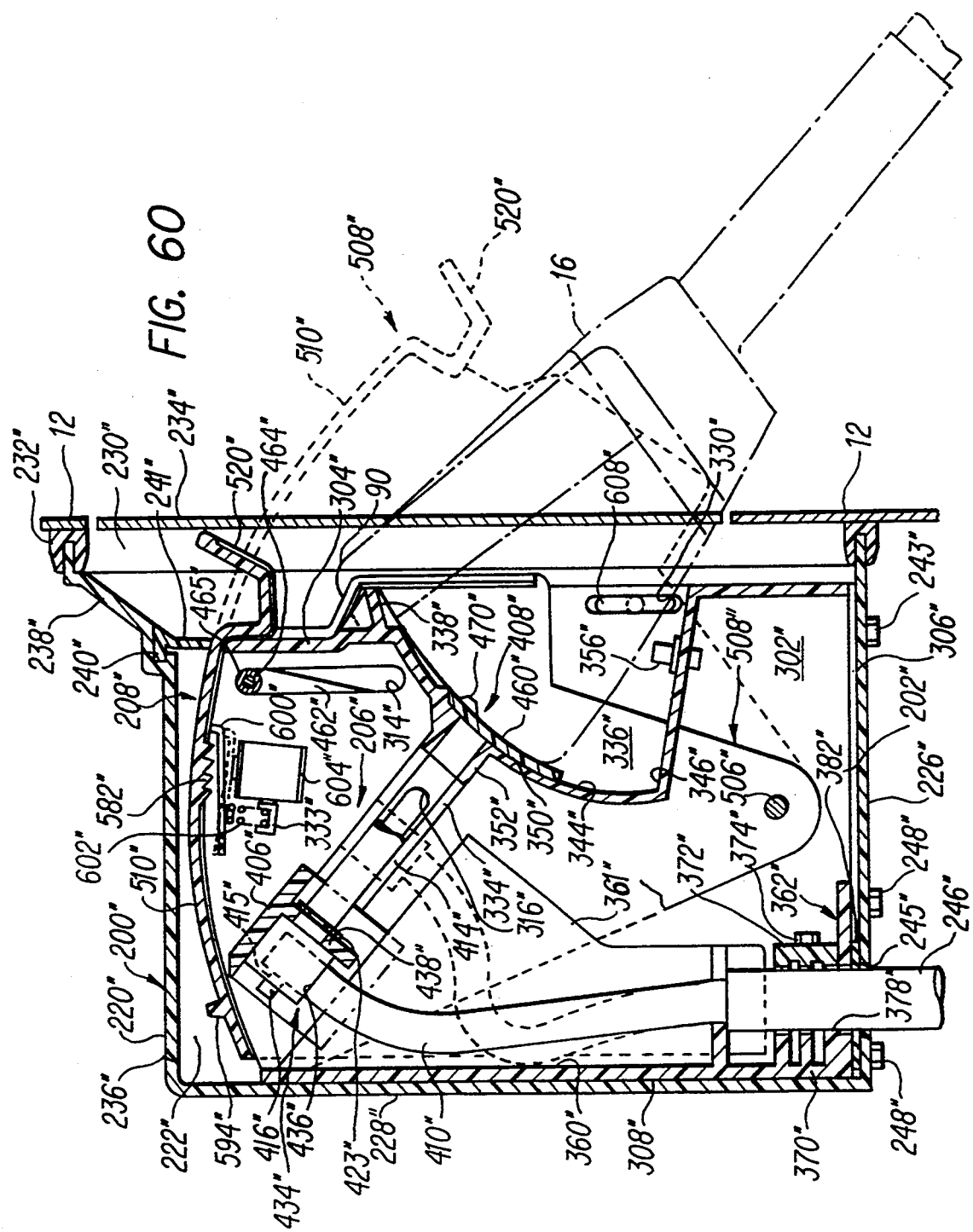
FIG. 60 is a schematic cross-sectional view of an electrical connector inlet assembly in accordance with the third embodiment of the present invention illustrated in FIG. 59.
Figure 61:
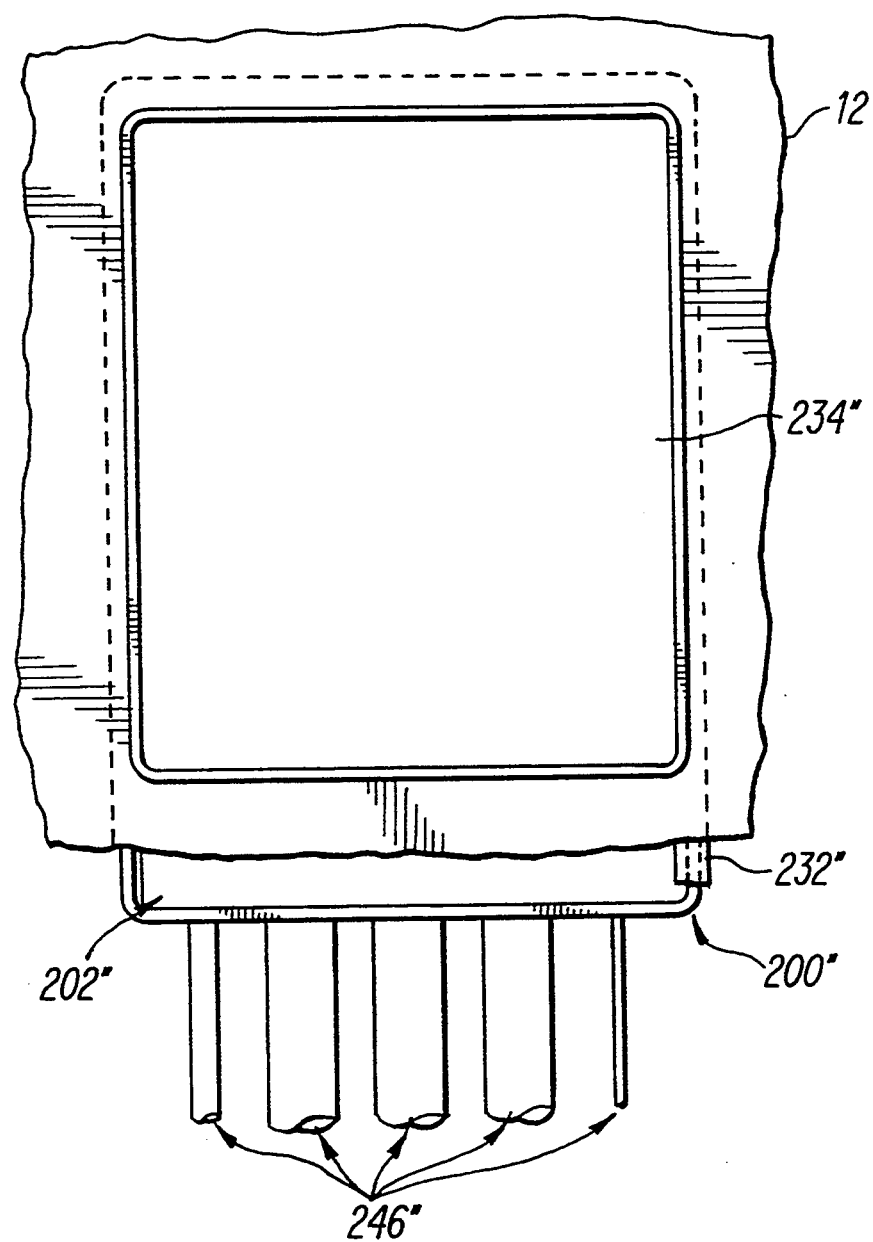
FIG. 61 is a partial front elevational view of a vehicle with the electrical connector inlet assembly of FIGS. 59 and 60 mounted therein.

As seen in FIGS. 59–61, a third embodiment of an electrical connector inlet assembly 20" in accordance with the present invention is illustrated for use in conjunction with electrical connector 16. Electrical connector inlet assembly 20" is substantially identical to electrical connector inlet assembly 20 of the first embodiment illustrated in FIGS. 1–55, except that electrical connector inlet assembly 20" is a simplified version without any actuation unit, drive unit, release latch, connector latch unit or break-away assembly.

In particular, the handle 520" of electrical connector inlet assembly 20" has been made integral with the hood 510" of cam unit 508" so as to eliminate actuation unit 500 and drive unit 504 as well as connector latch unit 512 and break-away assembly 210 of the first embodiment. Accordingly, electrical connector inlet assembly 20" will not be discussed or illustrated in detail herein, and the same reference numerals will be used to identify the parts of inlet assembly 20" which are identical to the first embodiment.

Specifically, electrical connector inlet assembly 20" includes (1) an outer stationary inlet housing 200" fixedly coupled to vehicle 12 in a conventional manner, (2) an inner stationary inlet housing 202" fixedly coupled within outer inlet housing 200", (3) an inlet contact assembly 206" movably coupled to inner inlet housing 202", and (4) an actuation assembly 208" movably coupled to inner inlet housing 202" for operating inlet contact assembly 206".

Outer inlet housing 200" is preferably molded as an integral, one-piece, unitary member from a hard, rigid non-conductive material such as plastic. Outer inlet housing 200" has a top wall 220", a pair of substantially identical side walls 222" extending substantially perpendicularly to top wall 220", a bottom wall 226" extending between the lower ends of side walls 222", a rear wall 228" extending between side walls 222", and a front opening 230" with an annular rubber gasket 232" for receiving inner inlet housing 202" therethrough. Outer inlet housing 200" is rigidly coupled to vehicle 12 with gasket 232" engaging a portion of vehicle 12 about an access panel 234". Outer housing 200" also rigidly supports inner inlet housing 202" to vehicle 12 as discussed below.

Top wall 220" of outer inlet housing 200" has a flat section 236" and an inclined section 238" extending upwardly and outwardly from flat section 236". Top wall 220" also has a transverse recess 240" formed on its interior surface between flat section 236" and inclined section 238" for receiving a rubber gasket 241". Rubber gasket 241" engages hood 510" of actuation assembly 208" for sealing the space between outer inlet housing 200" and hood 510"

Side walls 222" of outer inlet housing 200" are preferably substantially flat planar members which extend substantially perpendicular to top wall 220" as well as bottom wall 226" and rear wall 228". Side walls 222" are substantially parallel to each other, and spaced apart for receiving inner inlet housing 202" therebetween.

Bottom wall 226" is a substantially flat wall with a pair of mounting holes 242" for receiving a first pair of mounting screws 243" for rigidly coupling inner inlet housing 202" to outer inlet housing 200". Bottom wall 226" also includes five conductor holes 245" for receiving inlet conductors or wires 246" therein, and four mounting holes 247" for rigidly coupling part of inner inlet housing 202" to outer inlet housing 200" by mounting screws 248". Bottom wall 226" is substantially parallel to flat section 236" of top wall 220", and spaced vertically from top wall 220" for receiving inner inlet housing 202" therebetween.

Rear wall 228" is a substantially flat wall which extends between top wall 220", side walls 222" and bottom wall 226". Rear wall 228" can be fixedly mounted to vehicle 12 in a conventional manner.

Inner inlet housing 202" includes a pair of substantially identical side walls 302", a front contoured wall 304" extending between side walls 302", a bottom wall 306" extending between side walls 302", and a removable wall 308". Preferably, inner inlet housing 202" is molded as an integral, one-piece, unitary member from a hard, rigid non-conductive material such as plastic. Inner inlet housing 202" is rigidly coupled to outer inlet housing 200" by screws 243" and 248", Side walls 302" of inner inlet housing 202" are substantially identical, and thus like reference numerals will be used to identify the same parts on each of the side walls 302". Each of the side walls 302" includes an outwardly extending mounting flange 310" with three mounting holes 311" for mounting rear wall 308" to inner inlet housing 202" via screws 312".

Each of the side walls 302" further includes a vertical control slot 314", an angled control slot 316", and a curved control slot 318". Control slots 314", 316' and 318" control the movement of the inlet contact assembly 206" relative to inner inlet housing 202" for exposing and extending the inlet contacts as well as concealing and retracting the inlet contacts. The inside surface of each of the side walls 302" has a pair of rails 334" extending parallel to angled control slot 316" for engaging and controlling the movement of part of the inlet contact assembly 206" as discussed below.

The actuation assembly 208" is coupled to each of the side walls 302" by a pivot hole 326", a pivot slot 328", recess 330" formed in the exterior surface, a pair of mounting holes 332", and a U-shaped shelf 333" formed on the interior surface as discussed below.

Front wall 304" of inlet housing 202" includes an inlet cavity 336" for receiving electrical connector 16 therein, and a ledge 338" for cooperating with hook 90 of electrical connector 16.

Inlet cavity 336" is formed by a substantially curved wall 344" and a lower flat wall 346" which extend between side walls 302" to form an inlet pocket with a rectangular opening for receiving electrical connector 16 thereon. Curved wall 344" includes arcuate recesses 348" positioned adjacent each of the side walls 302" of inner inlet housing 202". Recesses 348" are arcuate and aligned with curved slots 318" formed in side walls 302". Curved wall 344" also includes five spaced contact openings 350" and five reinforcing tubes 352" extending from the interior surface of curved wall 344" and aligned with contact openings 350".

Lower wall 346" of inlet cavity 336" includes a pair of clearance openings 354" which are aligned with recesses 348", and a locking pin 356" projecting upwardly into inlet cavity 336" for engaging recess 189" of electrical connector 16. The clearance openings 354" permit movement of the inlet contact assembly 206", while locking pin 356" retains electrical connector 16 within inlet cavity, as discussed below.

Rear wall 308" has a flat planar section 360" with four dividers 361" extending substantially perpendicularly therefrom, a conductor mounting section 362" extending outwardly therefrom, and six mounting holes 363" extending through flat section 360" for receiving screws 312".

Dividers 361" extend from rear wall panel 360" into the interior of inner inlet housing 202". Dividers 361" are tapered at their free ends and provide insulation between the inlet conductors 246". Accordingly, dividers 361" along with side walls 302" define five passageways for receiving in each of the passageways one of the inlet conductors 246".

Conductor mounting section 362" includes a stationary clamp member 370" and a movable clamp member 372" coupled to stationary clamp member 370" by a pair of screws 374". Stationary clamp 370" has five holes 378" extending therethrough for receiving inlet conductors 246". One of the holes 378" is aligned with each of the passageways formed by dividers 361". Stationary clamp 370" also has four threaded mounting holes 380" for receiving screws 248" for fixedly securing the rear end of inner inlet housing 202" to outer inlet housing 200".

Preferably, a rubber molded gasket 382" is positioned between connector mounting section 362" and bottom wall 226" of outer inlet housing to prevent the ingress of water and other contaminants. Gasket 382" has five holes 384" aligned in a row for receiving inlet conductors 246" therethrough and four holes 386" for receiving screws 248" therethrough.

Movable clamp 372" has five curved recesses 388" for engaging inlet conductors 246" and a pair of holes 390" for receiving screws 392" therein to secure movable clamp 372" to stationary clamp 370". Stationary clamp 370" also has five curved recesses 394" for mating with recesses 388" of movable clamp 372" to fixedly secure inlet conductors 246" therebetween.

As seen in FIG. 60, inlet contact assembly 206" includes five electrical inlet contact pins 409" (only one shown) movably coupled to inner inlet housing 202" by a movable contact bail 406", and a movable contact cover assembly 408" for exposing and concealing electrical contact pins 409". Inlet contact assembly 206" is operatively coupled to actuation assembly 208" such that actuation assembly 208" moves the inlet contact pins 409" as well as moves contact cover assembly 408" upon insertion of electrical connector 16 into inlet cavity 336".

Each of the electrical contact pins 409" are substantially identical except for their relative size. Specifically, three of the electrical contact pins 409" are power contacts which are all substantially the same size. Of the two remaining electrical contact pins 409", one electrical contact is a ground contact and the other is a communications contact. The ground contact is slightly smaller than the electrical power contacts, while the communications contact is even smaller than the ground contact.

Contact pins 409" each have a main body portion 413" for coupling conductive wire 410" thereto, and a cylindrical pin portion 414" for electrically coupling the electrical connector inlet assembly 20" to electrical connector 16. Main body portion 413" has an axially extending threaded hole 415" for receiving a thumb screw 416", and a transverse bore 417" communicating with hole 415" for receiving conductive wire 410".

Bore 417" is sized to receive one of the ends of its respective conductive wire 410" therein. Conductive wires 410" are secured to main body portions 413" of contact pins 409" by thumb screws 416". Specifically, thumb screws 416" are threaded into holes 415" until they engage conductive wires 410" to crimp them within bores 417". Thus, thumb screw 416" electrically couples conductive wire 410" to main body portion 413".

Cylindrical pin portion 414" of each contact pin 409" is provided with an annular recess for receiving a C-clip 423" to retain contact pin 409" to bail 406". Contact pins 409" are constructed of any suitable conductive material such as brass. Each of the contact pins 409" are coupled to bail 406" for reciprocal movement therewith to electrically engage and disengage contacts 34 and 38 of electrical connector 16.

Contact drive bail 406" is substantially identical to contact drive bail 406 of the first embodiment. Accordingly, contact drive bail 406" will not be discussed in detail. Generally, contact drive bail 406" is a substantially rectangular member having five contact receiving cavities 434" for supporting main bodies 413" of inlet contact pins 409". Each of these cavities 434" has a rectangular cross-section with a cutout 436" in one wall for receiving one of the conductive wires 410" therein, and a bore 438" for receiving pin portion 414" of one of the inlet contact pins 409" therein. Each of the cavities 434" receives one of the main bodies 413" of electrical inlet contact pins 409", while each of the bores 438" receives one of the pin portions 414" of electrical inlet contact pins 409". Contact pins 409" are secured within cavities 434" by C-clips 423" to prevent relative movement therebetween.

Contact cover assembly 408" includes a curved contact cover 460", a pair of drive links 462" and a connecting rod 464". Contact cover assembly 408" is preferably controlled by actuation assembly 208" so that a user can expose or conceal the inlet contact pins 409" only after mating electrical connector 16 has been fully inserted into inlet cavity 336".

Contact cover 460" is preferably molded as an integral one-piece, unitary member from a hard, rigid non-conductive material such as plastic. Contact cover 460" has a pair of arcuate slide arms 468" located at each of its ends, and a pair of detentes 470" for engaging notches 188 formed in contact cover 50 of electrical connector 16 to expose contacts 34 and 38 of electrical connector 16 to inlet contact pins 409". Each of the arms 468" has a pivot pin 472" extending outwardly therefrom for engaging curved control slots 318". Specifically, pivot pins 472" extend through curved control slots 318", and are then coupled to one of the ends of its respective drive link 462". The other ends of the drive links 462" are connected to the ends of connecting rod 464" in a conventional manner. Connecting rod 464" has an overlying sleeve 466" which is slidably received in vertical control slots 314" of side walls 302" for sliding movement relative to inner inlet housing 202". Accordingly, movement of connecting rod 464" with sleeve 466" causes drive links 462" to reciprocate contact cover 460" via pivot pins 472" sliding in curved control slots 318".

Arcuate slide arms 468" are positioned within curved recesses 348" of inlet cavity 336" of the inner inlet housing 202" for sliding movement therein. Accordingly, as connecting rod 464" slides vertically within vertical control slot 314", arcuate slide arms 468" of cover 460" reciprocate within curved recesses 348" with a portion of arms 468" moving through clearance openings 354" formed in lower wall 346" of inlet cavity 336".

Actuation assembly 208" includes (1) a cam unit 508" pivotally coupled to inner inlet housing 202" via a pivot rod 506", (2) a hood or weathershield 510" fixedly coupled to cam unit 508" for movement therewith, and (3) a hood latch unit 512" coupled to the side walls 302" of inner inlet housing 202".

Cam unit 508" is substantially U-shaped and molded as an integral, one-piece, unitary member from a hard, rigid non-conductive material such as plastic or any other suitable material. Control unit 508" includes a pair of substantially identical cam plates 570" connected to opposite ends of hood 510". Cam plates 570" are substantially parallel to each other and pivot together about pivot rod 506".

Each of the cam plates 570" includes (1) a pivot hole 572" for receiving pivot rod 506" therein, (2) a first cam slot 584" for controlling movement of the contact bail 406", and (3) a second cam slot 586" for receiving the ends of connecting rod 464" to control the movement of contact cover 460".

In particular, pivot rod 506" extends through pivot holes 326" of inner inlet housing 202" and through pivot holes 572" of cam plates 570" for pivotally mounting cam unit 508" to inner inlet housing 202". A C-clip 578" is coupled to each of the ends of pivot rod 506" to secure pivot rod 506" to inner inlet housing 202" and cam unit 508". Accordingly, cam unit 508" is movably coupled to inner inlet housing 202" and operatively coupled to contact assembly 206" to extend and retract contact pins 409" as well as to move contact cover 460" between a position concealing contact pins 409" and a position exposing contact pins 409". Since cam unit 508" is operatively coupled to contact assembly 206" in substantially the same manner as in the first embodiment, the movement of contact assembly 206" will not be illustrated or discussed in detail.

Hood 510" has a handle 520" for moving hood 510" and cam plates 570" about pivot rod 506", a pair of locking teeth 582" formed on the interior surface of hood 510" for engaging hood latch unit 512", and a stop rib 594" formed on the hood's upper surface for engaging gasket 241" of outer inlet housing 200" in the extended position.

The hood latch unit 512" includes (1) a latch plate 600" pivotally coupled to side walls 302" by pivot slots 328", (2) a pair of compression springs 602" coupled to side walls 302" via U-shaped shelves 333" to bias latch plate 600" upwardly to engage locking teeth 582" on hood 510", (3) a pair of electromagnets 604" fixedly coupled to sidewalls 302" of inner inlet housing 202" by screws 606", and (4) a pair of reed switches or sensors 608" coupled to side walls 302".

Latch plate 600" includes a pair of outwardly extending flanges 610" for engaging pivot slots 328", and an upwardly extending flange 612" for engaging locking teeth 582". Latch plate 600" is made of a metallic material capable of being moved by electromagnets 604". Normally, when hood 510" is in its retracted position, latch plate 600" is pivoted upwardly by springs 602" so that flange 612" engages locking teeth 582" to lock hood 510" in the retracted position.

Electromagnets 604" are positioned adjacent latch plate 600" so that upon energizing electromagnets 604" latch plate 600" is pulled downwardly against the force of springs 602" to disengage flange 612" from locking teeth 582". Electromagnets 604" are electrically coupled to microprocessor 24 illustrated in FIG. 1 so that electromagnets 604" are not energized until connector 16 is inserted therein. Specifically, when electrical connector 16 is inserted into inlet cavity 336", the magnet or magnets 119 of electrical connector 16 closes one or both of the reed switches 608" which in turn sends a signal to microprocessor 24 to energize electromagnets 604" for unlocking hood 510". Of course, once electromagnets 604" are deenergized, latch plate 600" swings upwardly to engage the interior surface of hood 510" or locking teeth 582".

Locking teeth 582" have a saw tooth type configuration which allows hood 510" to move rearwardly even when electromagnets 604" are deenergized. Accordingly, when hood 510" is moved from the extended position to the retracted position, locking teeth 582" and locking plate 600" act as a rachet so that locking plate 600" can ride over locking teeth 582" in the rearward direction but not in the forward direction.

Fourth Embodiment of the Invention

Figure 62:
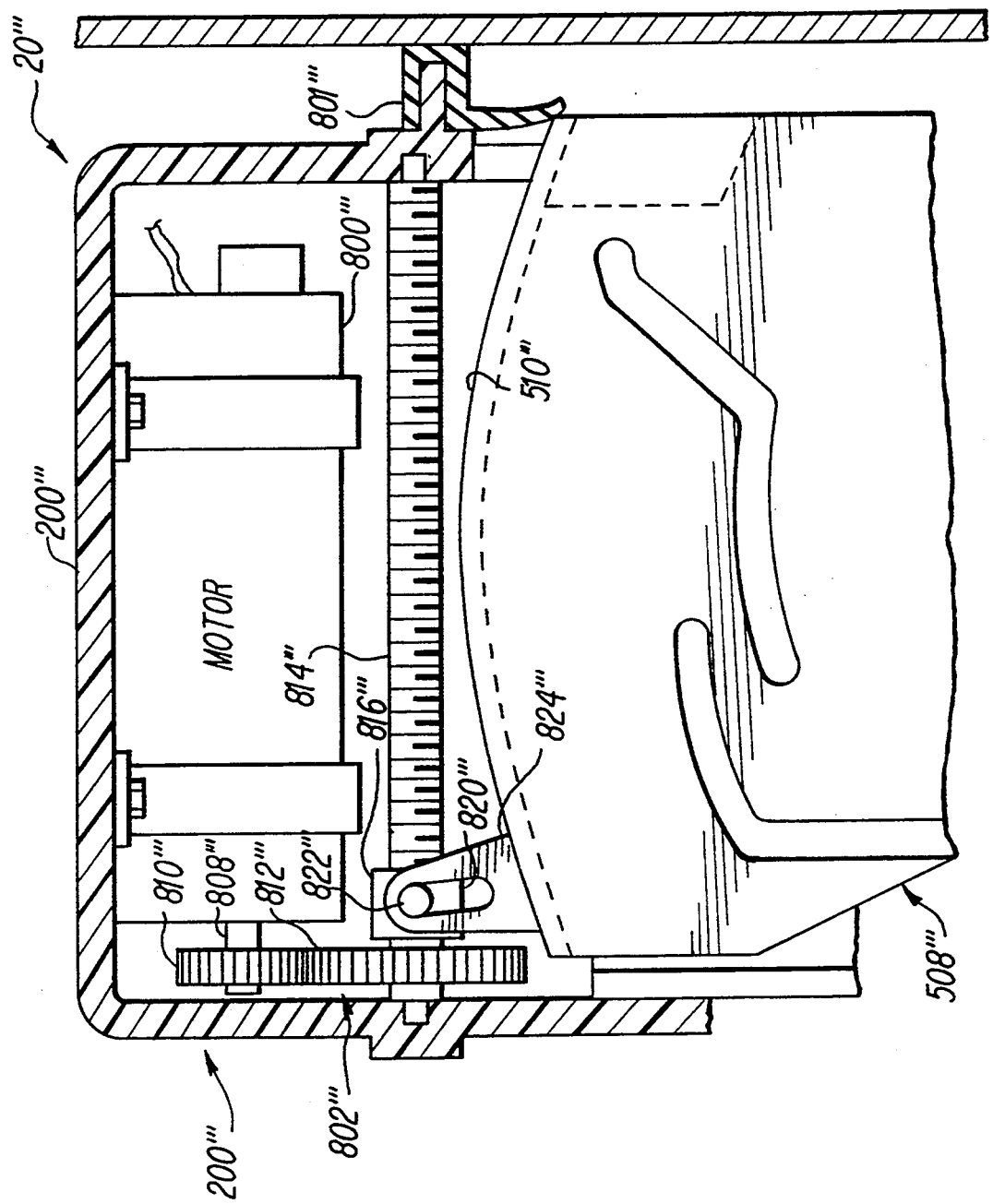
FIG. 62 is a partial cross-sectional view of an automatic version of an electrical connector inlet assembly in accordance with a fourth embodiment of the present invention taken along a vertical plane.

As seen in FIG. 62, a fourth embodiment of an electrical connector inlet assembly 20''' in accordance with the present invention is illustrated for use in conjunction with electrical connector 16. Electrical connector inlet assembly 20''' is substantially identical to electrical connector inlet assembly 20'' of the third embodiment illustrated in FIGS. 59-61, except that electrical connector inlet assembly 20''' has been modified to be an automatic or motorized version. Accordingly, only the differences between electrical connector inlet assemblies 20'' and 20''' will be discussed and illustrated herein.

Top wall 220''' of outer inlet housing 200''' is extended to accommodate a reversible, electric motor 800''' and a drive train 802''' for moving cam unit 508''' between a retracted position and an extended position. A gasket 801''' is coupled to the front wall of outer inlet housing 200''' for engaging the upper surface of hood 510'''.

Motor 800''' is fixedly coupled to the top wall 220''' of outer inlet housing 200''' in a conventional manner, and electrically coupled to microprocessor 24 schematically illustrated in FIG. 1. Microprocessor 24 controls motor 800''' via a pair of reed switches or sensors mounted to inner inlet housing 200''' as discussed above in the second embodiment. Motor 800''' has an output shaft 808''' for driving the drive train 802''' to move cam unit 508''' between the retracted position and the extended position.

Drive train 802''' includes a first gear 810''' fixedly coupled to the output shaft 808''', a second gear 812''' driven by first gear 810''', a threaded shaft 814''' rotatably mounted to outer inlet housing 200''', and a threaded follower 816''' threadedly mounted on threaded shaft 814'''.

Second gear 812''' is fixedly coupled at one end of threaded shaft 814''' for rotation with threaded shaft 814''' by motor 800''' via first gear 810'''. Accordingly, second gear 812''' meshes with first gear 810''' to rotate threaded shaft 814''' upon activation of motor 800'''.

Threaded follower 816''' has a threaded cylinder 820''' for engaging threaded shaft 814''' and pair of trunion pins 822''' for engaging a pair of flanges 824''' extending upwardly from hood 510''' of cam unit 508'''. Accordingly, as threaded shaft 814''' is rotated by motor 800''' via gears 810''' and 812''', the threaded follower 816''' moves axially along threaded shaft 814''' to either extend or retract cam unit 508''' and hood 510'''.

This extension or retraction of cam unit 508''' electrically couples or uncouples electrical connector inlet assembly 20''' to electrical connector 16 in substantially the same manner as discussed above pertaining to cam unit 508''. Accordingly, the operation of electrical connector inlet assembly 20''' will be readily apparent to those skilled in the art from the other embodiments disclosed herein.

It will also be apparent from this disclosure that certain aspects of this invention can be utilized with inductive couplings. For example, the compatibility determination mechanism, e.g., the sensors and magnets, as well as the weathershield can be used with inductive couplings. Accordingly, the scope of the appending claims should not be limited to electrically conductive contacts, unless expressly claimed.

While several embodiments have been chosen to illustrate the invention, it will be understood by those skilled in the art that various changes and modifications can be made herein without departing from the scope of the invention as defined in the appended claims.

What is claimed is:

1. An electrical connector system, comprising:
   a first electrical connector having a first housing with a first power transferring means coupled to a power source;
   non-contacting indicia means, coupled to said first housing of said first electrical connector at a first location, for representing magnitude of said power source;
   a second electrical connector having a second housing with a second power transferring means coupled to a load, said second housing being dimensioned to mate with said first housing in a full insertion position in which said housings remain stationary during transfer of power from said first power transferring means to said second power transferring means; and
   sensing means, coupled to said second housing of said second connector at a second location, for responding to said non-contacting indicia means to determine compatibility of power from said first electrical connector with said second electrical connector upon mating of said first housing with said second housings in said full insertion position,
   said non-contacting indicia means and said sensing means being positioned on said first and second housings at said first and second locations, respectively, to interact after said first and second housings reach said full insertion position and prior to engagement of said first power transferring means with said second power transferring means.

2. An electrical connector system according to claim 1, wherein
   said non-contacting indicia means includes at least one magnet.

3. An electrical connector system according to claim 2, wherein
   said sensing means includes at least one reed switch.

4. An electrical connector system according to claim 2, wherein
   said sensing means includes a pair of sensors electrically coupled to a control mechanism.

5. An electrical connector system according to claim 4, wherein
   said first and second power transferring means are electrically conductive contacts.

6. An electrical connector system according to claim 1, wherein
   said second power transferring means is movably coupled to said second housing between a retracted position and an extended position for electrically engaging said first power transferring means.

7. An electrical connector system according to claim 6, further comprising
   an actuation mechanism operatively coupled to said second power transferring means for moving said second power transferring means between said retracted position and said extended position.

8. An electrical connector system according to claim 7, wherein
   said sensing means is electrically coupled to said actuation mechanism via a control mechanism for selectively permitting movement of said second power transferring means between said retracted position and said extended position.

9. An electrical connector system according to claim 8, wherein
said actuation mechanism includes a motor for moving said second power transferring means upon said control mechanism receiving an electrical signal from said sensing means.

10. An electrical connector system according to claim 9, wherein
said non-contacting indicia means includes at least one magnet.

11. An electrical connector system according to claim 10, wherein
said sensing means includes at least one reed switch.

12. An electrical connector system according to claim 10, wherein
said sensing means includes a pair of sensors electrically coupled to said control mechanism.

* * * * *